United States Patent
Wang et al.

(10) Patent No.: US 12,262,006 B2
(45) Date of Patent: Mar. 25, 2025

(54) CROSS-COMPONENT ADAPTIVE FILTERING AND SUBBLOCK CODING

(71) Applicants: Beijing Bytedance Network Technology Co., Ltd., Beijing (CN); Bytedance Inc., Los Angeles, CA (US)

(72) Inventors: Yang Wang, Beijing (CN); Li Zhang, San Diego, CA (US); Hongbin Liu, Beijing (CN); Kai Zhang, San Diego, CA (US); Kui Fan, San Diego, CA (US); Yue Wang, Beijing (CN)

(73) Assignees: BEIJING BYTEDANCE NETWORK TECHNOLOGYC CO., LTD., Beijing (CN); BYTEDANCE INC., Los Angeles, CA (US)

( * ) Notice: Subject to any disclaimer, the term of this patent is extended or adjusted under 35 U.S.C. 154(b) by 190 days.

(21) Appl. No.: 17/824,386

(22) Filed: May 25, 2022

(65) Prior Publication Data

US 2022/0286674 A1    Sep. 8, 2022

Related U.S. Application Data

(63) Continuation of application No. PCT/CN2020/132003, filed on Nov. 27, 2020.

(30) Foreign Application Priority Data

Nov. 30, 2019    (WO) ............... PCT/CN2019/122237

(51) Int. Cl.
*H04N 19/117*    (2014.01)
*H04N 19/119*    (2014.01)
(Continued)

(52) U.S. Cl.
CPC .......... *H04N 19/117* (2014.11); *H04N 19/119* (2014.11); *H04N 19/176* (2014.11); *H04N 19/186* (2014.11)

(58) Field of Classification Search
CPC ...... H04N 19/80; H04N 19/593; H04N 19/70; H04N 19/124; H04N 19/176;
(Continued)

(56) References Cited

U.S. PATENT DOCUMENTS 9,077,998 B2   7/2015   Wang et al.
9,247,258 B2   1/2016   Coban et al.
(Continued)

FOREIGN PATENT DOCUMENTS

CN    109691102 A    4/2019

OTHER PUBLICATIONS

Abdoli et al. "CE8: BDPCM with Horizontal/Vertical Predictor and Independently Decodable Areas (test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0057, 2019.
(Continued)

*Primary Examiner* — Tsion B Owens
(74) *Attorney, Agent, or Firm* — Conley Rose, P.C.

(57) ABSTRACT

A method of video processing, including performing a conversion between a video block of a video component of a video and a bitstream of the video, where the video block includes sub-blocks, where a filtering tool is used during the conversion according to a rule, and where the rule specifies that the filtering tool is applied by using a single offset for all samples of each sub-block of the video block.

17 Claims, 69 Drawing Sheets

(51) Int. Cl.
*H04N 19/176* (2014.01)
*H04N 19/186* (2014.01)

(58) Field of Classification Search
CPC .... H04N 19/132; H04N 19/186; H04N 19/11; H04N 19/105
See application file for complete search history.

(56) References Cited

U.S. PATENT DOCUMENTS

| | | |
|---|---|---|
| 9,473,779 B2 | 10/2016 | Rapaka et al. |
| 9,591,325 B2 | 3/2017 | Li et al. |
| 9,628,792 B2 | 4/2017 | Rapaka et al. |
| 9,807,406 B2 | 10/2017 | Ramasubramonian et al. |
| 10,057,574 B2 | 8/2018 | Li et al. |
| 10,200,700 B2 | 2/2019 | Zhang et al. |
| 10,257,539 B2 | 4/2019 | An et al. |
| 10,321,130 B2 | 6/2019 | Dong et al. |
| 10,404,999 B2 | 9/2019 | Liu et al. |
| 10,419,757 B2 | 9/2019 | Chen et al. |
| 10,469,847 B2 | 11/2019 | Xiu et al. |
| 10,506,230 B2 | 12/2019 | Zhang et al. |
| 10,531,111 B2 | 1/2020 | Li et al. |
| 10,708,592 B2 | 7/2020 | Dong et al. |
| 10,721,469 B2 | 7/2020 | Zhang et al. |
| 10,728,573 B2 | 7/2020 | Sun et al. |
| 10,778,974 B2 | 9/2020 | Karczewicz et al. |
| 10,855,985 B2 | 12/2020 | Zhang et al. |
| 10,939,128 B2 | 3/2021 | Zhang et al. |
| 10,965,941 B2 | 3/2021 | Zhao et al. |
| 10,979,717 B2 | 4/2021 | Zhang et al. |
| 2012/0183078 A1 | 7/2012 | Lai et al. |
| 2017/0238020 A1 | 8/2017 | Karczewicz et al. |
| 2017/0244975 A1 | 8/2017 | Wang et al. |
| 2018/0041778 A1 | 2/2018 | Zhang et al. |
| 2018/0041779 A1 | 2/2018 | Zhang et al. |
| 2018/0184127 A1 | 6/2018 | Zhang et al. |
| 2019/0191180 A1 | 6/2019 | An et al. |
| 2019/0215532 A1 | 7/2019 | He et al. |
| 2019/0230353 A1 | 7/2019 | Gadde et al. |
| 2019/0238845 A1 | 8/2019 | Zhang et al. |
| 2019/0306502 A1 | 10/2019 | Gadde et al. |
| 2020/0092574 A1 | 3/2020 | Li et al. |
| 2020/0120359 A1 | 4/2020 | Hanhart et al. |
| 2020/0236353 A1 | 7/2020 | Zhang et al. |
| 2020/0252619 A1 | 8/2020 | Zhang et al. |
| 2020/0260120 A1 | 8/2020 | Hanhart et al. |
| 2020/0267381 A1 | 8/2020 | Vanam et al. |
| 2020/0314418 A1 | 10/2020 | Wang et al. |
| 2020/0322632 A1 | 10/2020 | Hanhart et al. |
| 2020/0413038 A1 | 10/2020 | Zhang et al. |
| 2020/0359051 A1 | 11/2020 | Zhang et al. |
| 2020/0366910 A1 | 11/2020 | Zhang et al. |
| 2020/0366933 A1 | 11/2020 | Zhang et al. |
| 2020/0374540 A1 | 11/2020 | Wang et al. |
| 2020/0382769 A1 | 12/2020 | Zhang et al. |
| 2021/0021825 A1 | 1/2021 | Zheng et al. |
| 2021/0076034 A1 | 3/2021 | Misra et al. |
| 2021/0092395 A1 | 3/2021 | Zhang et al. |
| 2021/0092396 A1 | 3/2021 | Zhang et al. |
| 2021/0152837 A1 | 5/2021 | Zhang et al. |
| 2021/0160513 A1* | 5/2021 | Hu .................. H04N 19/82 |
| 2021/0185353 A1 | 6/2021 | Xiu et al. |
| 2021/0211662 A1 | 7/2021 | Wang et al. |
| 2021/0211681 A1 | 7/2021 | Zhang et al. |
| 2021/0235109 A1 | 7/2021 | Liu et al. |
| 2021/0243435 A1 | 8/2021 | Zhang et al. |
| 2021/0250649 A1 | 8/2021 | Zhang et al. |
| 2021/0258571 A1 | 8/2021 | Zhang et al. |
| 2021/0258572 A1 | 8/2021 | Zhang et al. |
| 2021/0297694 A1 | 9/2021 | Zhang et al. |
| 2021/0314595 A1 | 10/2021 | Zhang et al. |
| 2021/0314628 A1 | 10/2021 | Zhang et al. |
| 2021/0321095 A1 | 10/2021 | Zhang et al. |
| 2021/0321121 A1 | 10/2021 | Zhang et al. |
| 2021/0321131 A1 | 10/2021 | Zhang et al. |
| 2021/0337228 A1 | 10/2021 | Wang et al. |
| 2021/0337239 A1 | 10/2021 | Zhang et al. |
| 2021/0344902 A1 | 11/2021 | Zhang et al. |
| 2021/0368171 A1 | 11/2021 | Zhang et al. |
| 2021/0377524 A1 | 12/2021 | Zhang et al. |
| 2021/0385446 A1 | 12/2021 | Liu et al. |
| 2021/0392381 A1 | 12/2021 | Wang et al. |
| 2021/0400260 A1 | 12/2021 | Zhang et al. |
| 2021/0409703 A1 | 12/2021 | Wang et al. |
| 2022/0007014 A1 | 1/2022 | Wang et al. |
| 2022/0345698 A1* | 10/2022 | Misra .................. H04N 19/176 |

OTHER PUBLICATIONS

Chen et al. "CE5-1: Adaptive Loop Filter with Virtual Boundary Processing," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0088, 2019.

Chen et al. "Description of Core Experiment 5 (CE5): Cross Component Adaptative Loop Filtering," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2025, 2019.

Karczewicz et al. "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Kotra et al. "AHG16/CE5-Related: Simplifications for Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0106, 2019.

Li et al. "AHG16/Non-CE5: Cross Component ALF Simplification," Joint Video Experts Team (JVET) of ITU-T SG 16 WP 3 and ISO/IEC JTC 1/SC 29/WG 11 16th Meeting: Geneva, CH, Oct. 1-11, 2019. document JVET-P0173, 2019.

Misra et al. "Cross-Component Adaptive Loop Filter for Chroma," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0636, 2019.

Misra et al. "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0080, 2019.

Misra et al. "CE5-related: On the design of CC-ALF," Joint Video Experts Team (JVET) of ITU-T SG 16 WP 3 and ISO/IEC JTC 1/SC 29/WG 1116th Meeting: Geneva, CH, Oct. 1-11, 2019, document JVET-P1008, 2019.

Wang et al. "Non-CE5: On CC-ALF Padding for ALF Virtual Boundaries," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0311, 2020.

Zhao et al. "CE5-related: Simplified CCALF with 6 Filter Coefficients," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0251, 2019.

phenix.it-sudparis.eu/jvet/doc_end_user/documents/16_Geneva/wg11/JVET-P2001-v14.zip.

https://vcgit.hhi.fraunhofer.de/jvet/VVCSoftware_VTM/-/tags/VTM-7.0.

International Search Report and Written Opinion from International Patent Application No. PCT/CN2020/132003 dated Mar. 1, 2021 (11 pages).

* cited by examiner

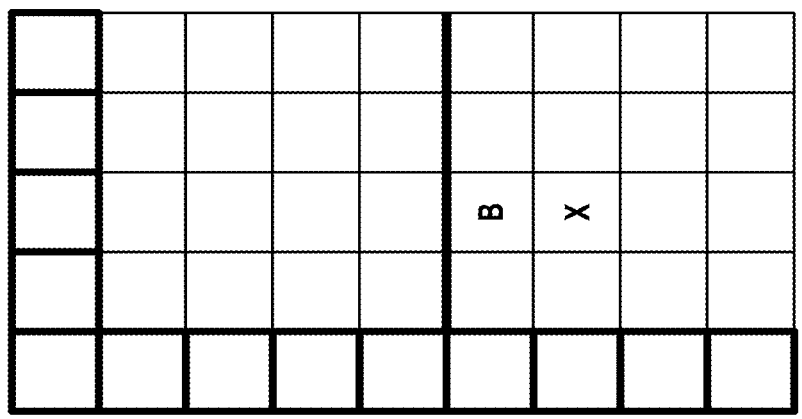
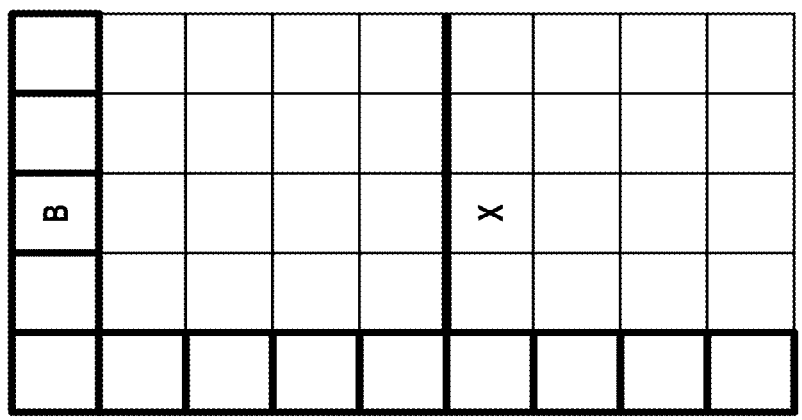
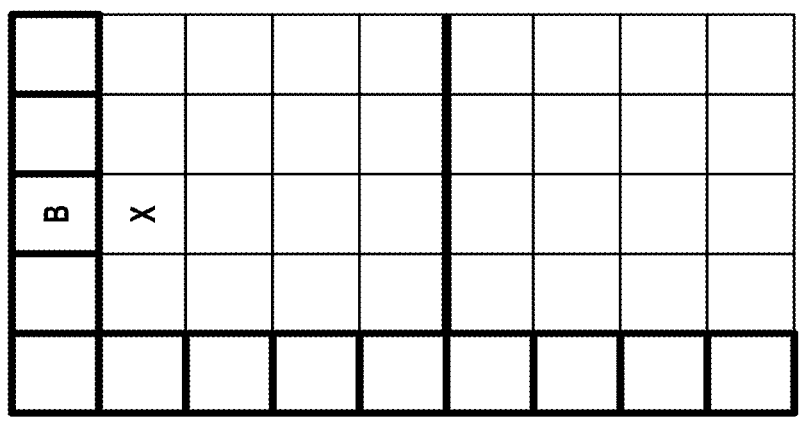
FIG. 6

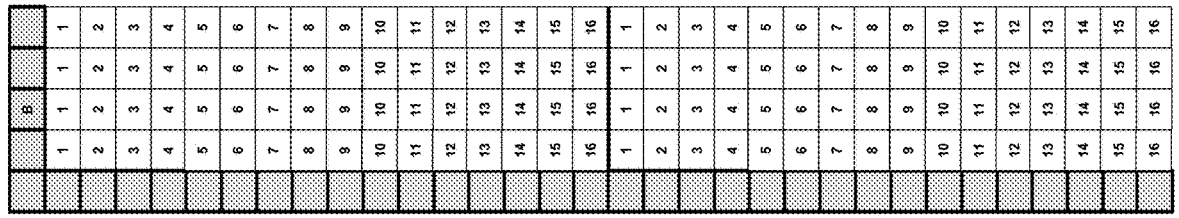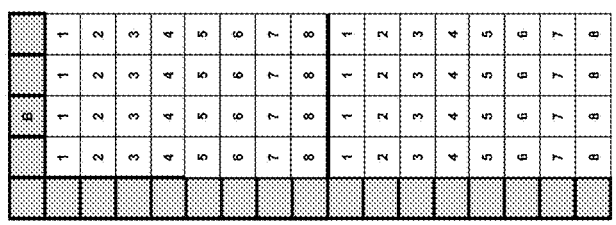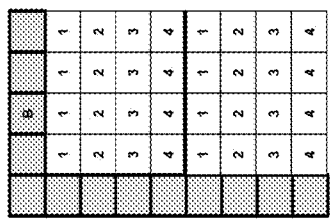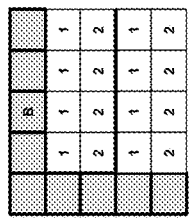
FIG. 7

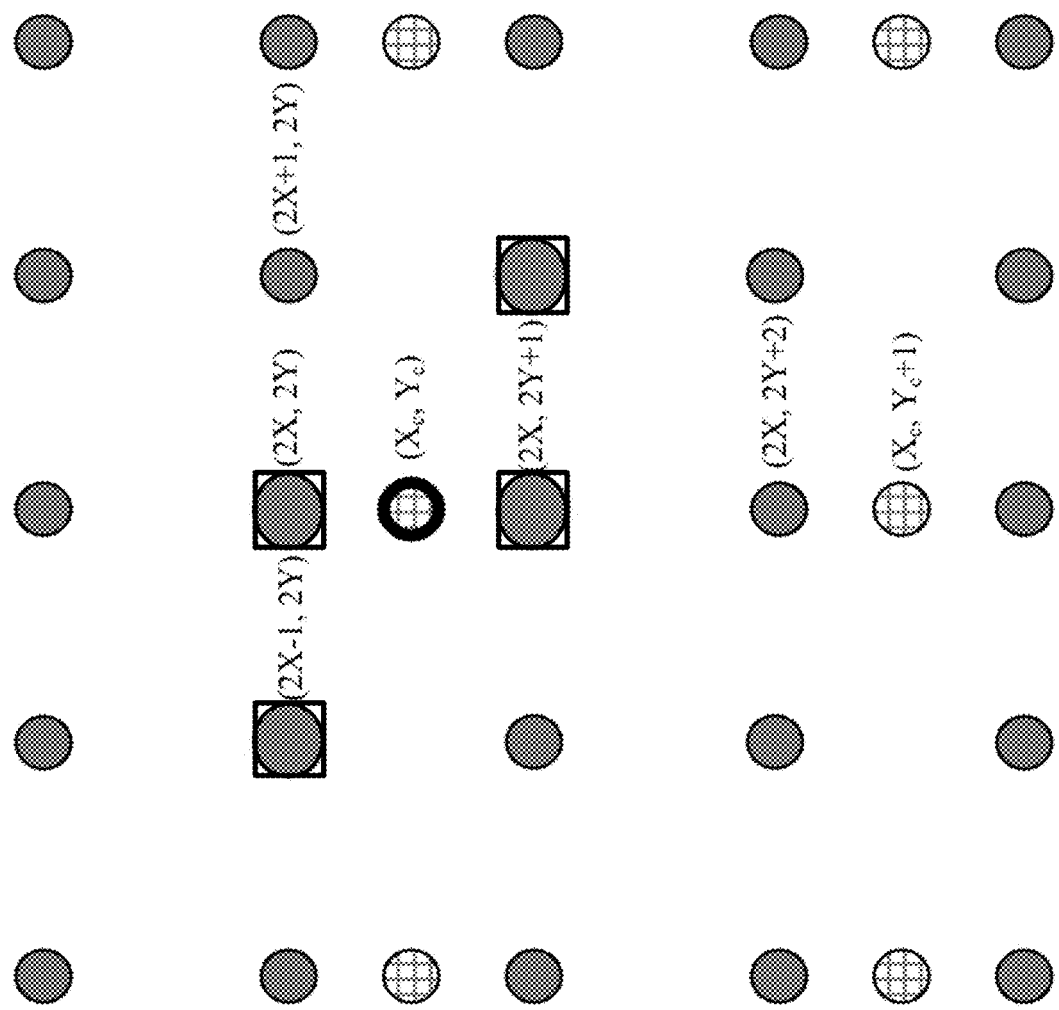

CROSS-COMPONENT ADAPTIVE FILTERING AND SUBBLOCK CODING

CROSS REFERENCE TO RELATED APPLICATIONS

This application is a continuation of International Patent Application No. PCT/CN2020/132003, filed on Nov. 27, 2020, which claims the priority to and benefits of International Patent Application No. PCT/CN2019/122237, filed on Nov. 30, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform cross-component adaptive loop filtering during video encoding or decoding.

In an example aspect, a method of video processing is disclosed. The method includes performing a conversion between a video block of a video component of a video and a bitstream representation of the video, wherein the video block comprises sub-blocks, wherein a filtering tool is used during the conversion according to a rule, and wherein the rule specifies that the filtering tool is applied by using a single offset for all samples of each sub-block of the video block.

In another example aspect, a method of video processing is disclosed. The method includes performing a conversion between a video block of a video component of a video and a bitstream representation of the video by using a final offset value for a current sample of a sub-block of the video block for filtering tool applied during the conversion, wherein filtering tool is applied by using the final offset value for the current sample, and wherein the final offset value is based on a first offset value and a second offset value that is different from the first offset value.

In another example aspect, a method of video processing is disclosed. The method includes performing a conversion between a video block of a video component of a video and a bitstream representation of the video by using an N-tap symmetric filter for a cross-component adaptive loop filter (CC-ALF) tool during the conversion, wherein the CC-ALF tool predicts sample values of the video block of the video component from sample values of another video component of the video, and wherein at least two filter coefficients for two samples within a support of the N-tap symmetric filter share a same value.

In another example aspect, a method of video processing is disclosed. The method includes performing for a conversion between a video block of a video component of a video and a bitstream representation of the video by using an N-tap asymmetric filter for a cross-component adaptive loop filter (CC-ALF) tool during the conversion, wherein N is a positive integer, and wherein the CC-ALF tool predicts sample values of the video block of the video component from sample values of another video component of the video.

In another example aspect, a method of video processing is disclosed. The method includes performing a conversion between a video block of a first video component of a video and a bitstream representation of the video, wherein the conversion of a sample of the first video component includes applying a cross-component adaptive loop filter (CC-ALF) tool on sample differences of a second video component of the video, and wherein the CC-ALF tool predicts sample values of the video block of the first video component of the video from sample values of another video component of the video.

In another example aspect, a method of video processing is disclosed. The method includes performing a conversion between a sub-block of a video block of a video component of a video and a bitstream representation of the video by using two or more filters from a set of multiple filters for a cross-component adaptive loop filtering (CC-ALF) tool during the conversion, wherein the CC-ALF tool predicts sample values of the sub-block of the video block of the video component from sample values of another video component of the video.

In another example aspect, a method of video processing is disclosed. The method includes performing for a conversion between a sub-block of a video block of a first video component of a video and a bitstream representation of the video by using a filter having support across multiple video components of the video for a cross-component adaptive loop filtering (CC-ALF) tool used during the conversion, wherein the CC-ALF tool predicts sample values of the sub-block of the video block of the first video component from sample values of another video component of the video.

In another example aspect, a method of video processing is disclosed. The method includes performing a conversion between a video block of a video component of a video and a bitstream representation of the video by using samples in multiple video frames to refine a set of samples in a current video frame of the video in a cross-component adaptive loop filter (CC-ALF) tool or an adaptive loop filter (ALF) tool applied during the conversion, wherein the CC-ALF tool predicts sample values of the video block of the video component from sample values of another video component of the video, and wherein the ALF tool filters samples of the video block of the video component using a loop filter.

In another example aspect, a method of video processing is disclosed. The method includes determining, for a conversion between a video block of a video component of a video and a bitstream representation of the video, whether a cross-component adaptive loop filter (CC-ALF) tool is enabled for the conversion according to a position rule, wherein the CC-ALF tool predicts sample values of the video block of the video component from sample values of another video component of the video; and performing the conversion based on the determining.

In another example aspect, a method of video processing is disclosed. The method includes determining, for a conversion between a video unit of a component of a video and a bitstream representation of the video, to use an offset value for cross-component adaptive loop filtering of all samples of a sub-block of the video unit; and performing the conversion based on the determining, wherein the offset is also used for another processing operation in the conversion including one or more of an adaptive loop filtering operation.

In another example aspect, a method of video processing is disclosed. The method includes determining, for a conversion between a video unit of a component of a video and a bitstream representation of the video, to use a final offset value for a current sample of a sub-block of the video unit for cross-component adaptive loop filtering during the conversion; and performing the conversion based on the determining; wherein the final offset value is based on a first offset value and a second offset value that is different from the first offset value.

In another example aspect, a method of video processing is disclosed. The method includes determining, for a conversion between a video unit of a component of a video and a bitstream representation of the video, to use an N-tap symmetric filter for a cross-component adaptive loop filter computation during the conversion; and performing the conversion based on the determining wherein at least two filter coefficients for two samples with a support of the N-tap symmetric filter share a same value.

In another example aspect, a method of video processing is disclosed. The method includes determining, for a conversion between a video unit of a component of a video and a bitstream representation of the video, to use an N-tap asymmetric filter for a cross-component adaptive loop filter computation during the conversion, where N is a positive integer; and performing the conversion based on the determining.

In another example aspect, a method of video processing is disclosed. The method includes performing a conversion between a video unit of a first component of a video and a bitstream representation of the video; wherein the conversion of a sample of the first component includes applying a cross-component adaptive loop filter on sample differences of a second component of the video.

In another example aspect, a method of video processing is disclosed. The method includes determining to use two or more filters from a set of multiple filters for a cross-component adaptive loop filtering during a conversion between a sub-block of a video unit of a component of video and a bitstream representation of the video; and performing the conversion based on the determining.

In another example aspect, a method of video processing is disclosed. The method includes determining, for a conversion between a sub-block of a first component of a video unit of a video and a bitstream representation of the video, a filter having support across multiple components of the video or across multiple pictures of the video for performing a cross-component adaptive loop filtering during the conversion; and performing the conversion based on the determining.

In another example aspect, a method of video processing is disclosed. The method includes determining, for a conversion between a sub-block of a video unit of a component of a video and a bitstream representation of the video, whether a cross-component adaptive loop filter (CC-ALF) is enabled for the conversion according to a position rule; and performing the conversion based on the determining.

In yet another example aspect, a video encoder apparatus is disclosed. The video encoder comprises a processor configured to implement above-described methods.

In yet another example aspect, a video encoder apparatus is disclosed. The video encoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 6 shows an example of dividing a block of 4×8 samples into two independently decodable areas.

FIG. 7 shows an example order of processing of the rows of pixels to maximize throughput for 4×N blocks with vertical predictor.

FIG. 10A-10D show shows examples of Subsampled Laplacian calculation. FIG. 10A shows subsampled positions for vertical gradient. FIG. 10B shows Subsampled positions for horizontal gradient. FIG. 10C shows subsampled positions for diagonal gradient. FIG. 10D shows sub sampled positions for diagonal gradient.

FIG. 13A shows an example placement of CC-ALF with respect to other loop filters. FIG. 13B shows an example of a diamond shaped filter.

DETAILED DESCRIPTION

Figure 1:
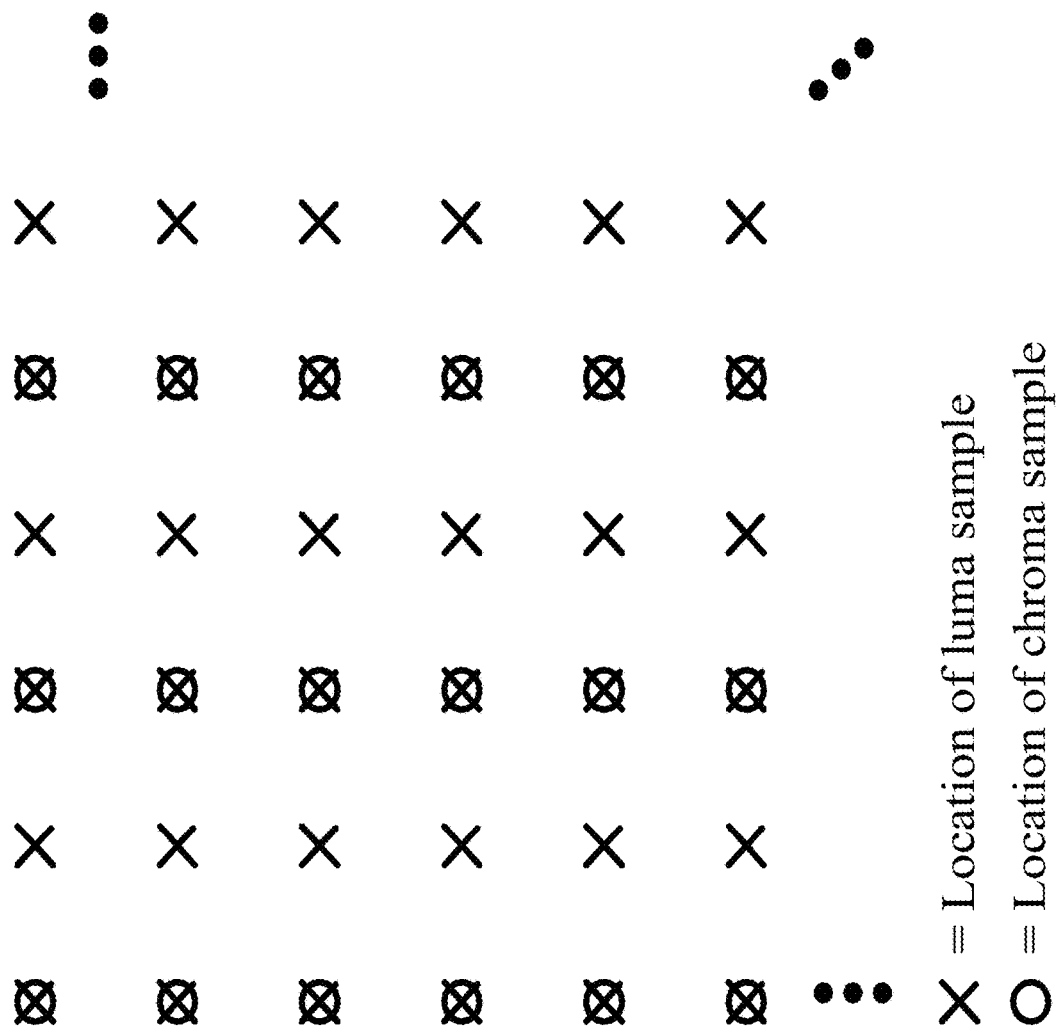
FIG. 1 shows nominal vertical and horizontal locations of 4:2:2 luma and chroma samples in a picture.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec designs also.

1. Introduction

This document is related to video coding technologies. Specifically, it is related cross component adaptive loop filter (CC-ALF) and other coding tools in image/video coding. It may be applied to the existing video coding standard like HEVC, or the standard (Versatile Video Coding) to be finalized. It may be also applicable to future video coding standards or video codec.

2. Brief Description

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at: http://phenix.it-sudparis.eu/jvet/doc_end_user/documents/16_Geneva/wg11/JVET-P2001-v14.zip The latest reference software of VVC, named VTM, could be found at: https://vcgit.hhi.fraunhofer.de/jvet/VVCSoftware_VTM/-/tags/VTM-7.0

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries. Chroma sub sampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 1 in VVC working draft.

FIG. 1 shows nominal vertical and horizontal locations of 4:2:2 luma and chroma samples in a picture.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 2-1

SubWidthC andSubHeightC values derived from chroma_format_idc and separate_colour_plane_flag

| chroma_format_idc | separate_colour_plane_flag | Chroma format | SubWidthC | SubHeightC |
| --- | --- | --- | --- | --- |
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

2.2. Coding Flow of a Typical Video Codec

Figure 2:
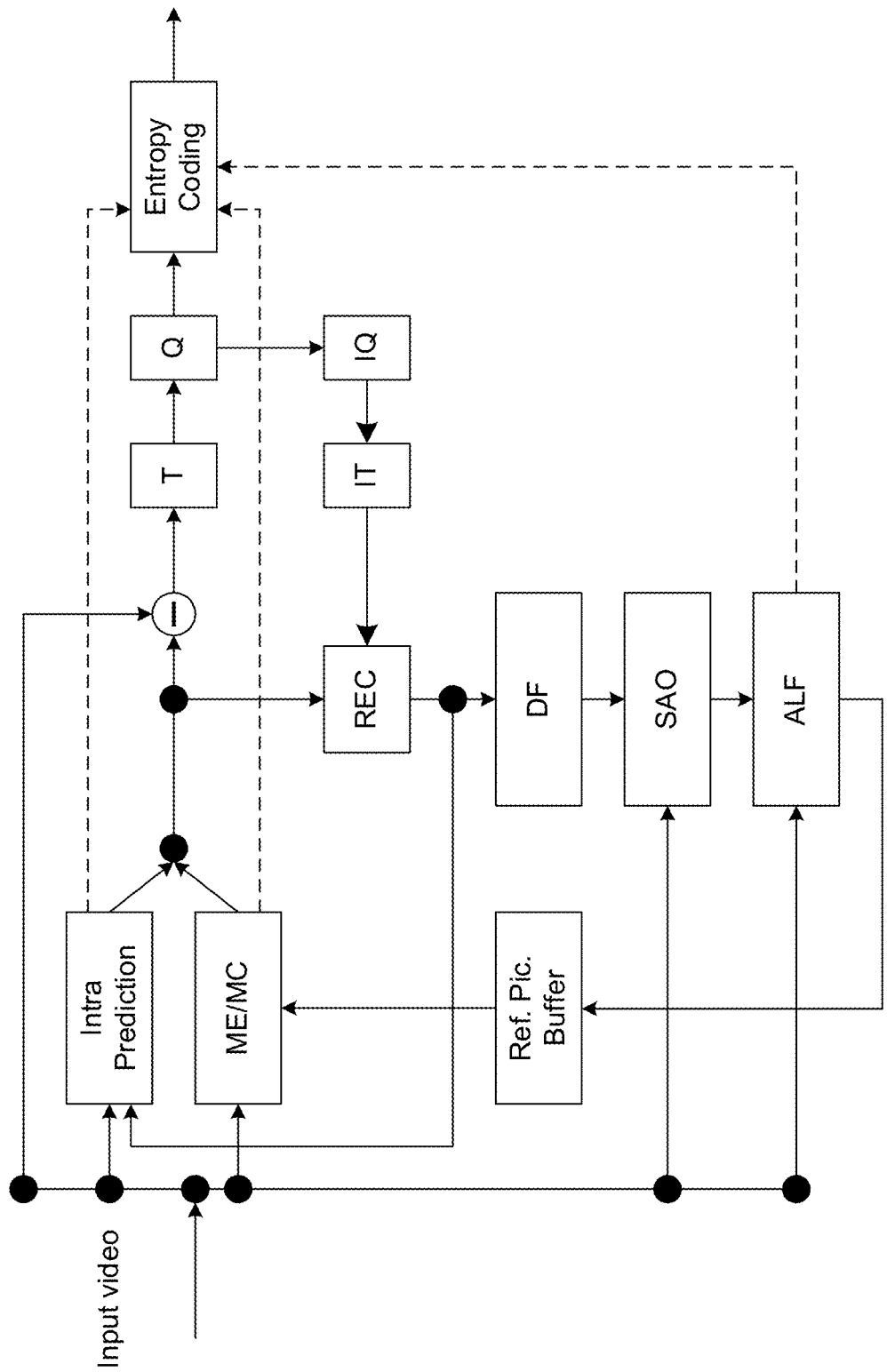
FIG. 2 shows an example of encoder block diagram.

FIG. 2 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3. Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 3, and the planar and DC modes remain the same. These denser directional intra prediction modes apply for all block sizes and for both luma and chroma intra predictions.

Figure 3:
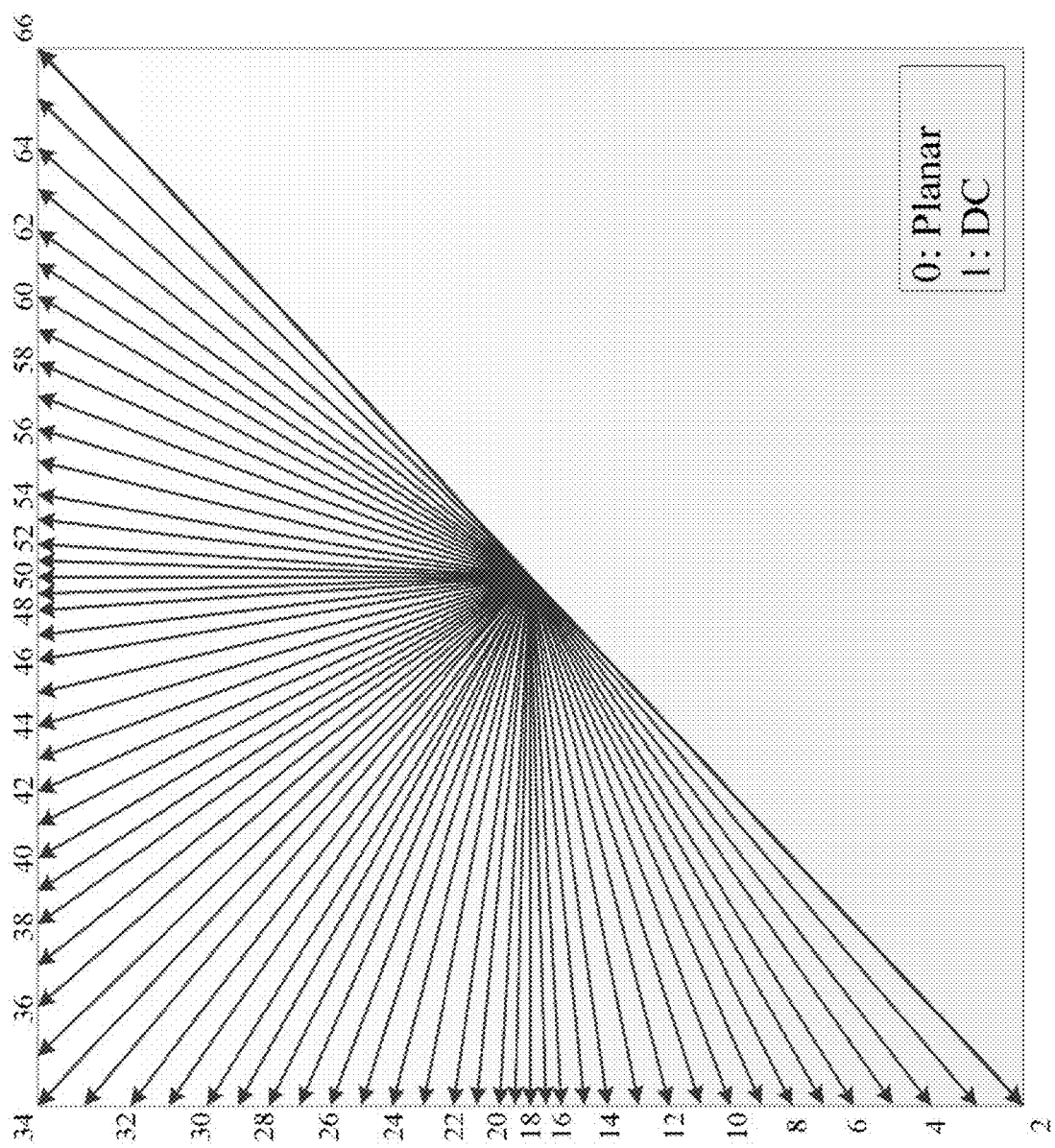
FIG. 3 shows 67 intra prediction modes
Figures 4A, 4B:
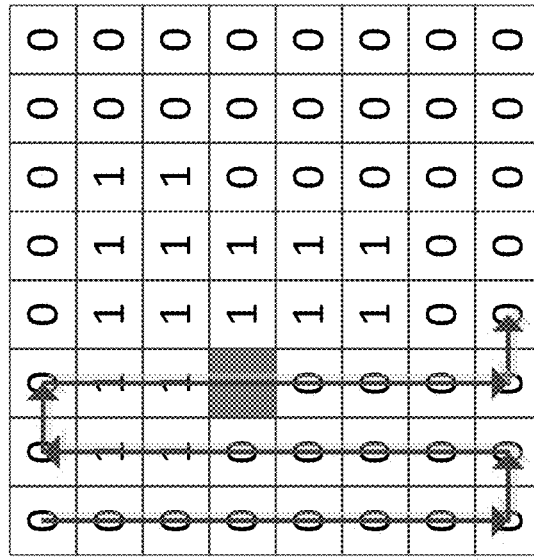
FIG. 4A-4B show examples of horizontal and vertical traverse scans.

Conventional angular intra prediction directions are defined from 45 degrees to −135 degrees in clockwise direction as shown in FIG. 3. In VTM, several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.4. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.5. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signalled as IBC AMVP mode or IBC skip/merge mode as follows:

IBC skip/merge mode: a merge candidate index is used to indicate which of the block vectors in the list from neighbouring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.6. Palette Mode

For palette mode signalling, the palette mode is coded as a prediction mode for a coding unit, i.e., the prediction modes for a coding unit can be MODE_INTRA, MODE_INTER, MODE_IBC and MODE_PLT. If the palette mode is utilized, the pixels values in the CU are represented by a small set of representative colour values. The set is referred to as the palette. For pixels with values close to the palette colors, the palette indices are signalled. For pixels with values outside the palette, the pixel is denoted with an escape symbol and the quantized pixel values are signalled directly.

To decode a palette encoded block, the decoder needs to decode palette colors and indices. Palette colors are described by a palette table and encoded by palette table coding tools. An escape flag is signalled for each CU to indicate if escape symbols are present in the current CU. If escape symbols are present, the palette table is augmented by one and the last index is assigned to the escape mode. Palette indices of all pixels in a CU form a palette index map and are encoded by palette index map coding tools.

For coding of the palette table, a palette predictor is maintained. The predictor is initialized at the beginning of each slice where predictor is reset to 0. For each entry in the palette predictor, a reuse flag is signalled to indicate whether it is part of the current palette. The reuse flags are sent using run-length coding of zeros. After this, the number of new palette entries are signalled using exponential Golomb code of order 0. Finally, the component values for the new palette entries are signalled. After encoding the current CU, the palette predictor will be updated using the current palette, and entries from the previous palette predictor which are not reused in the current palette will be added at the end of new palette predictor until the maximum size allowed is reached (palette stuffing).

For coding the palette index map, the indices are coded using horizontal and vertical traverse scans as shown in FIG.

4. The scan order is explicitly signalled in the bitstream using the palette_transpose_flag.

The palette indices are coded using two main palette sample modes: 'INDEX' and 'COPY_ABOVE'. The mode is signalled using a flag except for the top row when horizontal scan is used, the first column when the vertical scan is used, or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number pixels that are coded using the same mode.

The encoding order for index map is as follows: First, the number of index values for the CU is signalled. This is followed by signalling of the actual index values for the entire CU using truncated binary coding. Both the number of indices as well as the index values are coded in bypass mode. This groups the index-related bypass bins together. Then the palette mode (INDEX or COPY_ABOVE) and run are signalled in an interleaved manner. Finally, the component escape values corresponding to the escape samples for the entire CU are grouped together and coded in bypass mode. An additional syntax element, last_run_type_flag, is signalled after signalling the index values. This syntax element, in conjunction with the number of indices, eliminates the need to signal the run value corresponding to the last run in the block.

In VTM, dual tree is enabled for I slice which separate the coding unit partitioning for Luma and Chroma. Hence, in this proposal, palette is applied on Luma (Y component) and Chroma (Cb and Cr components) separately. If dual tree is disabled, palette will be applied on Y, Cb, Cr components jointly, same as in HEVC palette.

2.7. Cross-Component Linear Model Prediction

A cross-component linear model (CCLM) prediction mode is used in the VVC, for which the chroma samples are predicted based on the reconstructed luma samples of the same CU by using a linear model as follows:

$$\text{pred}_C(i,j) = \alpha \cdot \text{rec}_L'(i,j) + \beta \qquad (2\text{-}1)$$

where $\text{pred}_C(i,j)$ represents the predicted chroma samples in a CU and $\text{rec}_L(i,j)$ represents the downsampled reconstructed luma samples of the same CU.

Figure 5:
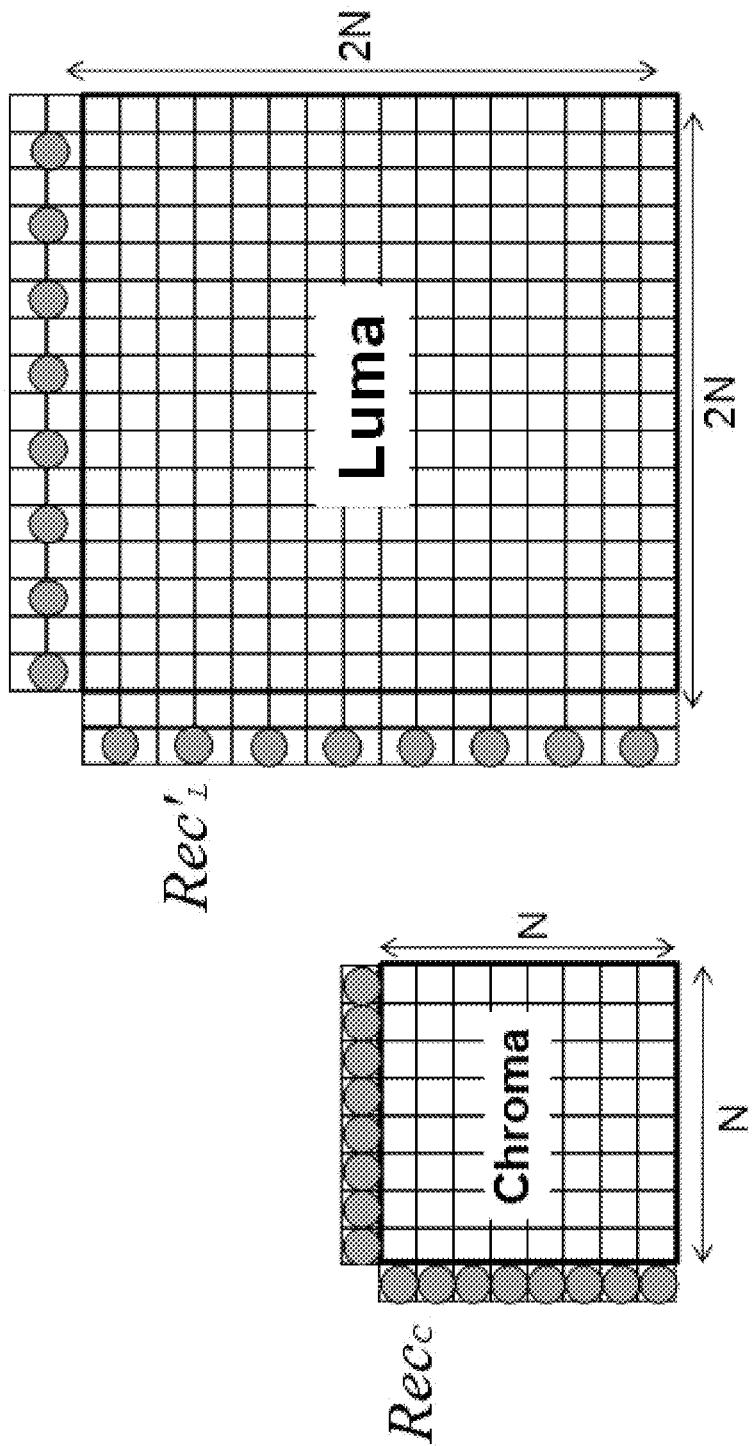
FIG. 5 shows an example of the location of the left and above samples and the sample of the current block involved in the LM mode.

FIG. 5 shows example locations of the samples used for the derivation of $\alpha$ and $\beta$ Besides the above template and left template can be used to calculate the linear model coefficients together in LM mode, they also can be used alternatively in the other 2 LM modes, called LM_A, and LM_L modes. In LM_A mode, only the above template is used to calculate the linear model coefficients. To get more samples, the above template is extended to (W+H). In LM_L mode, only left template is used to calculate the linear model coefficients. To get more samples, the left template is extended to (H+W). For a non-square block, the above template is extended to W+W, the left template is extended to H+H.

The CCLM parameters ($\alpha$ and $\beta$) are derived with at most four neighbouring chroma samples and their corresponding down-sampled luma samples. Suppose the current chroma block dimensions are W×H, then W' and H' are set as W'=W, H'=H when LM mode is applied;
W'=W+H when LM-A mode is applied;
H'=H+W when LM-L mode is applied;

The above neighbouring positions are denoted as S[0, −1] . . . S[W'−1, −1] and the left neighbouring positions are denoted as S[−1, 0] . . . S[−1, H'−1]. Then the four samples are selected as S[W'/4, −1], S[3 W'/4, −1], S[−1, H'/4], S[−1, 3H'/4] when LM mode is applied and both above and left neighbouring samples are available;

S[W'/8, −1], S[3 W'/8, −1], S[5 W'/8, −1], S[7 W'/8, −1] when LM-A mode is applied or only the above neighbouring samples are available;

S[−1, H'/8], S[−1, 3H'/8], S[−1, 5H'/8], S[−1, 7H'/8] when LM-L mode is applied or only the left neighbouring samples are available;

The four neighbouring luma samples at the selected positions are down-sampled and compared four times to find two smaller values: $x^0_A$ and $x^1_A$, and two larger values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$X_a = (x^0_A + x^1_A + 1) \gg 1; X_b = (x^0_B + x^1_B + 1) \gg 1; Y_a = (y^0_A + y^1_A + 1) \gg 1; Y_b = (y^0_B + y^1_B + 1) \gg 1 \qquad (2\text{-}2)$$

Finally, the linear model parameters $\alpha$ and $\beta$ are obtained according to the following equations.

$$\alpha = \frac{Y_a - Y_b}{X_a - X_b} \qquad (2\text{-}3)$$

$$\beta = Y_b - \alpha \cdot X_b \qquad (2\text{-}4)$$

The division operation to calculate parameter $\alpha$ is implemented with a look-up table. To reduce the memory required for storing the table, the diff value (difference between maximum and minimum values) and the parameter $\alpha$ are expressed by an exponential notation. For example, diff is approximated with a 4-bit significant part and an exponent. Consequently, the table for 1/diff is reduced into 16 elements for 16 values of the significand as follows:

$$\text{DivTable[ ]} = \{0,7,6,5,5,4,4,3,3,2,2,1,1,1,1,0\} \qquad (2\text{-}5)$$

This would have a benefit of both reducing the complexity of the calculation as well as the memory size required for storing the needed tables.

To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively.

$$\text{rec}_L'(i,j) = \begin{bmatrix} \text{rec}_L(2i-1, 2j-1) + 2 \cdot \text{rec}_L(2i-1, 2j-1) + \\ \text{rec}_L(2i+1, 2j-1) + \text{rec}_L(2i-1, 2j) + \\ 2 \cdot \text{rec}_L(2i, 2j) + \text{rec}_L(2i+1, 2j) + 4 \end{bmatrix} \gg 3 \qquad (2\text{-}6)$$

$$\text{rec}_L'(i,j) = \begin{bmatrix} \text{rec}_L(2i, 2j-1) + \text{rec}_L(2i-1, 2j) + \\ 4 \cdot \text{rec}_L(2i, 2j) + \text{rec}_L(2i+1, 2j) + \\ \text{rec}_L(2i, 2j+1) + 4 \end{bmatrix} \gg 3 \qquad (2\text{-}7)$$

Note that only one luma line (general line buffer in intra prediction) is used to make the downsampled luma samples when the upper reference line is at the CTU boundary.

This parameter computation is performed as part of the decoding process, and not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (LM, LM_A, and LM_L). Chroma mode signalling and derivation process are shown in Table 2-2. Chroma mode coding directly depends on the intra prediction mode of the corresponding luma block. Since separate block partitioning structure for luma and chroma components is enabled in I slices, one chroma block may correspond to multiple luma blocks.

Therefore, for Chroma DM mode, the intra prediction mode of the corresponding luma block covering the center position of the current chroma block is directly inherited.

TABLE 2-2

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.8. Block Differential Pulse-Code Modulation Coding (BDPCM)

BDPCM is proposed in JVET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal. When a block is divided, samples from one area are not allowed to use pixels from another area t compute the prediction: if this situation occurs, the prediction pixel is replaced by the reference pixel in the prediction direction. This is shown on FIG. 6 for different positions of current pixel X in a 4×8 block predicted vertically.

FIG. 6 shows an example of dividing a block of 4×8 samples into two independently decodable areas.

Thanks to this property, it becomes now possible to process a 4×4 block in 2 cycles, and a 4×8 or 8×4 block in 4 cycles, and so on, as shown on FIG. 7.

FIG. 7 shows an example order of processing of the rows of pixels to maximize throughput for 4×N blocks with vertical predictor.

Table 2-3 summarizes the number of cycles required to process the block, depending on the block size. It is trivial to show that any block which has both dimensions larger or equal to 8 can be processed in 8 pixels per cycle or more.

TABLE 2-3

Worst case throughput for blocks of size 4 × N, N × 4

| Block size | 4 × 4 | 4 × 8, 8 × 4 | 4 × 16, 16 × 4 | 4 × 32, 32 × 4 |
|---|---|---|---|---|
| Cycles | 2 | 4 | 8 | 16 |
| Pixels | 16 | 32 | 64 | 128 |
| Throughput (pixels/cycle) | 8 | 8 | 8 | 8 |

2.9. Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded. For a block of size M (rows)×N (cols), let $r_{i,j}$, $0 \le i \le M-1$, $0 \le j \le N-1$ be the prediction residual after performing intra prediction horizontally (copying left neighbour pixel value across the predicted block line by line) or vertically (copying top neighbour line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad (2\text{-}8)$$

For horizontal prediction, similar rules apply, and the residual quantized samples are obtained by $$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad (2\text{-}9)$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}^{i} \tilde{r}_{k,j}, 0 \le i \le (M-1), 0 \le j \le (N-1). \quad (2\text{-}10)$$

For horizontal case, $$Q(r_{i,j}) = \Sigma_{k=0}^{j} \tilde{r}_{i,k}, 0 \le i \le (M-1), 0 \le j \le (N-1). \quad (2\text{-}11)$$

The invert quantized residuals, $Q^{-1}(Q(r_{i,j}))$, are added to the intra block prediction values to produce the reconstructed sample values.

The main benefit of this scheme is that the invert DPCM can be done on the fly during coefficientparsingsimplyaddingthepredictorasthecoefficientsareparsedoritcanbeperformed after parsing.

Transform skip is always used in quantized residual domain BDPCM.

2.10. Multiple Transform Set (MTS) in VVC

In VTM, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values. The VTM also supports configurable max transform size in SPS, such that encoder has the flexibility to choose up to 16-length, 32-length or 64-length transform size depending on the need of specific implementation. In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 2-4 shows the basis functions of the selected DST/DCT.

TABLE 2-4

Transform basis functions of DCT-II/VIII and DSTVII for N-point input

| Transform Type | Basis function $T_i(j)$, i, j = 0, 1, ..., N-1 |
| --- | --- |
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-5. Unified the transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT-2 and DST-7,
8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-5

Transform and signalling mapping table

| | | | Intra/inter | |
| --- | --- | --- | --- | --- |
| MTS_CU_flag | MTS_Hor_flag | MTS_Ver_flag | Horizontal | Vertical |
| 0 | | | DCT2 | |
| 1 | 0 | 0 | DST7 | DST7 |
| 1 | 0 | 1 | DCT8 | DST7 |
| 1 | 1 | 0 | DST7 | DCT8 |
| 1 | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32. Note that implicit MTS transform is set to DCT2 when LFNST or MIP is activated for the current CU. Also, the implicit MTS can be still enabled when MTS is enabled for inter coded blocks.

2.11. Low-Frequency Non-Separable Transform (LFNST)

Figure 8:
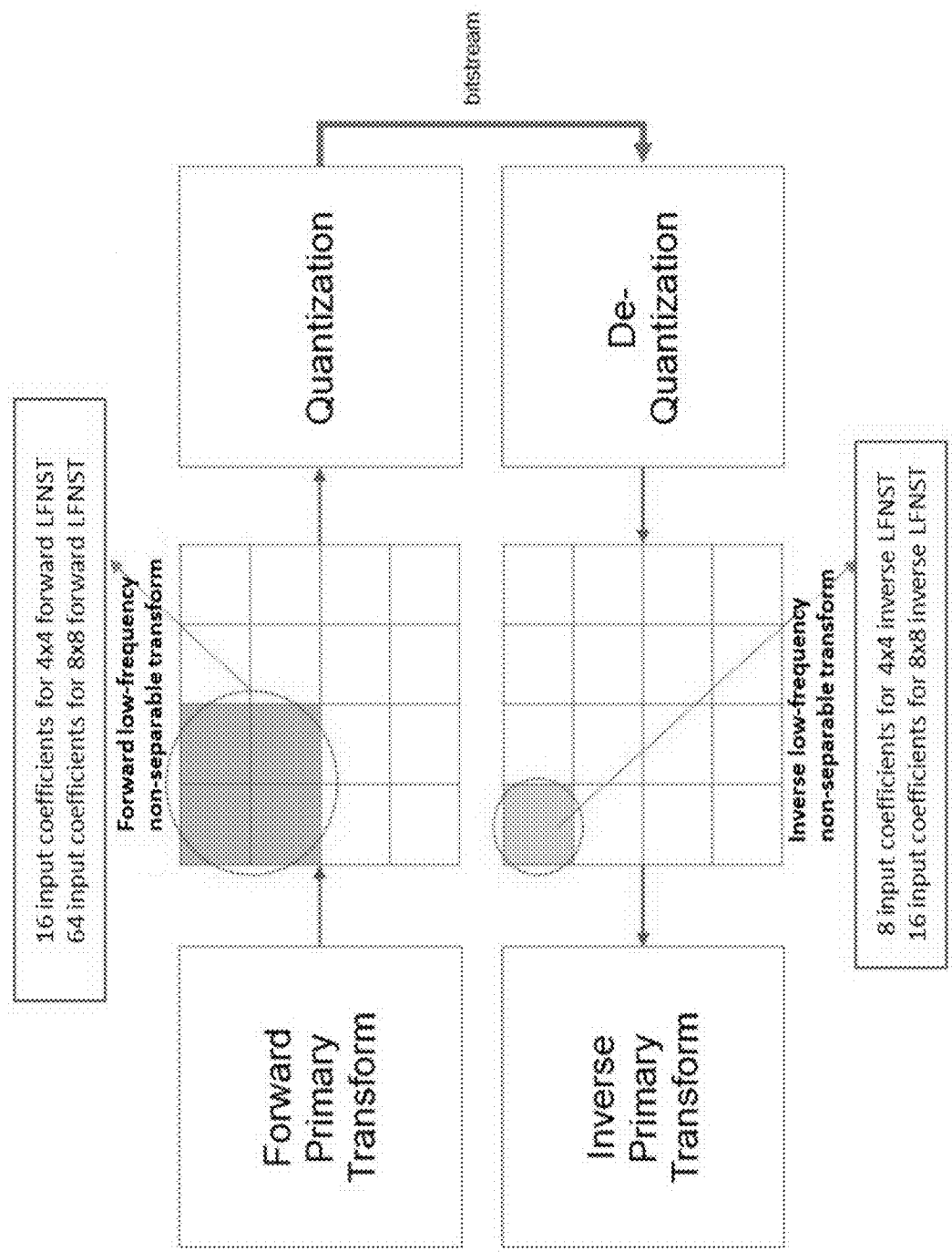
FIG. 8 is an example of a Low-Frequency Non-Separable Transform (LFNST) process.

In VVC, LFNST (low-frequency non-separable transform), which is known as reduced secondary transform, is applied between forward primary transform and quantization (at encoder) and between de-quantization and inverse primary transform (at decoder side) as shown in FIG. 8. In LFNST, 4×4 non-separable transform or 8×8 non-separable transform is applied according to block size. For example, 4×4 LFNST is applied for small blocks (i.e., min (width, height)<8) and 8×8 LFNST is applied for larger blocks (i.e., min (width, height)>4).

Application of a non-separable transform, which is being used in LFNST, is described as follows using input as an example. To apply 4×4 LFNST, the 4×4 input block X $$X = \begin{bmatrix} X_{00} & X_{01} & X_{02} & xX_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (2\text{-}12)$$

is first represented as a vector $\vec{X}$:

$$[X_{00}X_{01}X_{02}X_{03}X_{10}X_{11}X_{12}X_{13}X_{20}X_{21}X_{22}X_{23}X_{30}X_{31}X_{32}X_{33}]^T \quad (2\text{-}13)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

2.11.1. Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the transform coefficients. Hence, reduced non-separable transform (or RST) method is used in LFNST. The main idea of the reduced non-separable transform is to map an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix as follows:

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad (2\text{-}14)$$

where the R rows of the transform are R bases of the N dimensional space. The inverse transform matrix for RT is the transpose of its forward transform. For 8×8 LFNST, a reduction factor of 4 is applied, and 64×64 direct matrix, which is conventional 8×8 non-separable transform matrix size, is reduced to 16×48 direct matrix. Hence, the 48×16 inverse RST matrix is used at the decoder side to generate core (primary) transform coefficients in 8×8 top-left regions. When 16×48 matrices are applied instead of 16×64 with the same transform set configuration, each of which takes 48 input data from three 4×4 blocks in a top-left 8×8 block excluding right-bottom 4×4 block. With the help of the reduced dimension, memory usage for storing all LFNST matrices is reduced from 10 KB to 8 KB with reasonable performance drop. In order to reduce complexity LFNST is restricted to be applicable only if all coefficients outside the first coefficient sub-group are non-significant. Hence, all primary-only transform coefficients have to be zero when LFNST is applied. This allows a conditioning of the LFNST index signalling on the last-significant position, and hence avoids the extra coefficient scanning in the current LFNST design, which is needed for checking for significant coefficients at specific positions only. The worst-case handling of LFNST (in terms of multiplications per pixel) restricts the non-separable transforms for 4×4 and 8×8 blocks to 8×16 and 8×48 transforms, respectively. In those cases, the last-significant scan position has to be less than 8 when LFNST is applied, for other sizes less than 16. For blocks with a shape of 4×N and N×4 and N>8, the proposed restriction implies that the LFNST is now applied only once, and that to the top-left 4×4 region only. As all primary-only coefficients are zero when LFNST is applied, the number of operations needed for the primary transforms is reduced in such cases. From encoder perspective, the quantization of coefficients is remarkably simplified when LFNST transforms are tested. A rate-distortion optimized quantization has to be done at maximum for the first 16 coefficients (in scan order), the remaining coefficients are enforced to be zero.

2.11.2. LFNST Transform Selection

There are totally 4 transform sets and 2 non-separable transform matrices (kernels) per transform set are used in LFNST. The mapping from the intra prediction mode to the transform set is pre-defined as shown in Table 2-6. If one of three CCLM modes (INTRA_LT_CCLM, INTRA_T_CCLM or INTRA_L_CCLM) is used for the current block (81<=predModeIntra<=83), transform set 0 is selected for the current chroma block. For each transform set, the selected non-separable secondary transform candidate is further specified by the explicitly signalled LFNST index. The index is signalled in a bit-stream once per Intra CU after transform coefficients.

TABLE 2-6

Transform selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

2.11.3. LFNST Index Signalling and Interaction with Other Tools

Since LFNST is restricted to be applicable only if all coefficients outside the first coefficient sub-group are non-significant, LFNST index coding depends on the position of the last significant coefficient. In addition, the LFNST index is context coded but does not depend on intra prediction mode, and only the first bin is context coded. Furthermore, LFNST is applied for intra CU in both intra and inter slices, and for both Luma and Chroma. If a dual tree is enabled, LFNST indices for Luma and Chroma are signalled separately. For inter slice (the dual tree is disabled), a single LFNST index is signalled and used for both Luma and Chroma.

When ISP mode is selected, LFNST is disabled and RST index is not signalled, because performance improvement was marginal even if RST is applied to every feasible partition block. Furthermore, disabling RST for ISP-predicted residual could reduce encoding complexity. LFNST is also disabled and the index is not signalled when MIP mode is selected.

Considering that a large CU greater than 64×64 is implicitly split (TU tiling) due to the existing maximum transform size restriction (64×64), an LFNST index search could increase data buffering by four times for a certain number of decode pipeline stages. Therefore, the maximum size that LFNST is allowed is restricted to 64×64. Note that LFNST is enabled with DCT2 only.

2.12. Transform Skip for Chroma

Chroma transform skip (TS) is introduced in VVC. The motivation is to unify TS and MTS signalling between luma and chroma by relocating transform_skip_flag and mts_idx into residual_coding part. One context model is added for chroma TS. No context model and no binarization are changed for the mts_idx. In addition, TS residual coding is also applied when chroma TS is used.

Semantics

Terms that are deleted are indicated by underlined italicized text.

transform_skip_flag[x0][y0][cIdx] specifies whether a transform is applied to the associated luma transform block or not. The array indices x0, y0 specify the location (x0, y0) of the top-left luma sample of the considered transform block relative to the top-left luma sample of the picture. transform_skip_flag[x0][y0][cIdx] equal to 1 specifies that no transform is applied to the current luma transform block. The array index cIdx specifies an indicator for the colour component; it is equal to 0 for luma, equal to 1 for Cb and equal to 2 for Cr. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

2.13. BDPCM for Chroma

In addition to chroma TS support, BDPCM is added to chroma components. If sps_bdpcm_enable_flag is 1, a further syntax element sps_bdpcm_chroma_enable_flag is added to the SPS. The flags have the following behaviour, as indicated in Table 2-7.

TABLE 2-7 sps flags for luma and chroma BDPCM

| sps_bdpcm_enable_flag | sps_bdpcm_chroma_enable_flag | behaviour |
|---|---|---|
| 0 | not written | BPDCM is not used in the sequence |
| 1 | 0 | BDPCM is available for luma only |
| 1 | 1 | BDPCM is available for luma and chroma |

When BDPCM is available for luma only, the current behaviour is unchanged. When BDPCM is also available for chroma, a bdpcm_chroma_flag is sent for each chroma block. This indicates whether BDPCM is used on the chroma blocks. When it is on, BDPCM is used for both chroma components, and an additional bdpcm_dir_chroma flag is coded, indicating the prediction direction used for both chroma components.

The deblocking filter is de-activated on a border between two Block-DPCM blocks, since neither of the blocks uses the transform stage usually responsible for blocking artifacts. This deactivation happens independently for luma and chroma components.

2.14. ALF

In VVC, an Adaptive Loop Filter (ALF) with block-based filter adaption is applied. For the luma component, one among 25 filters is selected for each 4×4 block, based on the direction and activity of local gradients.

2.14.1. Filter Shape

Figure 9:
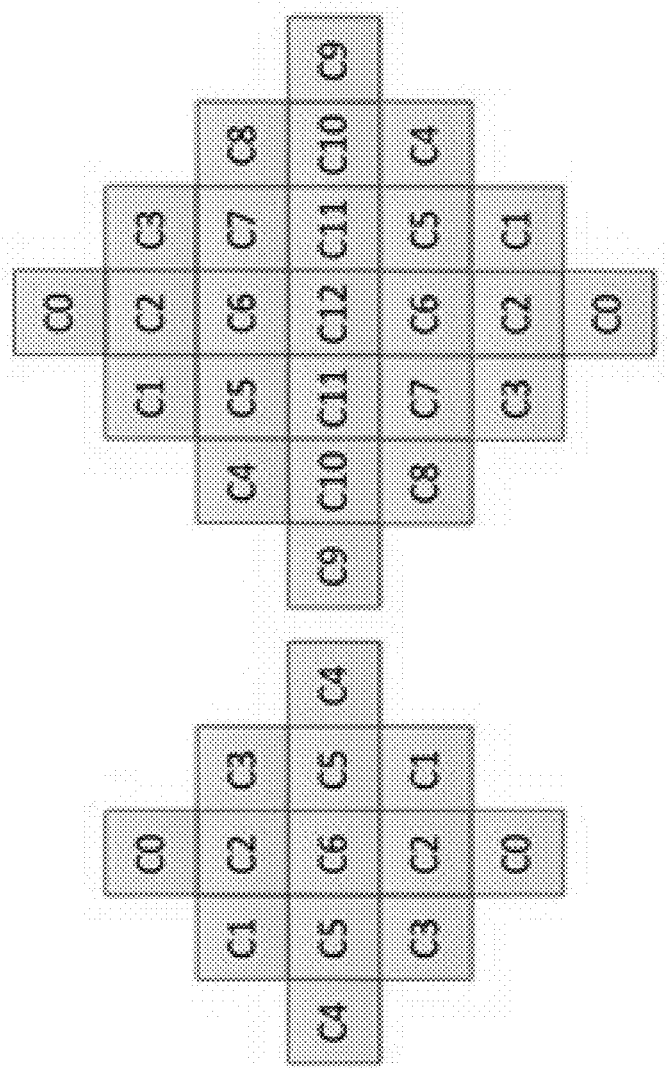
FIG. 9 shows example of ALF filter shapes (chroma: 5×5 diamond, luma: 7×7 diamond).

Two diamond filter shapes (as shown in FIG. 9 are used. The 7×7 diamond shape is applied for luma component and the 5×5 diamond shape is applied for chroma components.

2.14.2. Block Classification

For luma component, each 4×4 block is categorized into one out of 25 classes. The classification index C is derived based on its directionality D and a quantized value of activity Â, as follows:

$$C=5D+\hat{A} \qquad (2\text{-}15)$$

To calculate D and Â, gradients of the horizontal, vertical and two diagonal direction are first calculated using 1-D Laplacian:

$$g_v=\Sigma_{k=i-2}^{i+3}\Sigma_{l=j-2}^{j+3}V_{k,l}, V_{k,l}=|2R(k,l)-R(k,l-1)-R(k,l+1)| \qquad (2\text{-}16)$$

$$g_h=\Sigma_{k=i-2}^{i+3}\Sigma_{l=j-2}^{j+3}H_{k,l}, H_{k,l}=|2R(k,l)-R(k,l-1)-R(k,1+l)| \qquad (2\text{-}17)$$

$$g_{d1}=\Sigma_{k=i-2}^{i+3}\Sigma_{l=j-2}^{j+3}D1_{k,l}, D1_{k,l}=|2R(k,l)-R(k-1,l-1)-R(k+1,l+1)| \qquad (2\text{-}18)$$

$$g_{d2}=\Sigma_{k=i-2}^{i+3}\Sigma_{l=j-2}^{j+3}D2_{k,l}, D2_{k,l}=|2R(k,l)-R(k-1,l+1)-R(k+1,l-1)| \qquad (2\text{-}19)$$

Where indices i and j refer to the coordinates of the upper left sample within the 4×4 block and R(i,j) indicates a reconstructed sample at coordinate (i, j).

To reduce the complexity of block classification, the subsampled 1-D Laplacian calculation is applied. As shown in FIG. 10A-10D, the same subsampled positions are used for gradient calculation of all directions.

Figures 10A, 10B, 10C, 10D:
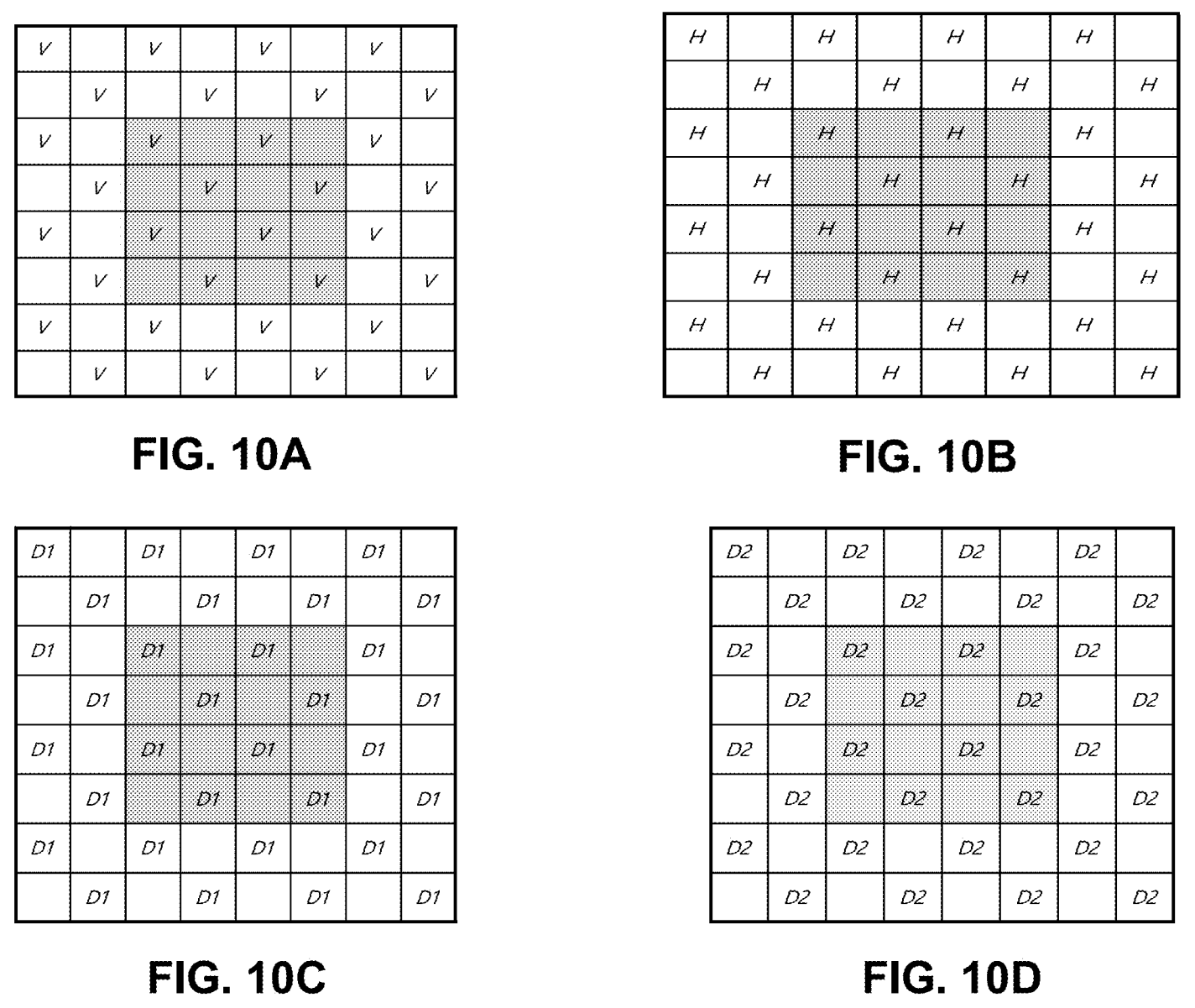

FIG. 10A shows Subsampled positions for vertical gradient. FIG. 10B shows Subsampled positions for horizontal gradient. FIG. 10C shows subsampled positions for diagonal gradient. FIG. 10D shows subsampled positions for diagonal gradient.

Then D maximum and minimum values of the gradients of horizontal and vertical directions are set as:

$$g_{h,v}^{max}=\max(g_h,g_v), g_{h,v}^{min}=\min(g_h,g_v) \qquad (2\text{-}20)$$

The maximum and minimum values of the gradient of two diagonal directions are set as:

$$g_{d0,d1}^{max}=\max(g_{d0},g_{d1}), g_{d0,d1}^{min}=\min(g_{d0},g_{d1}) \qquad (2\text{-}21)$$

To derive the value of the directionality D, these values are compared against each other and with two thresholds $t_1$ and $t_2$:

Step 1. If both $g_{h,v}^{max} \le t_1 \cdot g_{h,v}^{min}$ and $g_{d0,d1}^{max} \le t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A=\Sigma_{k=i-2}^{i+3}\Sigma_{l=j-2}^{j+3}(V_{k,l}+H_{k,l}) \qquad (2\text{-}22)$$

A is further quantized to the range of 0 to 4, inclusively, and the quantized value is denoted as Â.

For chroma components in a picture, no classification method is applied, i.e. a single set of ALF coefficients is applied for each chroma component.

2.14.3. Geometric Transformations of Filter Coefficients and Clipping Values

Before filtering each 4×4 luma block, geometric transformations such as rotation or diagonal and vertical flipping are applied to the filter coefficients f(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k,l)=f(l,k), c_D(k,l)=c(l,k), \qquad (2\text{-}23)$$

$$\text{Vertical flip: } f_V(k,l)=f(k,K-l-1), c_V(k,l)=c(k,K-l-1) \qquad (2\text{-}24)$$

$$\text{Rotation: } f_R(k,l)=f(K-l-1,k), c_R(k,l)=c(K-l-1,k) \qquad (2\text{-}25)$$

where K is the size of the filter and $0 \le k$, $l \le K-1$ are coefficients coordinates, such that location (0,0) is at the upper left corner and location (K−1, K−1) is at the lower right corner. The transformations are applied to the filter coefficients f(k, l) and to the clipping values c(k, l) depending on gradient values calculated for that block. The relationship between the transformation and the four gradients of the four directions are summarized in the following table.

TABLE 2-8

Mapping of the gradient calculated
for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.14.4. Filter Parameters Signalling

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a table of clipping values for both luma and Chroma components. These clipping values are dependent of the internal bitdepth. More precisely, the clipping values are obtained by the following formula:

$$\text{AlfClip} = \{\text{round}(2^{B-\alpha * n}) \text{ for } n \in [0 \ldots N-1]\} \quad (2\text{-}26)$$

with B equal to the internal bitdepth, a is a pre-defined constant value equal to 2.35, and N equal to 4 which is the number of allowed clipping values in VVC.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7 - 1$, inclusive. The central position coefficient is not signalled in the bitstream and is considered as equal to 128.

2.14.5. Filtering Process

At decoder side, when ALF is enabled for a CTB, each sample $R(i,j)$ within the CU is filtered, resulting in sample value $R'(i,j)$ as shown below, $$R'(i,j) = R(i,j) + ((\Sigma_{k \neq 0} \Sigma_{l \neq 0} f(k,l) \times K(R(i+k,j+l) - R(i,j), c(k,l)) + 64) << 7) \quad (2\text{-}27)$$

where $f(k, l)$ denotes the decoded filter coefficients, $K(x, y)$ is the clipping function and $c(k, l)$ denotes the decoded clipping parameters. The variable k and l varies between $-L/2$ and $L/2$ where L denotes the filter length. The clipping function $K(x, y) = \min(y, \max(-y, x))$ which corresponds to the function Clip3 $(-y, y, x)$.

2.14.6. Virtual Boundary Filtering Process for Line Buffer Reduction

Figure 11:
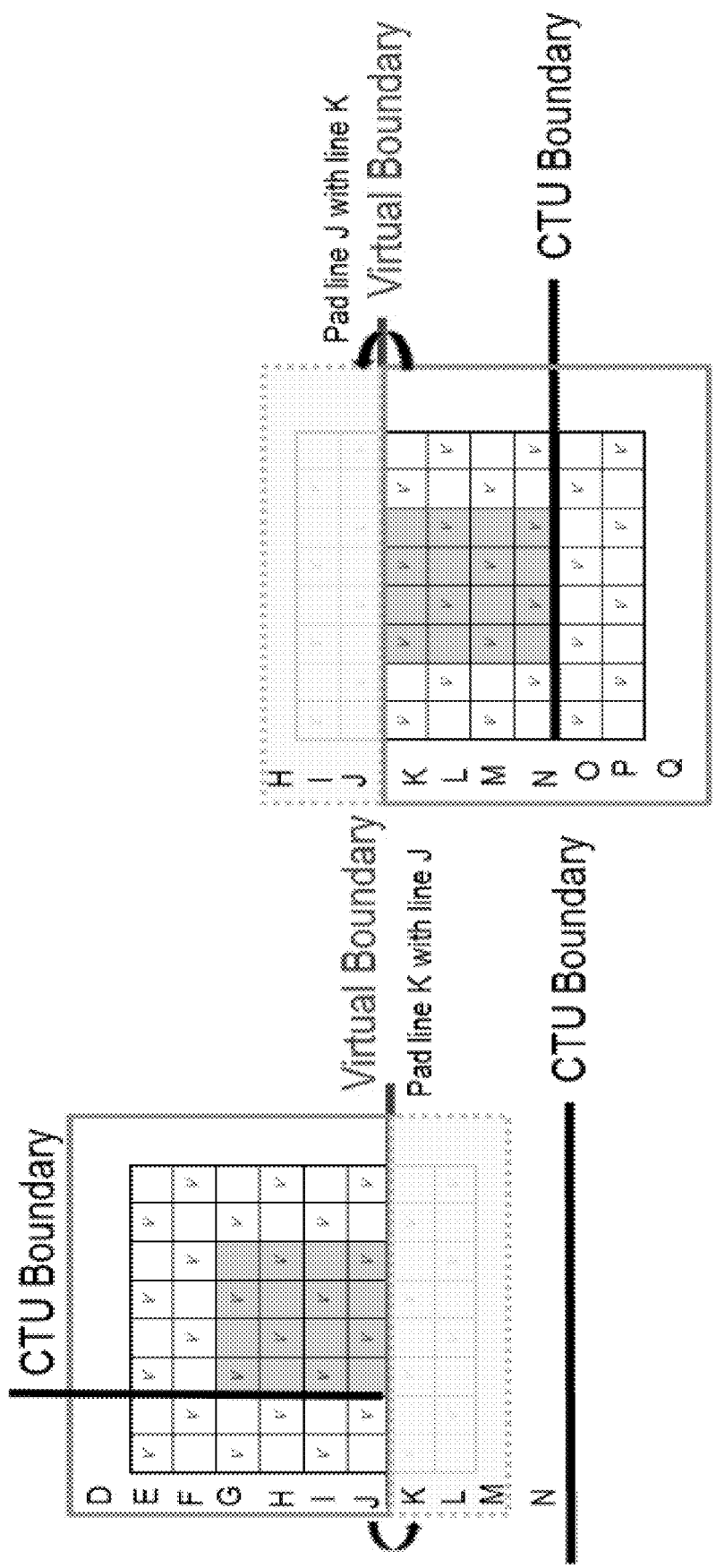
FIG. 11 shows an example of block classification at virtual boundaries.

In VVC, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 11, with N equal to 4 for the Luma component and 2 for the Chroma component.

Figure 12:
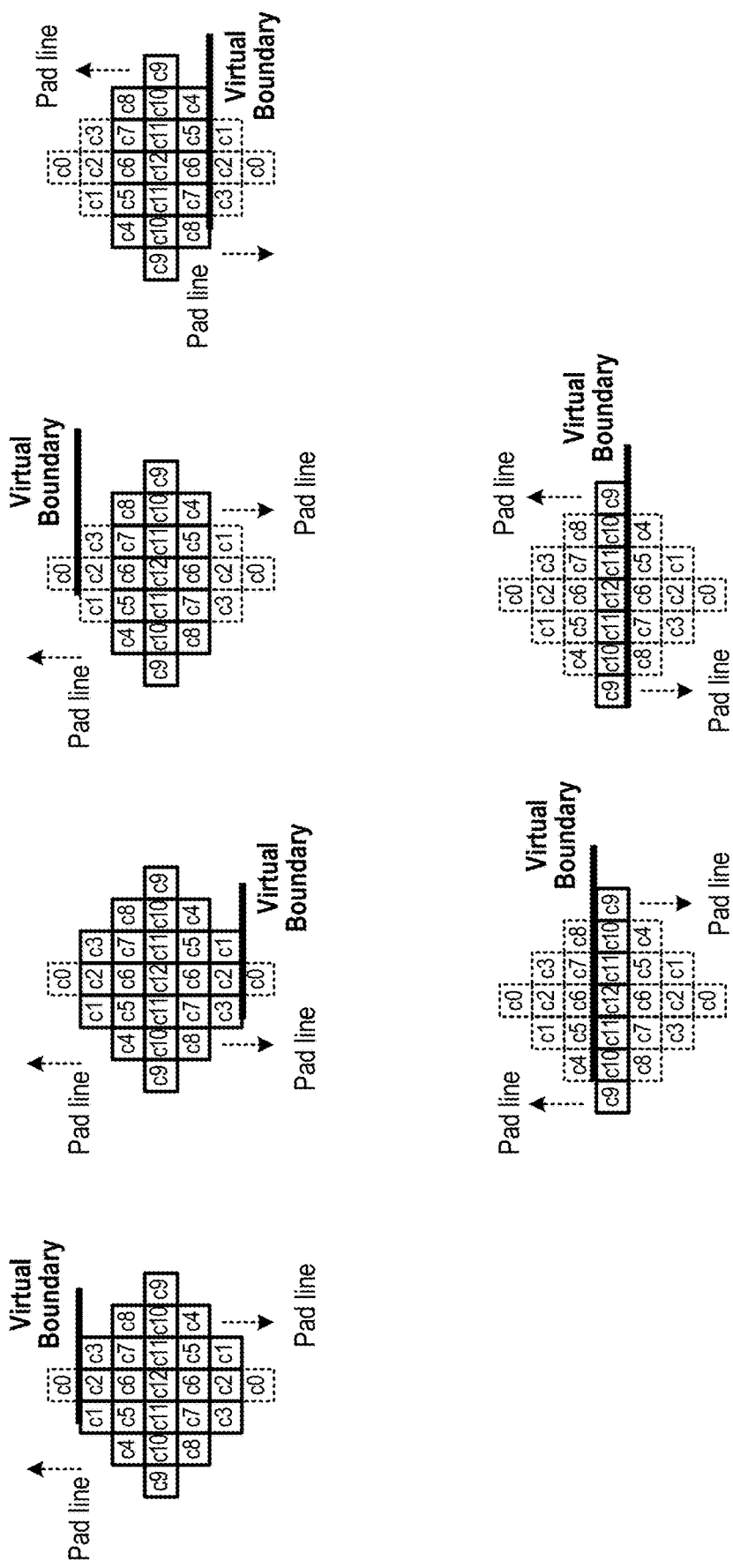
FIG. 12 shows an example of modified ALF filtering for Luma component at virtual boundaries.

Modified block classification is applied for the Luma component as depicted in FIG. 12. For the 1D Laplacian gradient calculation of the 4×4 block above the virtual boundary, only the samples above the virtual boundary are used. Similarly, for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, symmetric padding operation at the virtual boundaries are used for both Luma and Chroma components. As shown in FIG. 12, when the sample being filtered is located below the virtual boundary, the neighboring samples that are located above the virtual boundary are padded. Meanwhile, the corresponding samples at the other sides are also padded, symmetrically.

Different to the symmetric padding method used at horizontal CTU boundaries, simple padding process is applied for slice, tile and subpicture boundaries when filter across the boundaries is disabled. The simple padding process is also applied at picture boundary. The padded samples are used for both classification and filtering process.

2.15. JVET-P0080: CE5-2.1, CE5-2.2: Cros Component Adaptive Loop Filter

Figure 13B:
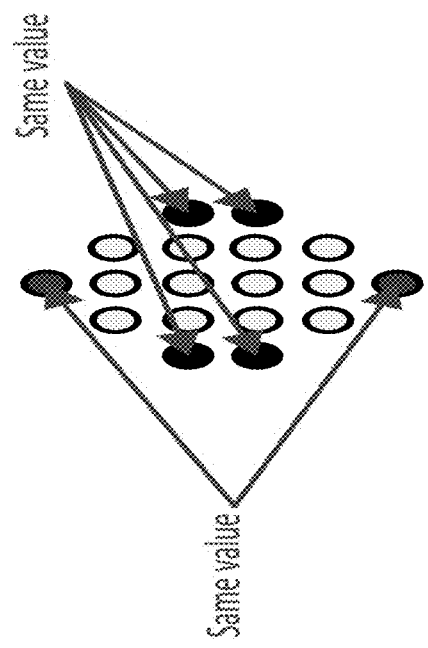
FIGS. 13A-13B show filter examples.
Figure 13A:
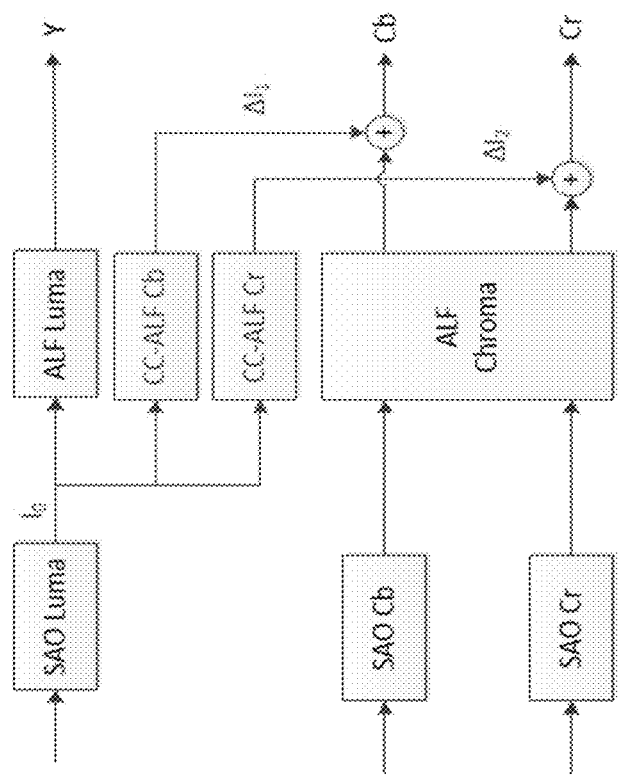

FIG. 13A below illustrates the placement of CC-ALF with respect to the other loop filters. CC-ALF operates by applying a linear, diamond shaped filter (FIG. 13B) to the luma channel for each chroma component, which is expressed as $$\Delta I_i(x, y) = \sum_{(x_0, y_0) \in S_i} I_0(x_C + x_0, y_C + y_0) c_i(x_0, y_0),$$

where
(x, y) is chroma component i location being refined
($x_C$, $y_C$) is the luma location based on (x, y)
$S_i$ is filter support in luma for chroma component i
$c_i(x_0, y_0)$ represents the filter coefficients
(2-28)

The luma location ($x_C$, $y_C$), around which the support region is centered, is computed based on the spatial scaling factor between the luma and chroma planes. All filter coefficients are transmitted in the APS and have 8-bit dynamic range. An APS may be referenced in the slice header. CC-ALF coefficients used for each chroma component of a slice are also stored in a buffer corresponding to a temporal sublayer. Reuse of these sets of temporal sublayer filter coefficients is facilitated using slice-level flags. The application of the CC-ALF filters is controlled on a variable block size (i.e. 16×16, 32×32, 64×64, 128×128) and signalled by a context-coded flag received for each block of samples. The block size along with an CC-ALF enabling flag is received at the slice-level for each chroma component. Boundary padding for the horizontal virtual boundaries makes use of repetition. For the remaining boundaries the same type of padding is used as for regular ALF.

2.16. JVET-P1008: CE5-Related: On the Design of CC-ALF

In JVET-O0636 and CE5-2.1, the Cross Component Adaptive Loop Filter (CC-ALF) was introduced and studied. The filter uses a linear filter to filter luma sample values and generate a residual correction for the chroma channels from the co-located filtered output. The filter is designed to operate in parallel with the existing luma ALF.

Figure 14:
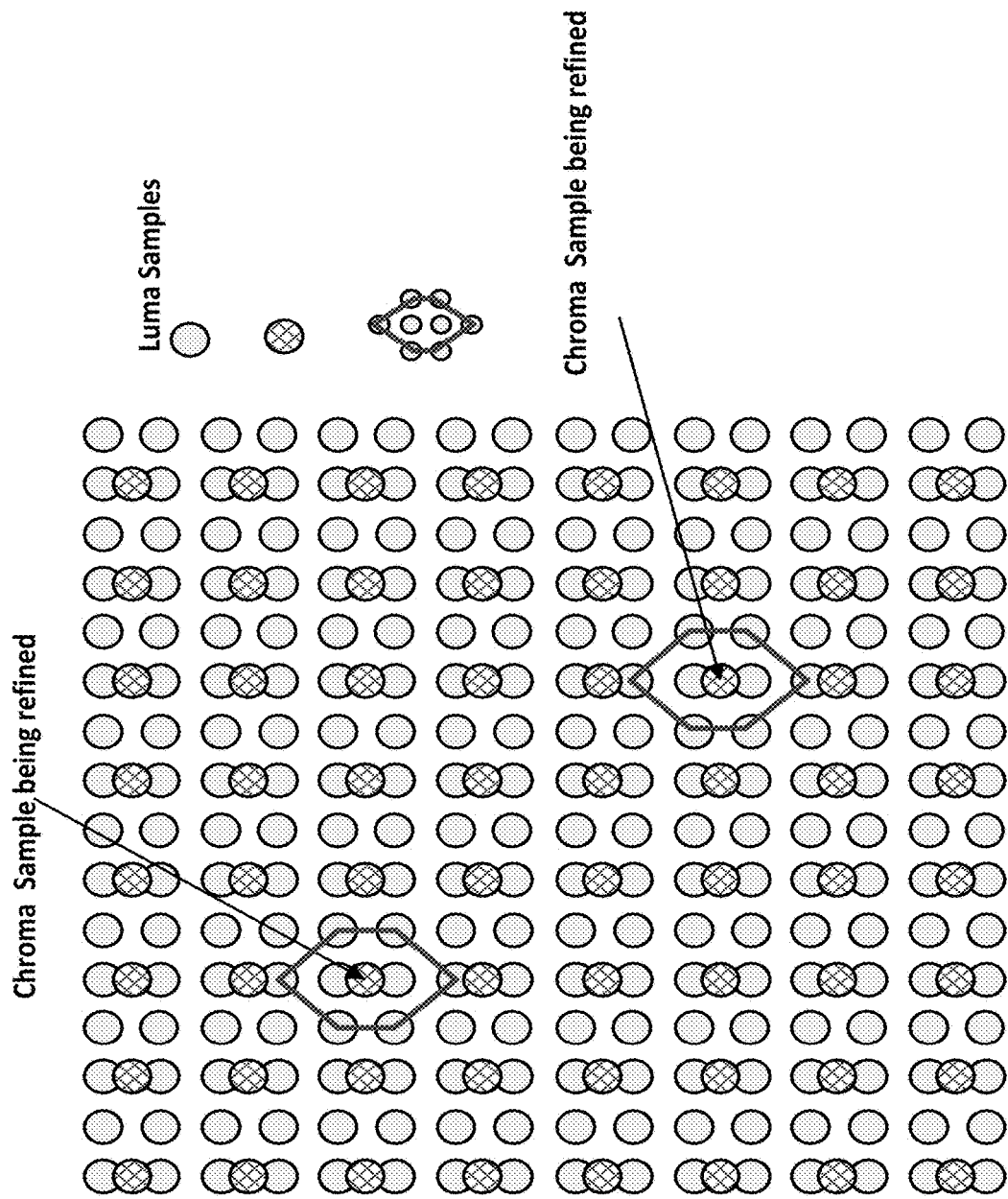
FIG. 14 shows an example of 3×4 Diamond Shape Filter with 8 unique coefficients.

A CC-ALF design is proposed that is asserted to be both simplified and better aligned with the existing ALF. The design uses a 3×4 diamond shape with 8 unique coefficients. This reduces the number of multiplies by 43% compared to the 5×6 design studied in CE5-2.1. When a restriction is placed that enables either chroma ALF or CC-ALF for chroma component of a CTU we limit the per-pixel multiplier count to 16 (current ALF is 15). The filter coefficient dynamic range is limited to 6-bit signed. An illustration of the filters for both the proposed and CE5-2.1 solution are shown in FIG. 14.

To be better aligned with the existing ALF design, the filter coefficients are signaled in the APS. Up to four filters are supported, and filter selection is indicated at the CTU-level. Symmetric line selection is used at the virtual boundary to further harmonize with ALF. Finally, to limit the amount of storage needed by the correction output, the CC-ALF residual output is clipped to $-2^{BitDepthC-1}$ to $2^{BitDepthC-1}-1$, inclusive.

2.17. Simplified Methods of CC-ALF in JVET-P2025

2.17.1. Alternative Filter Shapes

The CC-ALF filter shape is modified to have 8 or 6 coefficients as shown in figures as described herein.

Figure 15:
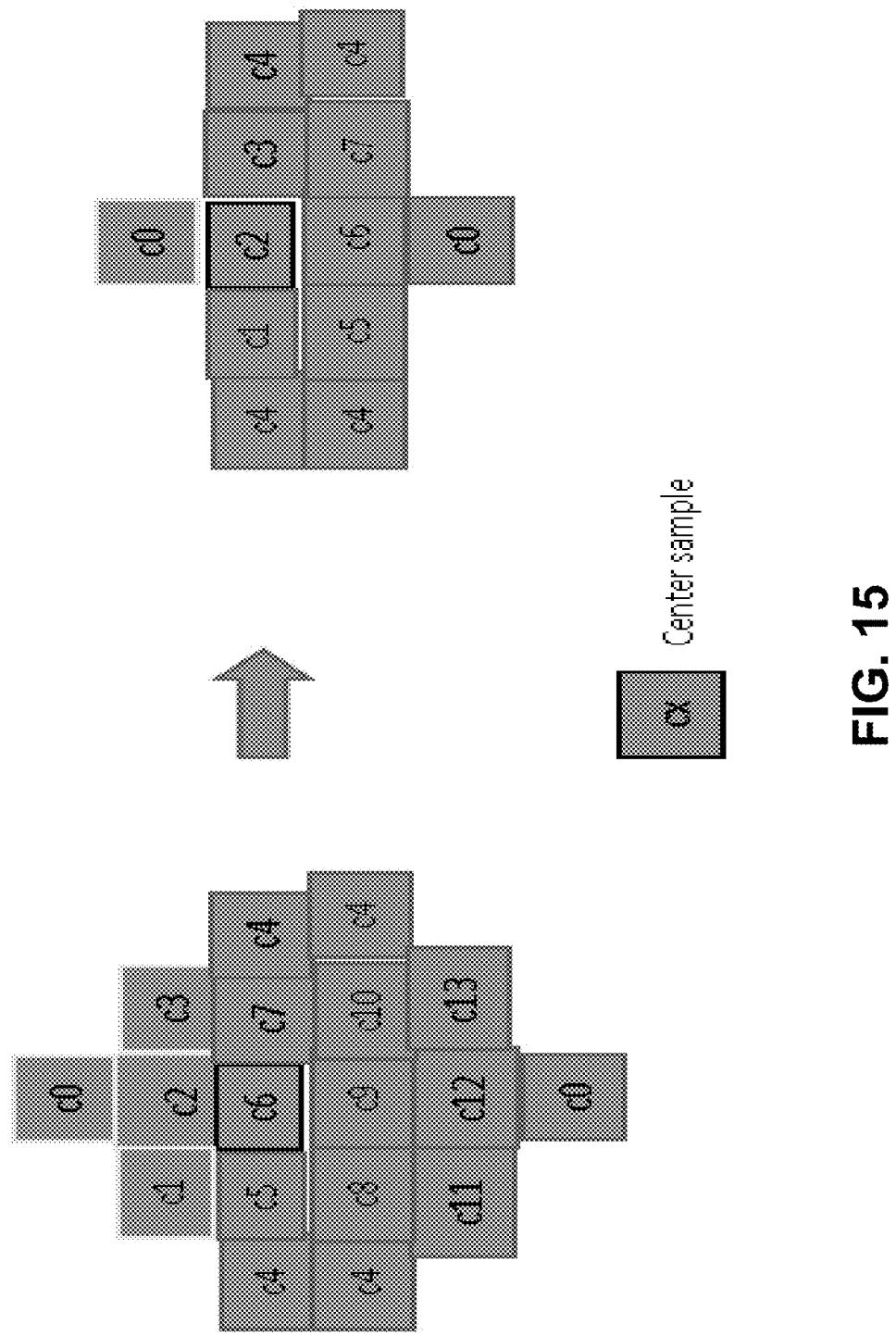
FIG. 15 shows CC-ALF filter shape of 8 coefficients in JVET-P0106.

FIG. 15 shows CC-ALF filter shape of 8 coefficients in JVET-P0106.

Figure 16:
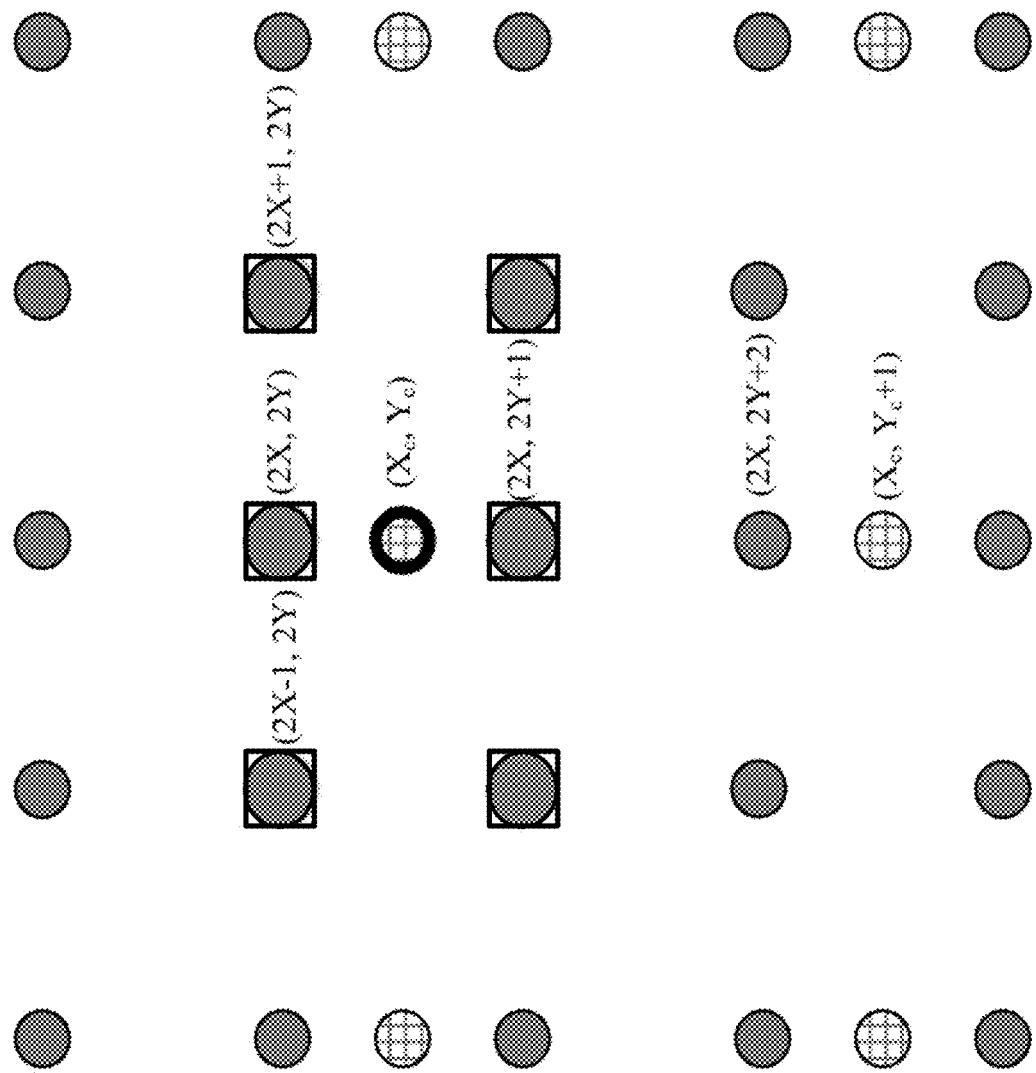
FIG. 16 shows CC-ALF filter shape of 6 coefficients in JVET-P0173.

FIG. 16 shows CC-ALF filter shape of 6 coefficients in JVET-P0173. In FIGS. 16, 17, and 19-34B, luma samples are indicated by solid color circles, chroma samples are indicated with circles having a pattern inside the circles, one or more bold circles with a pattern inside indicates the chroma samples that are determined based on the luma samples indicated by squares around the luma samples.

Figure 17:
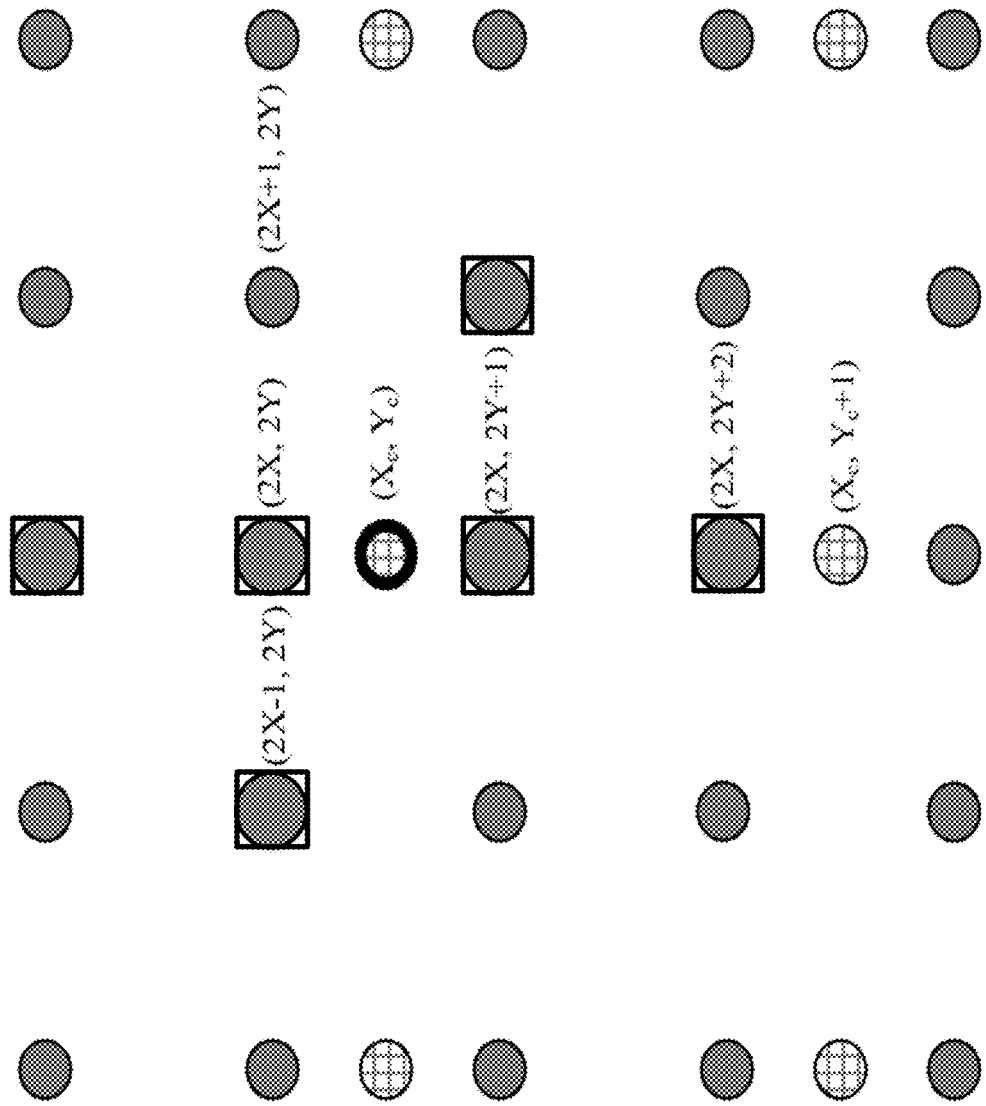
FIG. 17 shows CC-ALF filter shape of 6 coefficients in JVET-P0251.

FIG. 17 shows CC-ALF filter shape of 6 coefficients in JVET-P0251.

2.17.2. Joint Chroma Cross-Component Adaptive Filtering

Joint Chroma Cross-Component Adaptive Loop Filter (JC-CCALF) uses only one set of CCALF filter coefficients trained at the encoder to generate one filtered output as the refinement signal, which will be added directly to the Cb component, and be properly weighted and then added to the Cr component. Filters are indicated at the CTU-level or indicated with a block size, which is signalled per slice.

The supported such chroma block sizes range from the minimum chroma CTU size to the current chroma CTU size. The minimum chroma CTU size is the minimum between the smallest possible width and height of a chroma CTU, i.e. Min(32/SubWidthC, 32/SubHeightC), while the current chroma CTU size is the minimum between the width and height of the current chroma CTU, i.e. Min(CtbWidthC, CtbHeightC). For example, if CTU size is set to the maximal 128×128, the JC-CCALF chroma block size of a slice will be one from 32×32, 64×64 and 128×128 for 4:4:4 video, or one from 16×16, 32×32 and 64×64 for 4:2:0 and 4:2:2 video.

Figure 18:
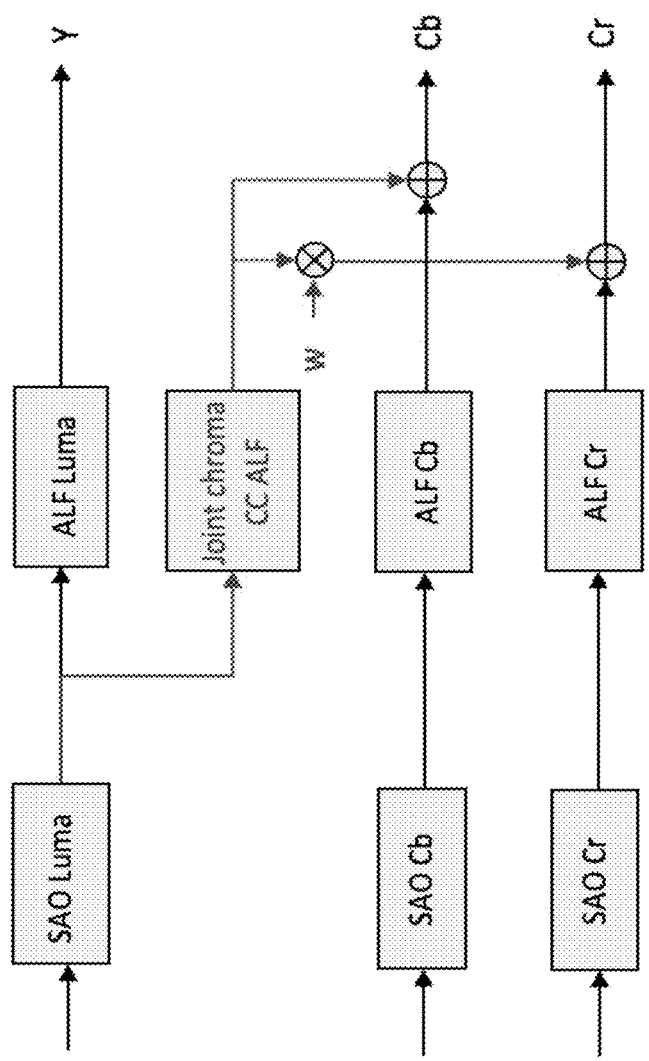
FIG. 18 shows an example of JC-CCALF workflow.

FIG. 18 shows an example of JC-CCALF workflow. 3. Example technical problems addressed by technical solutions disclosed herein The current design of CC-ALF has the following problems:
1. In current CC-ALF, an offset is calculated for each chroma sample which increases the computational complexity too much.
2. The design of filtering in the current CC-ALF may not be efficient since only one filter support is used for all chroma samples of all kinds of videos which doesn't take the local characteristics into consideration.
3. In current filter design of CC-ALF, luma samples are always used to refine the chroma components, which may be sub-optimal.
4. Using luma or/and chroma samples in current frame to refine luma or/and chroma samples may not be efficient in current design of CC-ALF or ALF.
5. CC-ALF may not be necessarily applied to chroma samples at certain locations since those samples may be filtered multiple times, such as in deblocking filter, SAO, chroma ALF.

4. Examples of Solutions and Embodiments

The list below should be considered as examples to explain general concepts. These items should not be interpreted in a narrow way. Furthermore, these items can be combined in any manner.

In this document, the term 'CC-ALF' represents a coding tool that utilizes the sample values in a second color component (e.g., Y) or multiple color components (e.g., both Y and Cr) to refine the samples in a first color component (e.g., Cb). It is not limited to the CC-ALF technologies. In one example, the collocated luma sample of a chroma sample located at (x, y) is defined as follows: the collocated luma sample is located at (2x, 2y), (2x, y) and (x, y) in 4:2:0 chroma format, 4:2:2 chroma format and 4:4:4 chroma format, respectively. "Corresponding filtering sample set" may be used to represent those samples included in a filter support, e.g., for CC-ALF, the "corresponding filtering sample set" may be used to represent the collocated luma sample and neighboring luma samples of the collocated luma sample of a chroma sample which are utilized to derive the refinement/offset of the chroma sample.

Sub-Block Based Filtering Method
1. Instead of performing the CC-ALF filtering process at sample-level, it is proposed to apply it at a sub-block (containing more than 1 sample) level and that one offset may be shared by all samples of a color component in a sub-block in CC-ALF/chroma ALF/luma ALF/other kinds of filtering methods.
   a. In one example, the sub-block may be an M×N (M-column by N-row) array of samples (e.g., 1×2, or 2×1, or 2×2, or 2×4, or 4×2, or 4×4).
   b. In one example, the sub-block dimensions may be signalled at sequence level/picture level/slice level/tile group level, such as in sequence header/picture header/SPS/VPS/DPS/PPS/APS/slice header/tile group header; or signalled at video region level, such as CTB.
   c. In one example, the offset may be further modified before refining all samples in the sub-block. Denote the offset as o.
      i. In one example, the offset may be clipped to a given range before being added to each sample in the sub-block.
         1) In one example, the offset may be clipped to the range of $T_1$ to $T_2$, e.g. $T_1$=−5, and $T_2$=5.
         2) In one example, whether to and/or how to do the clipping may be signalled.
      ii. In one example, the offset may be set to T when offset satisfies certain condition.
         1) In one example, the offset may be set to T, if o<$T_1$ && o>$T_2$, e.g., T=0, $T_1$=−5, $T_2$=5.
      iii. In one example, how to modify the offset may be dependent on the sub-block width or/and the subblock height. Denote the sub-block width as W and the sub-block height as H.
   1) In one example, the offset may be modified to o/(M×(W×H)), e.g., M=1 or M=2.
   iv. In one example, the offset may be multiplied, or divided, added, or shifted by T before being added to each sample in the sub-block.
      1) In one example, T may be signalled in the bitstream.
      2) In one example, T may be dependent on the sample value in the sub-block.
      3) In one example, T may be dependent on the bit-depth of sample values.
         a) In one example, the offset may be modified to o*T, wherein $T=v/(2^{B_{max}}-1)$ and v denotes the value of one sample, $B_{max}$ denotes the maximum bit depth of the component.
   v. Whether to modify the offset may be signalled at sequence level/picture level/slice level/tile group level, such as in sequence header/picture header/SPS/VPS/DPS/PPS/APS/slice header/tile group header; or signalled at video region level, such as CTB.
d. In one example, one representative sample in a sub-block may be selected and its corresponding CC-ALF sample set in the sub-block may be used to calculate the offset shared by the sub-block.
   i. In one example, determination of the representative chroma sample may be dependent on sample position.
      1) In one example, the representative sample may be the Nth chroma sample in the sub-block according to a scanning order (e.g., raster scan). For example, N may be 1 or 2. In another example, N may be the last sample in the sub-block according to a scanning order.
      2) In one example, the representative sample may be the at a specific position in the subblock, such as the center, the top-left, top-right, bottom-left, or the bottom-right.
   ii. In one example, determination of the representative sample may be dependent on sample value.
      1) In one example, the representative sample may be the sample of maximum sample value in the sub-block.
      2) In one example, the representative sample may be the sample of minimum sample value in the sub-block.
      3) In one example, the representative sample may be the sample of median sample value in the sub-block.
   iii. In one example, "corresponding filtering sample set" of one representative sample in CC-ALF (e.g., any of FIGS. 13 to 17) may be utilized.
e. In one example, multiple representative samples in a sub-block may be selected and their corresponding filtering sample sets may be used to calculate the offset
   i. In one example, "corresponding filtering sample sets" of each of the multiple representative samples may be firstly modified (e.g., through averaged or weighted averaged) to generate one virtual representative filtering sample set, and the virtual representative filtering sample set is used to calculate the offset.

2. A Two-offset-refinement method is proposed that for filtering a sample, two or multiple offsets may be added to the sample to get the final refined sample value.
   a. In one example, two offsets are utilized to refine one current sample with a first offset being a shared offset used for a sub-block including the current sample and a second offset being an individual offset used for the current sample.
      i. In one example, the shared offset may be calculated using a first filter support, e.g., using methods described in bullet 1.
         1) In one example, filter shape defined in FIG. 19 may be used in CC-ALF, wherein the sub-block size is 1×2. For example, the sub-block may include the chroma samples located at $(X_c, Y_c)$ and $(X_o, Y_c+1)$. Luma samples denoted by L0, L1, . . . , L5 may be used to calculate the shared offset.
         2) In one example, filter shape defined in FIG. 20 may be used, wherein the sub-block size is 2×1. For example, the sub-block may include the chroma samples located at $(X_c, Y_c)$ and $(X_c+1, Y_c)$. Luma samples denoted by L0, L1, . . . , L3 may be used to calculate the shared offset.
      ii. In one example, the individual offset of each chroma sample may be calculated using a second filter support.
         1) In one example, filter shape defined in FIG. 19 may be used in CC-ALF, wherein the sub-block size is 1×2. For example, luma samples denoted by L6 and L1 may be used to calculate the individual offset of the first chroma sample located at $(X_c, Y_c)$, and luma samples denoted by L4 and L7 may be used to calculate the individual offset of the second chroma sample located at $(X_o, Y_c+1)$.
         2) In one example, filter shape defined in FIG. 20 may be used, wherein the sub-block size is 2×1. For example, luma samples denoted by L4, L1, L5, and L2 may be used to calculate the individual offset of the first chroma sample located at $(X_c, Y_c)$, and luma samples denoted by L6, L7, L8, and L9 may be used to calculate the individual offset of the second chroma sample located at $(X_c+1, Y_c)$.
      iii. In one example, samples involved in the shared offset calculation process (e.g., included in the first filter support) are excluded in the second filter support.
         1) Alternatively, partial of samples involved in the first filter support are included in the second filter support.
      iv. In one example, number of samples involved in the shared offset calculation process (e.g., included in the first filter support) is equal to that involved in the second filter support.
         1) Alternatively, number of samples involved in the shared offset calculation process is no smaller than that involved in the second filter support.
         2) Alternatively, number of samples involved in the shared offset calculation process is no greater than that involved in the second filter support.
   b. In one example, one or multiple shared offsets and/or individual offsets may be signalled at sequence level/picture level/slice level/tile group level, such as in sequence header/picture header/SPS/VPS/DPS/PPS/ APS/slice header/tile group header.
  i. The shared offsets may be signaled in a scanning order of subblocks.
 c. In one example, the above method may be applied to CC-ALF/chroma ALF/other filtering methods.

Multiple Filter Shapes Support of CC-ALF

3. N-tap symmetric filter support utilized in CC-ALF wherein at least two filter coefficients for two samples within the filter support share a same value.
 a. In one example, N may be a specific number, such as N=6, 8.
  i. In one example, symmetric N-tap filter shapes may be utilized in CC-ALF.
   1) In one example, symmetric 8-tap filter shapes with 4 unique coefficients (denoted by Ci with i being 0 to 3) defined in any one of FIGS. 21A-21C may be utilized in CC-ALF.
   2) In one example, symmetric 8-tap filter shapes with 5 unique coefficients defined in any one of FIGS. 22A-22C may be utilized in CC-ALF.
   3) In one example, 8-tap filter shapes with 6 unique coefficients defined in any one of FIGS. 23A-23C may be utilized in CC-ALF.
 b. In one example, the same value shared by two or more coefficients may be signaled at sequence level/picture level/slice level/tile group level, such as in sequence header/picture header/SPS/VPS/DPS/PPS/ APS/slice header/tile group header and used to derive the two or more coefficients.

4. Asymmetric N-tap filter shapes (N<8) may be utilized in CC-ALF.
 a. In one example, asymmetric 6-tap filter shapes defined in any one of FIGS. 24A-24F may be utilized in CC-ALF.
 b. In one example, asymmetric 5-tap filter shape defined in any one of FIGS. 25A-25D may be utilized in CC-ALF.
 c. In one example, asymmetric 4-tap filter shape defined in any one of FIGS. 26A-26E may be utilized in CC-ALF.

5. CC-ALF is invoked to apply filter coefficients on sample differences instead of directly on samples in a filter support.
 a. In one example, a luma sample difference may be defined as the difference between one representative luma sample in the filter support (region) and other luma samples in the filter support region.
  i. In one example, the representative luma sample is the located at (2X, 2Y) for a chroma sample located at (X, Y).
  ii. In one example, the filter shape defined in FIG. 27A or 27B may be utilized in CC-ALF.
 b. In one example, multiple representative samples are determined and differences between one non-representative sample and one representative sample is utilized.
  i. In one example, two representative luma samples are the located at (2X, 2Y) and (2X+1, 2Y) for a chroma sample located at (X, Y).
  ii. In one example, two representative luma samples are the located at (2X, 2Y) and (2X, 2Y+1) for a chroma sample located at (X, Y).
  iii. In one example, filter shape defined in FIG. 28 may be utilized in CC-ALF.
 c. How to select the representative sample may be pre-defined or dependent on decoded information (e.g., color format) or signaled.

6. For a video unit (e.g., a slice/picture), a set of multiple filter supports may be utilized in CC-ALF.
 a. In one example, the filter tap denoted by N (e.g., those used in bullets 3-5) and/or indications of filter supports may be signalled at sequence level/picture level/slice level/tile group level, such as in sequence header/picture header/SPS/VPS/DPS/PPS/APS/slice header/tile group header.
 b. In one example, a "corresponding filtering sample set" used to calculate the offset in the sub-block may contain partial or all of luma samples utilized for multiple representative chroma samples in the non-sub-block based filtering method.
  i. In one example, filter shapes defined in FIG. 29 may be used in 1×2 sub-block-based CC-ALF.
  ii. In one example, filter shapes defined in FIG. 30 may be used in 2×1 sub-block-based CC-ALF.
  iii. In one example, 8-tap filter shape defined in FIG. 31 may be utilized in 1×2 sub-block CC-ALF.
  iv. In one example, 8-tap filter shape defined in FIG. 32 may be utilized in 2×1 sub-block CC-ALF.
  v. In one example, 10-tap filter shape defined in FIG. 33 may be utilized in 1×2 sub-block CC-ALF.
  vi. In one example, 10-tap filter shapes defined in FIG. 34 may be utilized in 2×1 sub-block CC-ALF.

Filter Support with Multiple Components

7. When filtering a sample (e.g., in CC-ALF), the filter support may include samples associated with multiple components.
 a. In one example, the filter coefficients applied on a second color component and on a third color component to correct the first color component may be signaled sequentially (coefficients on the third color component are all signaled after coefficients on the second color component).
  a) In another example, the filter coefficients applied on a second color component and on a third color component to correct the first color component may be signaled in an interleave way.
 b. It is proposed that a correction for samples in a first component by filtering samples in a second component which excludes the case that the first is Cb/Cr and second is Y.
  i. In one example, the filter shape defined in Bullet 3 may be utilized in the second component to correct samples in the first component.
 c. It is proposed that samples from more than one component may be filtered when deriving the"correction of a sample" or the"refined sample" of a first component in CC-ALF.
  i. In one example, one filter shape (e.g., filter shape in Bullet 3) may be utilized in all multiple components to correct the samples in the first component.
   1) In one example, the offsets derived from multiple components may be averaged or weighted averaged to correct the samples in the first component.
   2) In one example, the multiplication of the offsets derived from multiple components may be utilized to correct the samples in the first component.

ii. In one example, different filter shapes (e.g., filter shapes defined in Bullet 3) may be utilized in the multiple components to correct the samples in the first component.
1) In one example, the offsets derived from multiple components may be averaged or weighted averaged to correct the samples in the first component.
2) In one example, the multiplication of the offsets derived from multiple components may be utilized to correct the samples in the first component.

Multiple Frames Support of ALF or/and CC-ALF

8. In current design of ALF or/and CCALF, samples in current frame are used to refine the samples in the same or different components. It is proposed to use samples in multiple frames to refine the samples in current frame.
    a. In one example, whether to use samples from multiple frames for ALF or/and CC-ALF may be signalled at sequence level/picture level/slice level/tile group level, such as in sequence header/picture header/SPS/VPS/DPS/PPS/APS/slice header/tile group header.
    b. In one example, multiple frames used for ALF or/and CC-ALF may be or not the reference pictures of current frame.
        i. In one example, the nearest pictures of current frame may be used for ALF or/and CC-ALF, wherein picture of coding (POC) may be used to judge the distance.
        ii. In one example, the short-term pictures of current frame may be used for ALF or/and CC-ALF.
        iii. In one example, the long-term pictures of current frame may be used for ALF or/and CC-ALF.
        iv. In one example, the reference pictures in the same temporal layer of current frame may be used for ALF or/and CC-ALF.
        v. In one example, the reference pictures in the different temporal layer of current frame may be used for ALF or/and CC-ALF.
        vi. In one example, multiple frames used for ALF or/and CC-ALF may include/not include current frame.

Disabling CC-ALF for Chroma Samples Between Virtual Boundary and CTU Bottom Boundary 9. It is proposed to disable CC-ALF for chroma samples between the ALF virtual boundary and the CTB bottom boundary.
    a. In one example, ALF virtual boundary may be defined in section 2.14.6.
10. It is proposed to disable ALF for luma samples or/and chroma samples between the AIF virtual boundary and the CTU bottom boundary.
    a. In one example, ALF virtual boundary may be defined in section 2.14.6.
11. It is proposed to disable filtering process (e.g., CC-ALF) for samples which have been filtered by another filter, e.g., deblocking filter.
    a. Alternatively, disable filtering process (e.g., CC-ALF) for samples which are located at transform/CU edges which may be filtered by another filter, e.g., deblocking filter General Features 12. Whether to and/or how to apply the disclosed methods above may be signalled at sequence level/picture level/slice level/tile group level, such as in sequence header/picture header/SPS/VPS/DPS/PPS/APS/slice header/tile group header.
13. Whether to and/or how to apply the disclosed methods above may be dependent on coded information, such as color format, single/dual tree partitioning, the position of a sample (e.g., relative to a CU/CTU).

Figure 19:
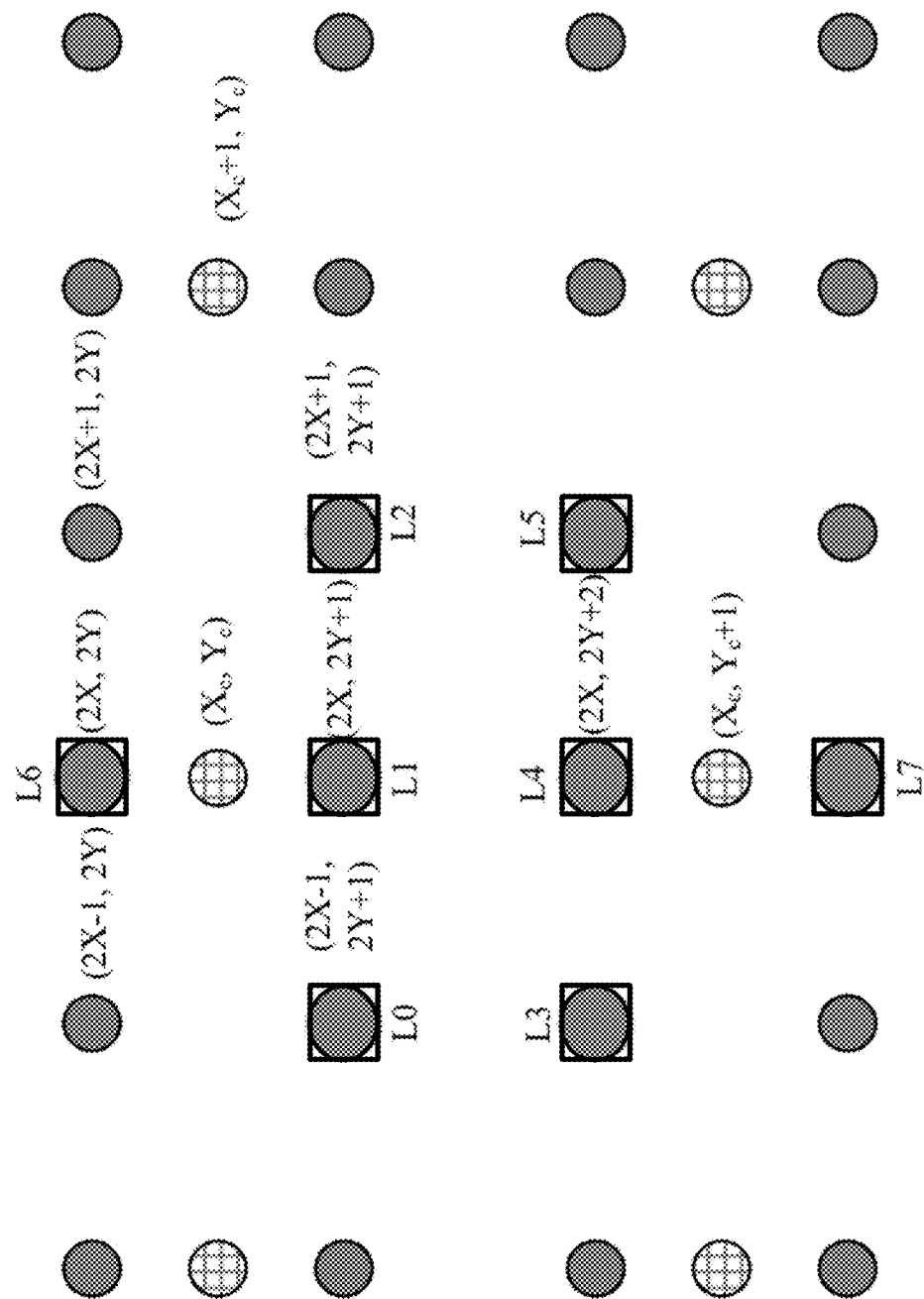
FIG. 19 to FIG. 34B show examples support for a filter used for CC-ALF.

FIG. 19 shows a filter for partially shared sub-block based CC-ALF.

Figure 20:
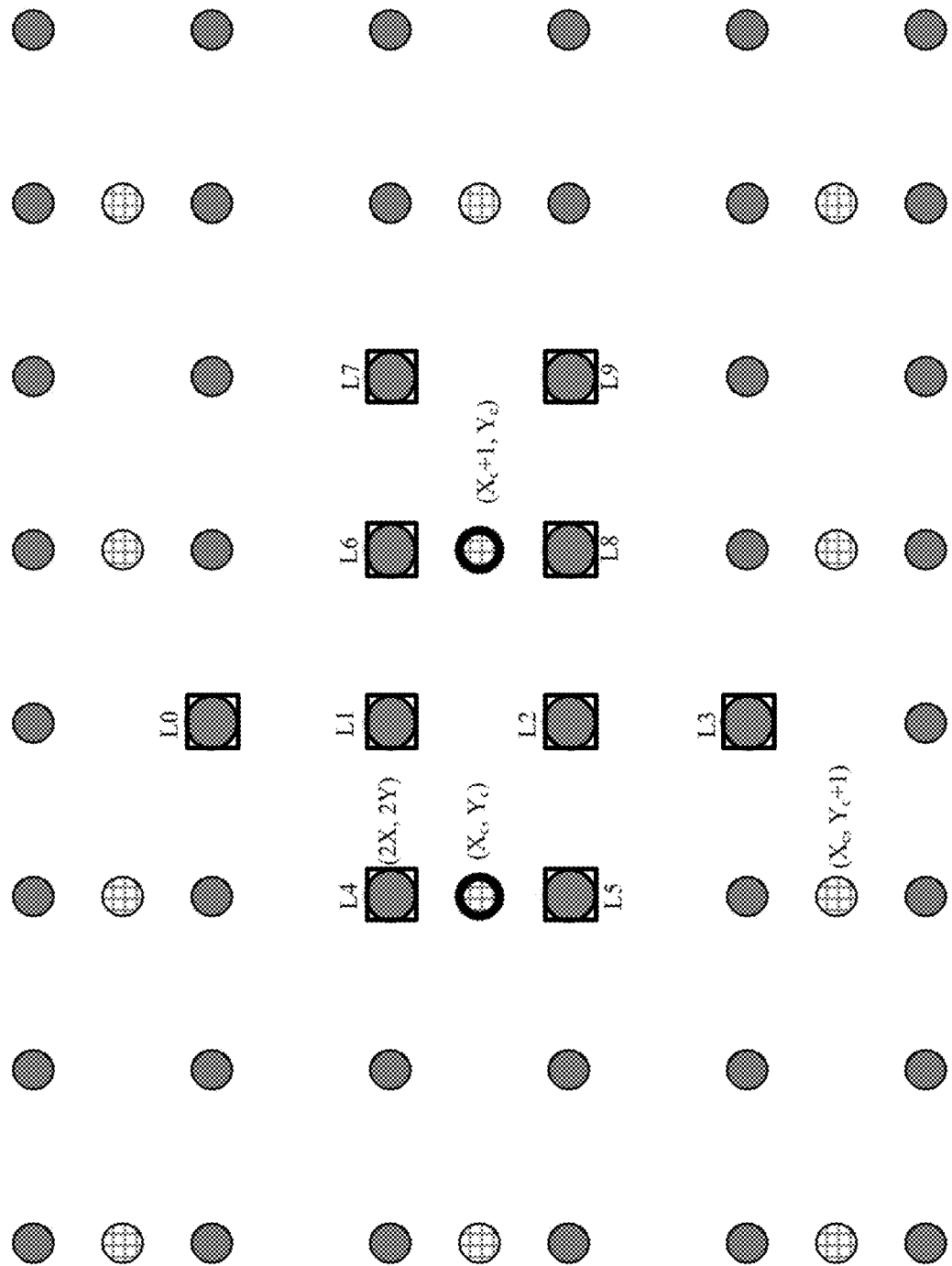

FIG. 20. filter for partially shared 2×1 sub-block based CC-ALF.

Figure 21A:
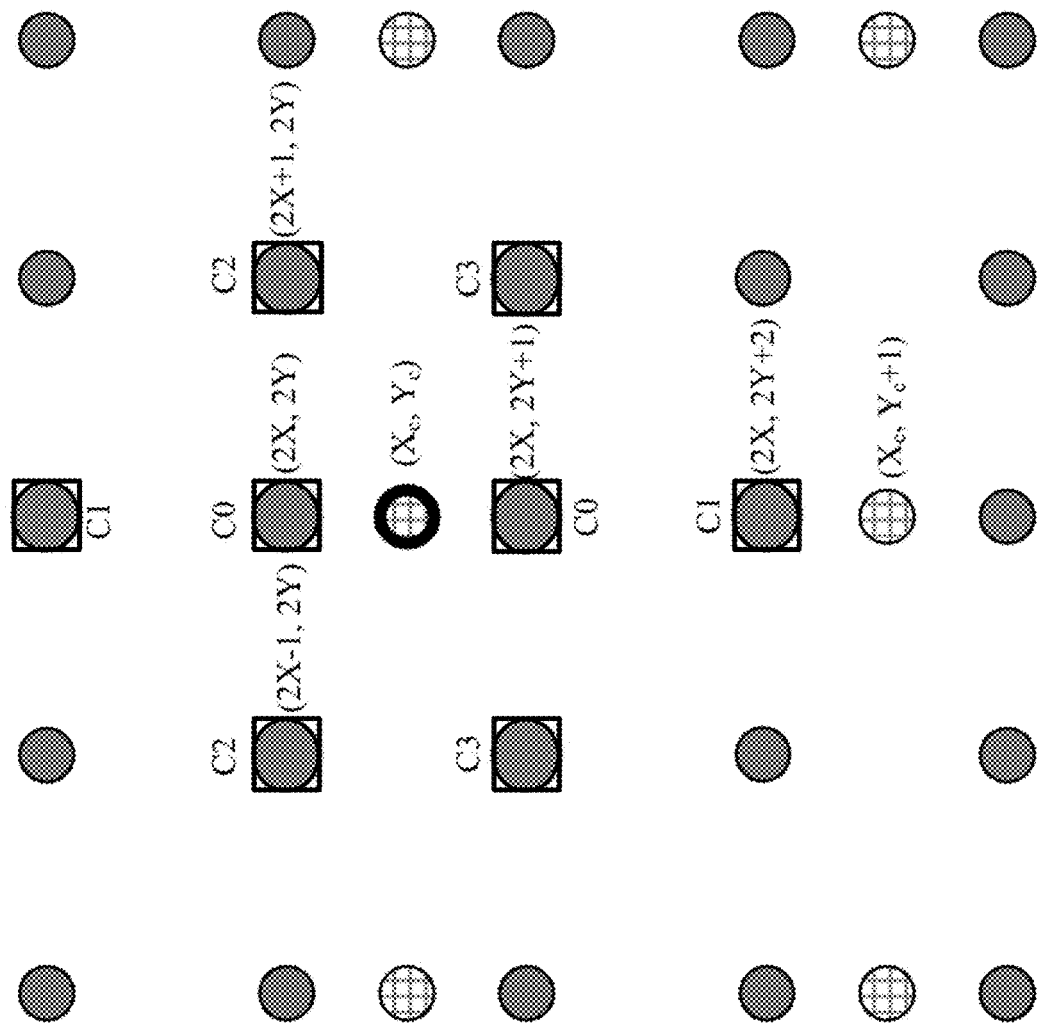
Figure 21B:
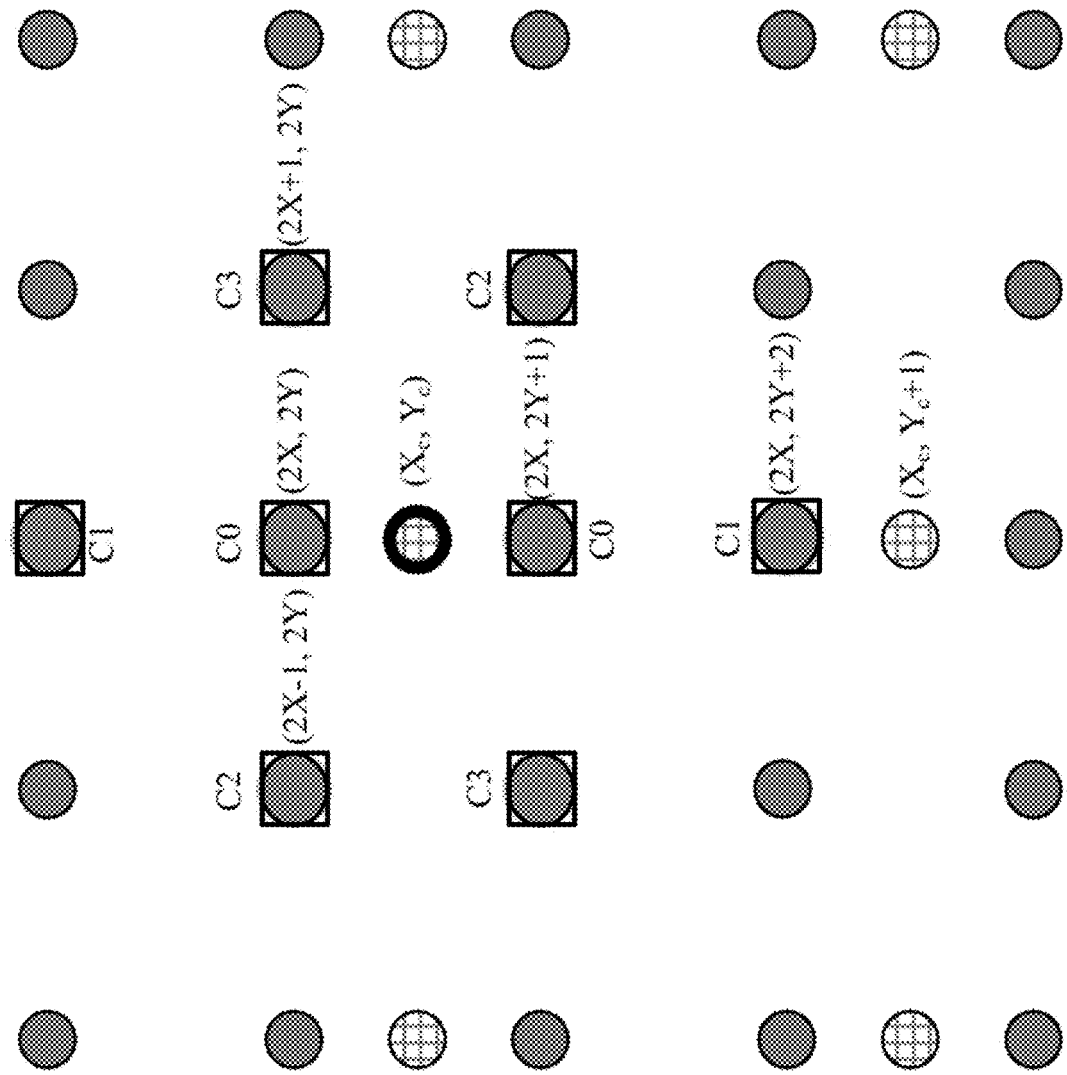
Figure 21C:
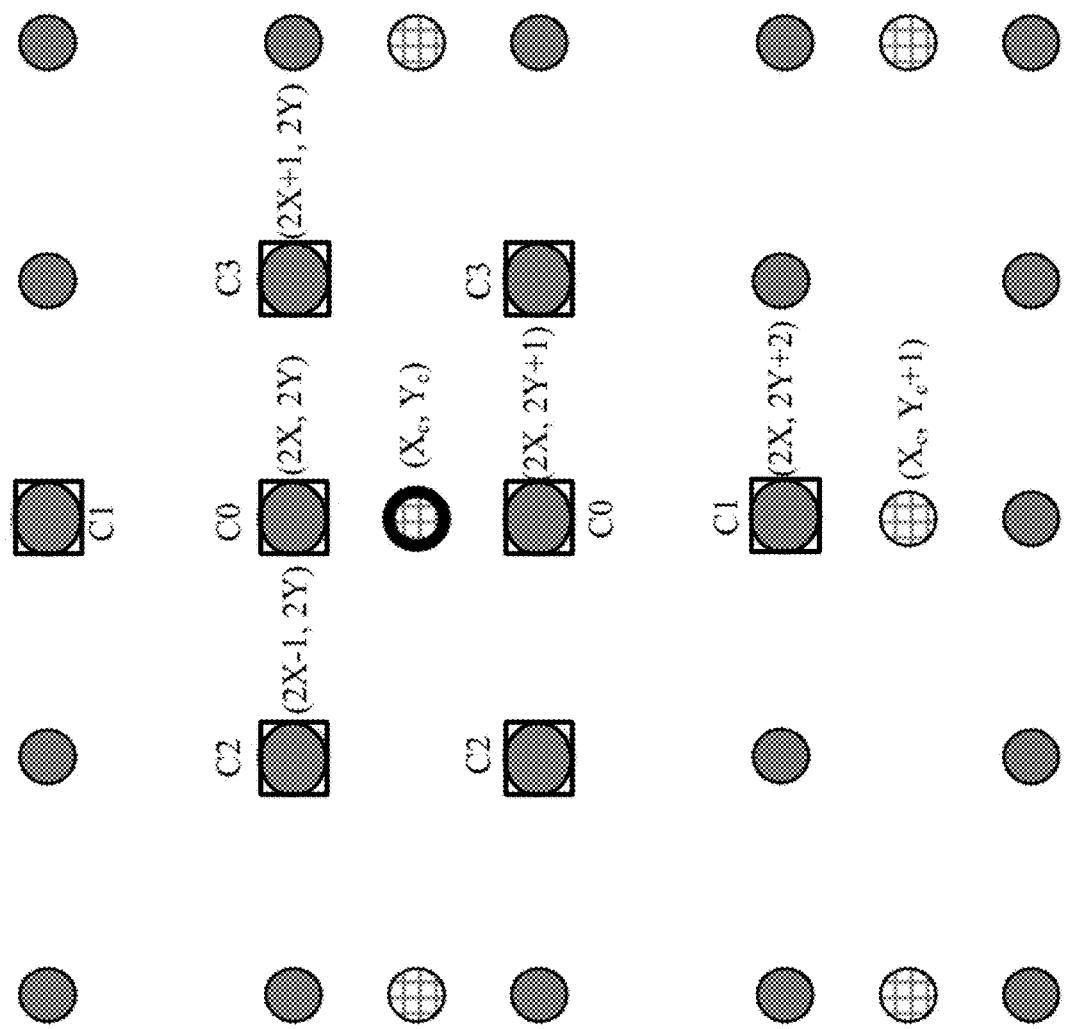

FIG. 21A-21C show examples of symmetric 8-tap filters with 4 unique coefficients when filtering ($X_c$, $Y_c$). FIG. 21A shows type 1 filter, FIG. 21B shows type 2 filter and FIG. 21C shows a type 3 filter.

Figure 22A:
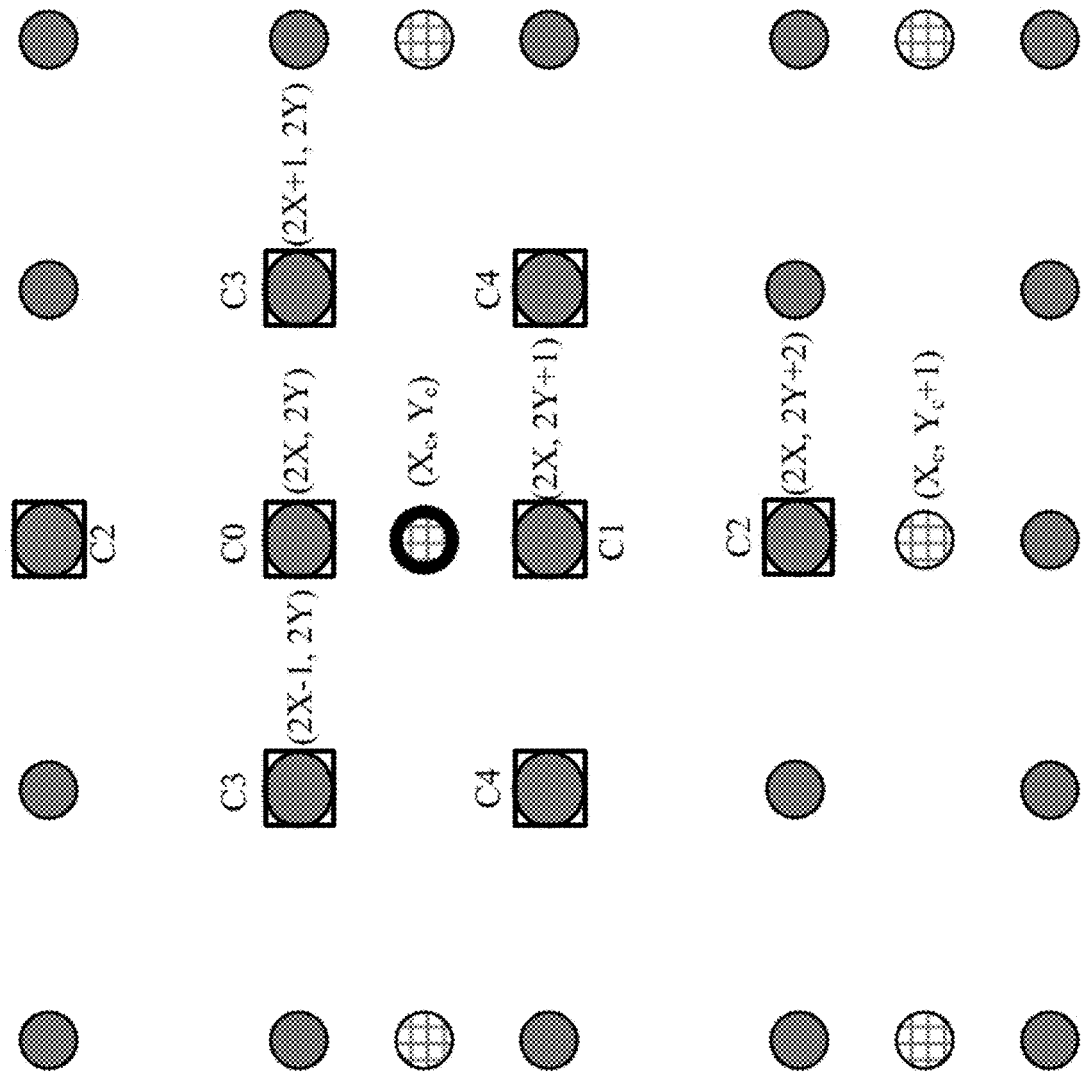
Figure 22B:
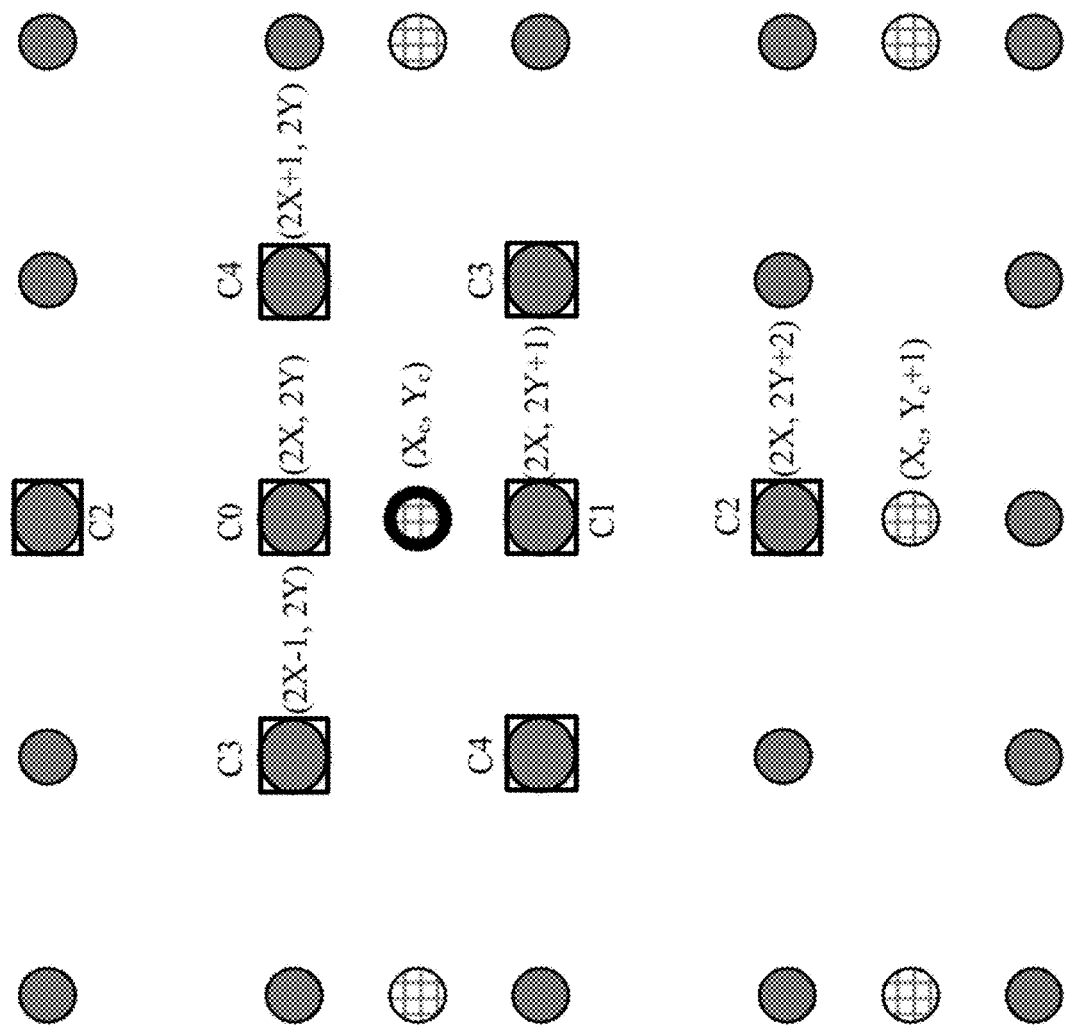
Figure 22C:
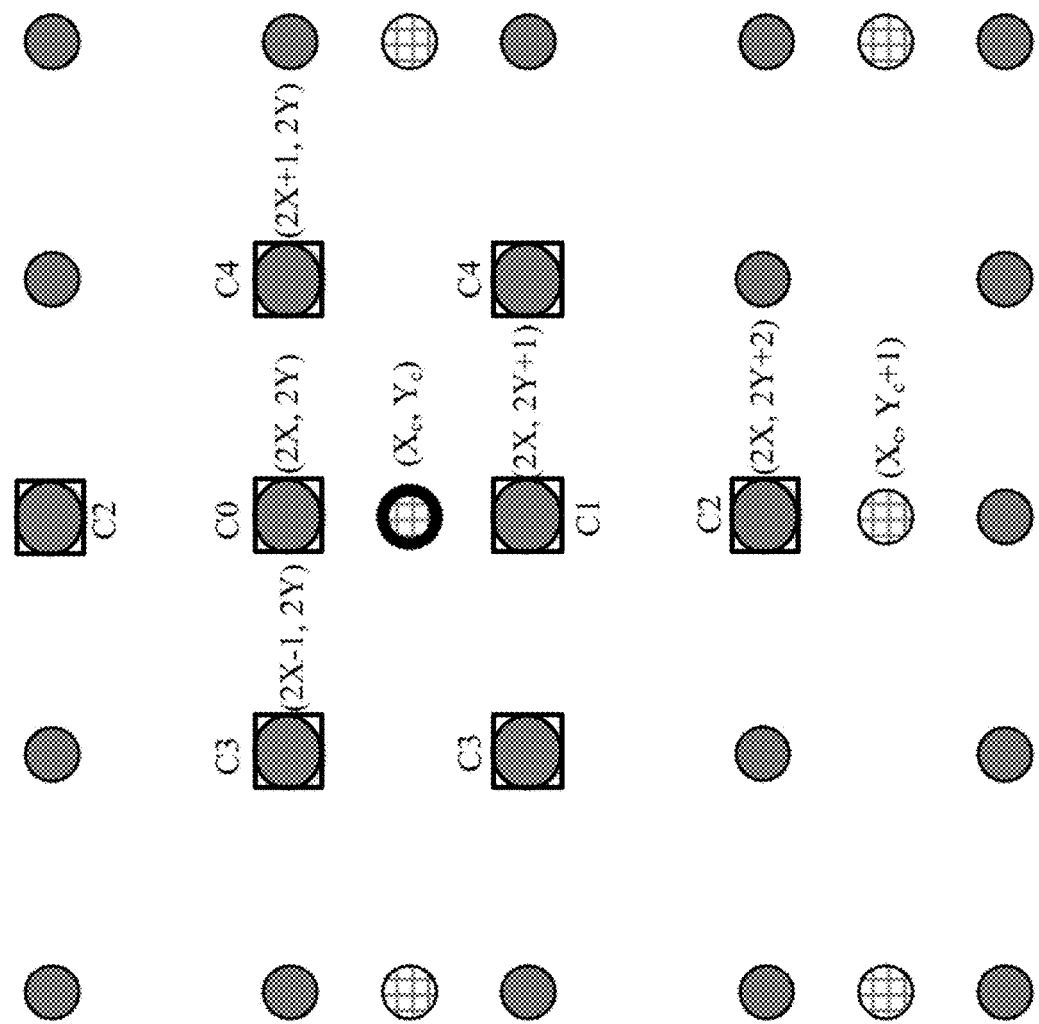

FIGS. 22A-22C show examples of symmetric 8-tap filters with 5 unique coefficients when filtering (Xc, Yc). FIGS. 22A, 22B and 22C respectively show type 1, type 2 and type 3 filters.

Figure 23A:
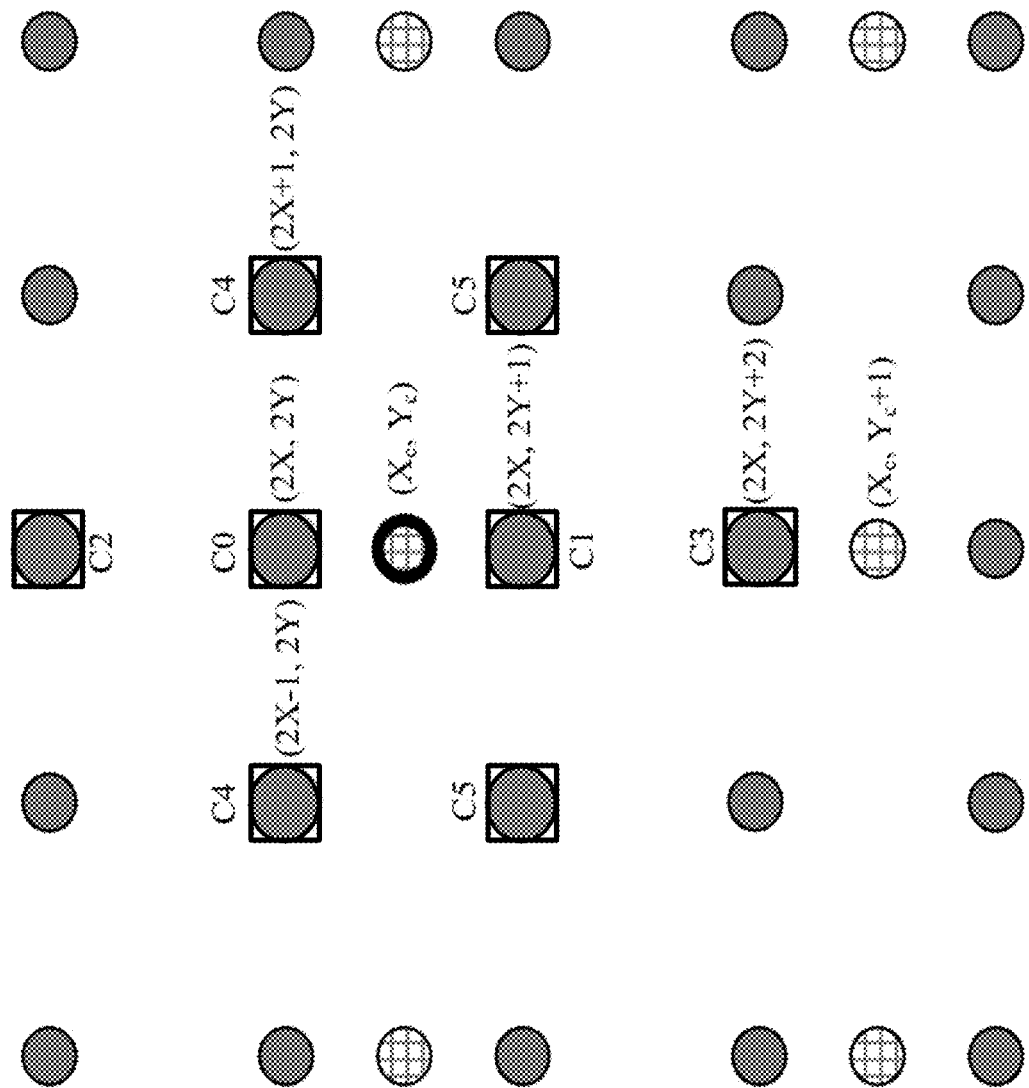
Figure 23B:
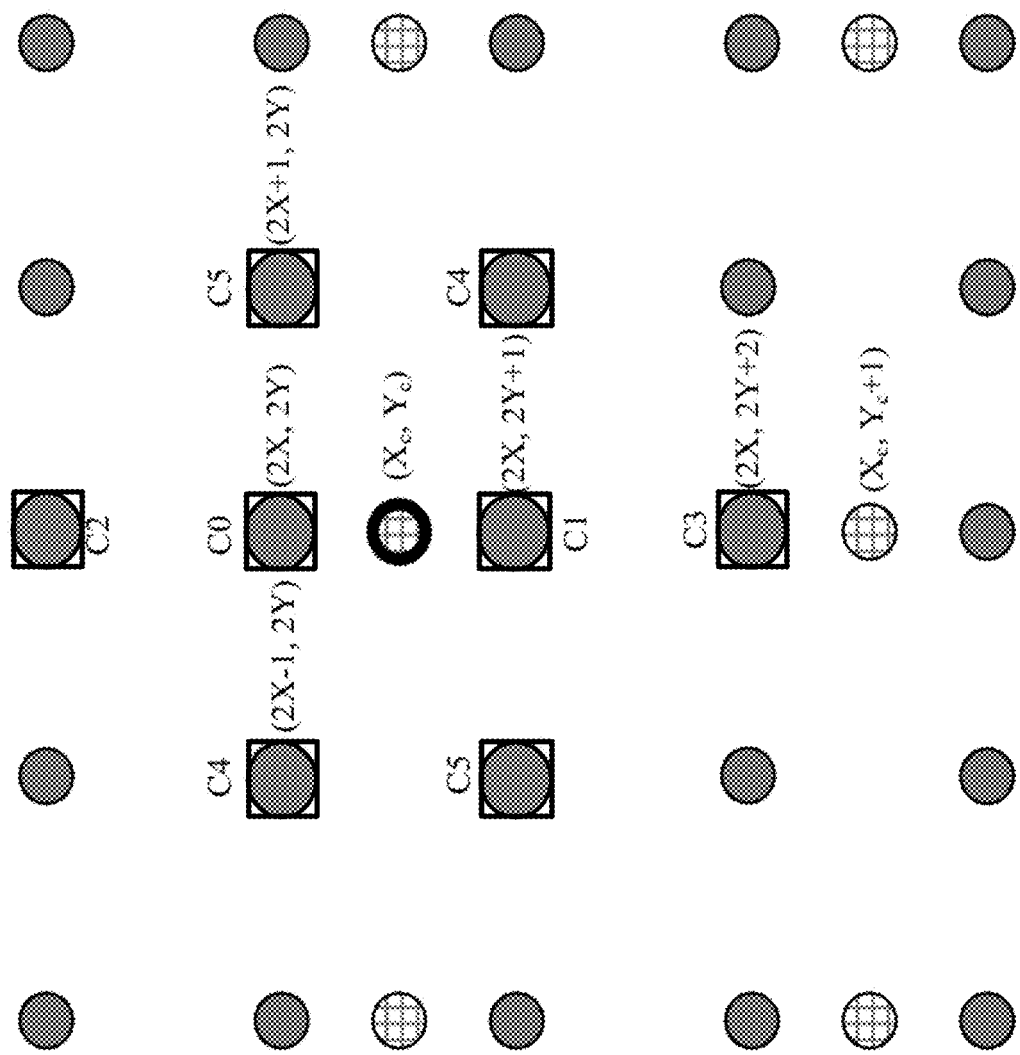
Figure 23C:
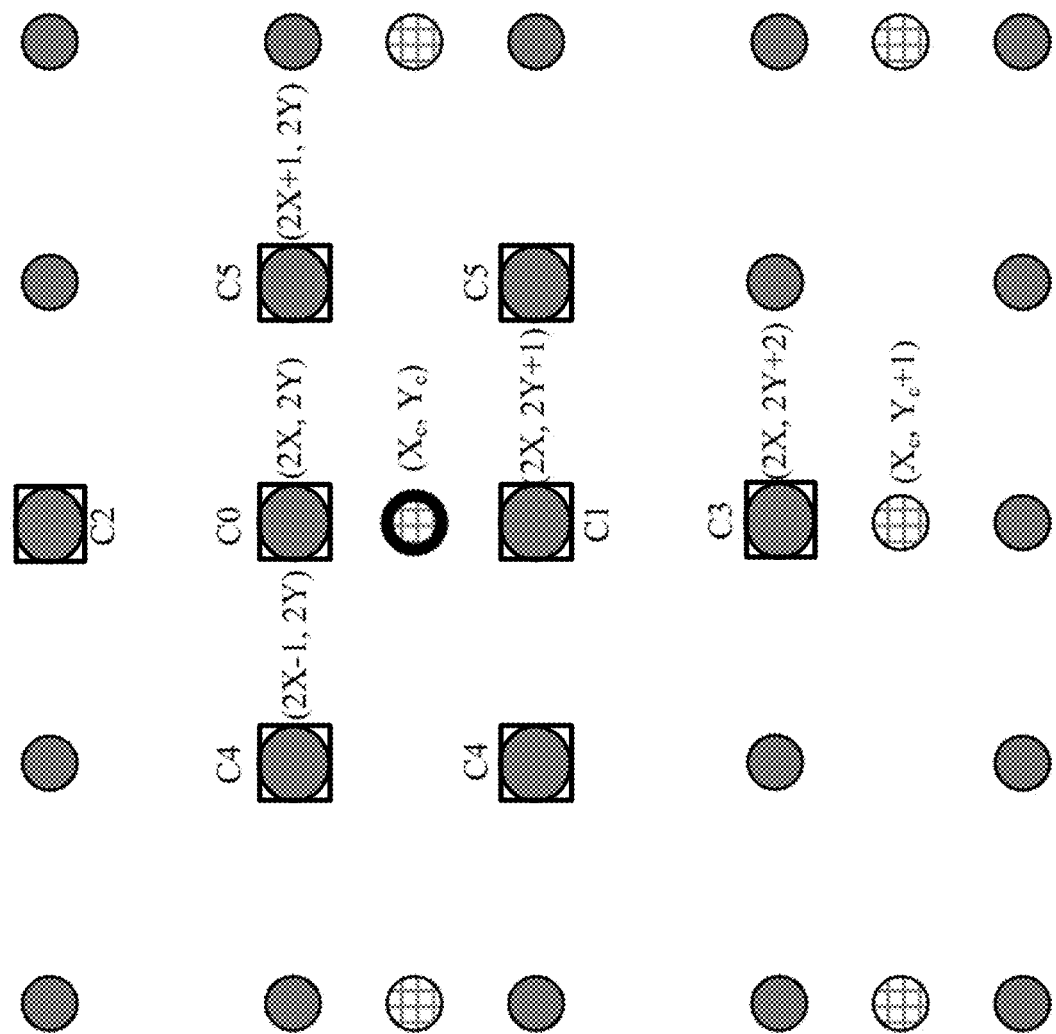
Figure 24A:
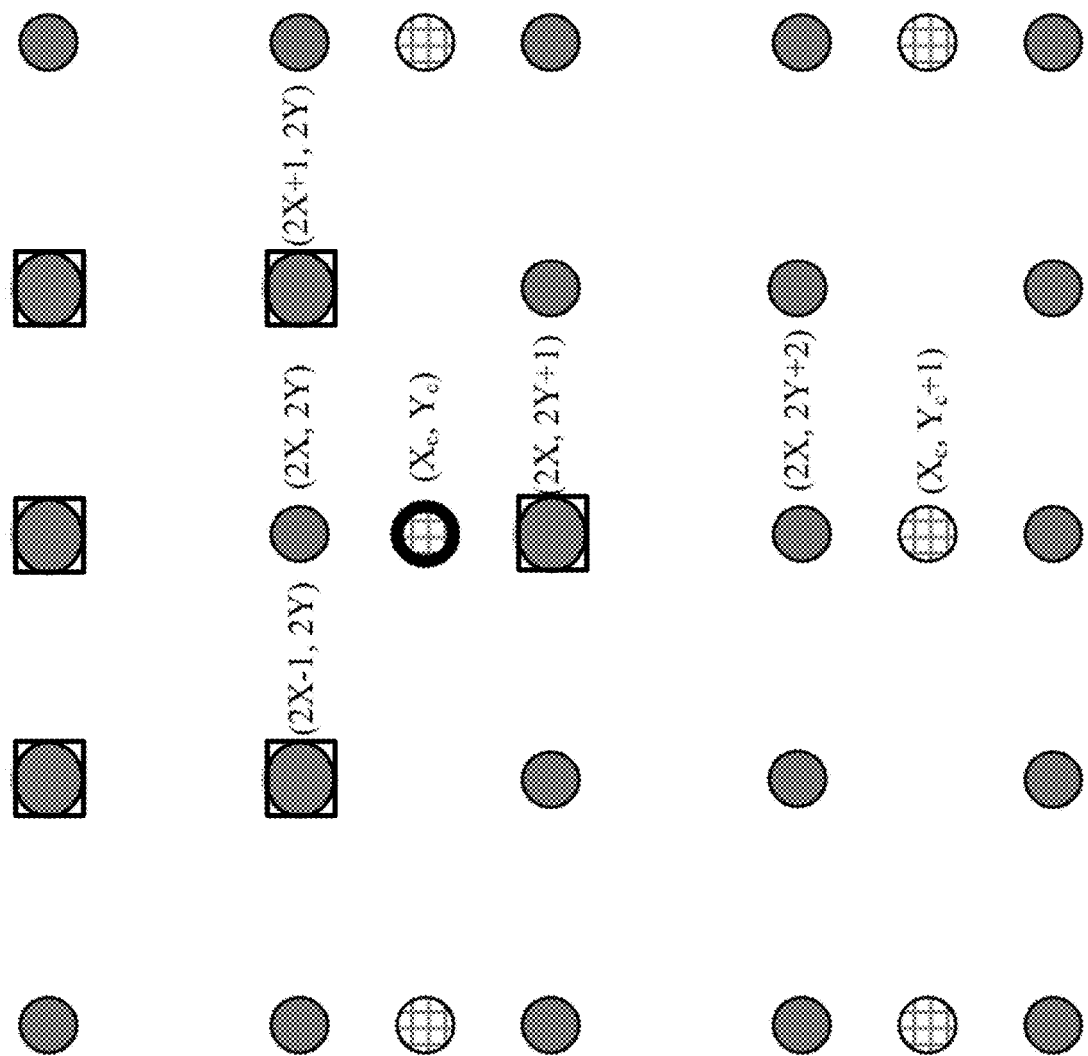
Figure 24B:
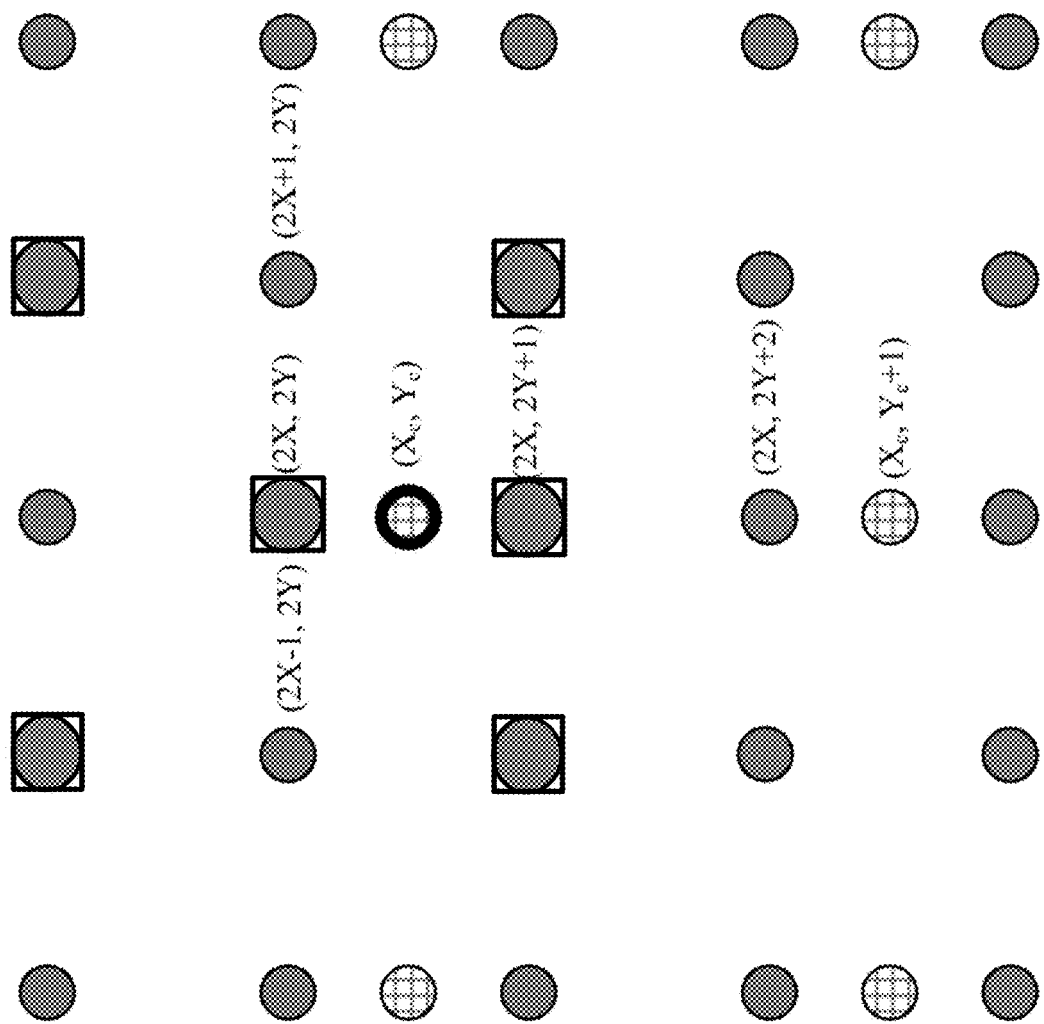
Figure 24C:
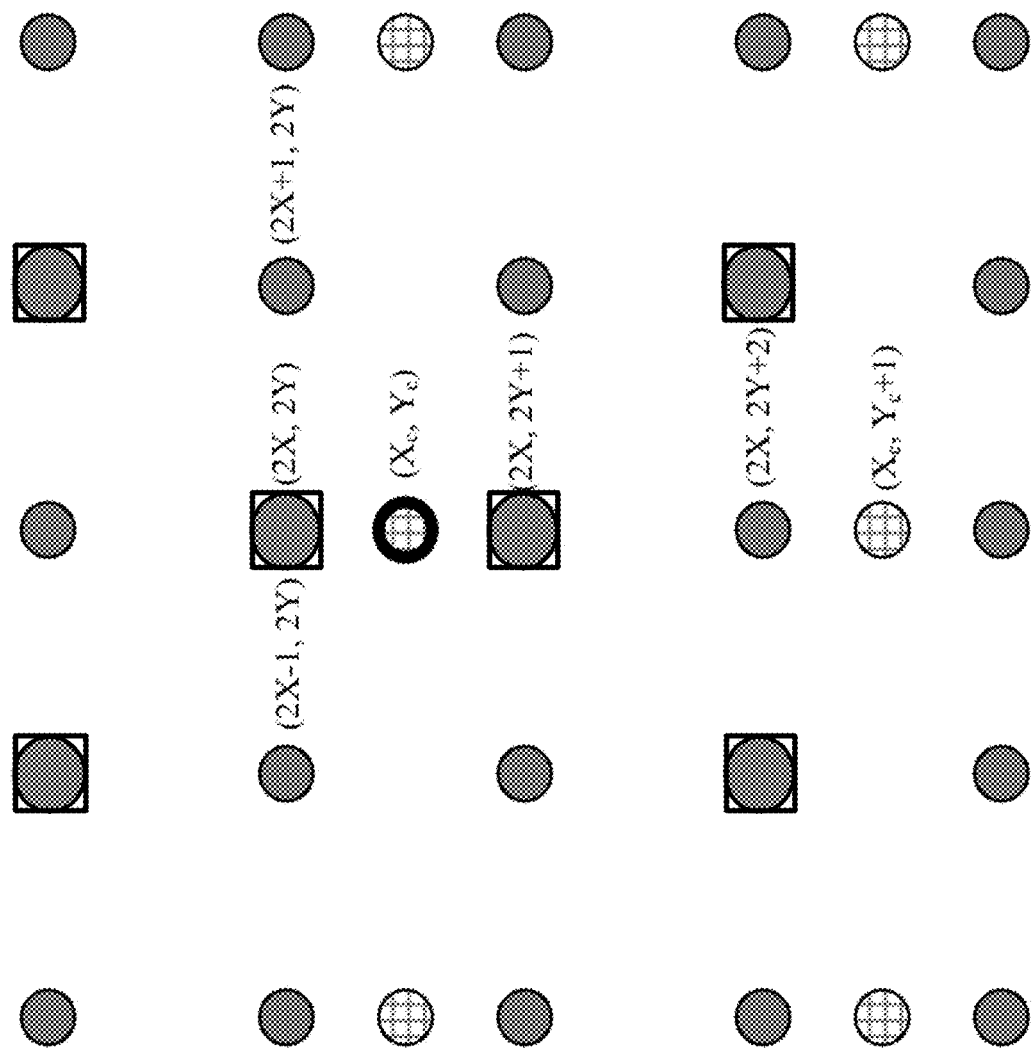
Figure 24D:
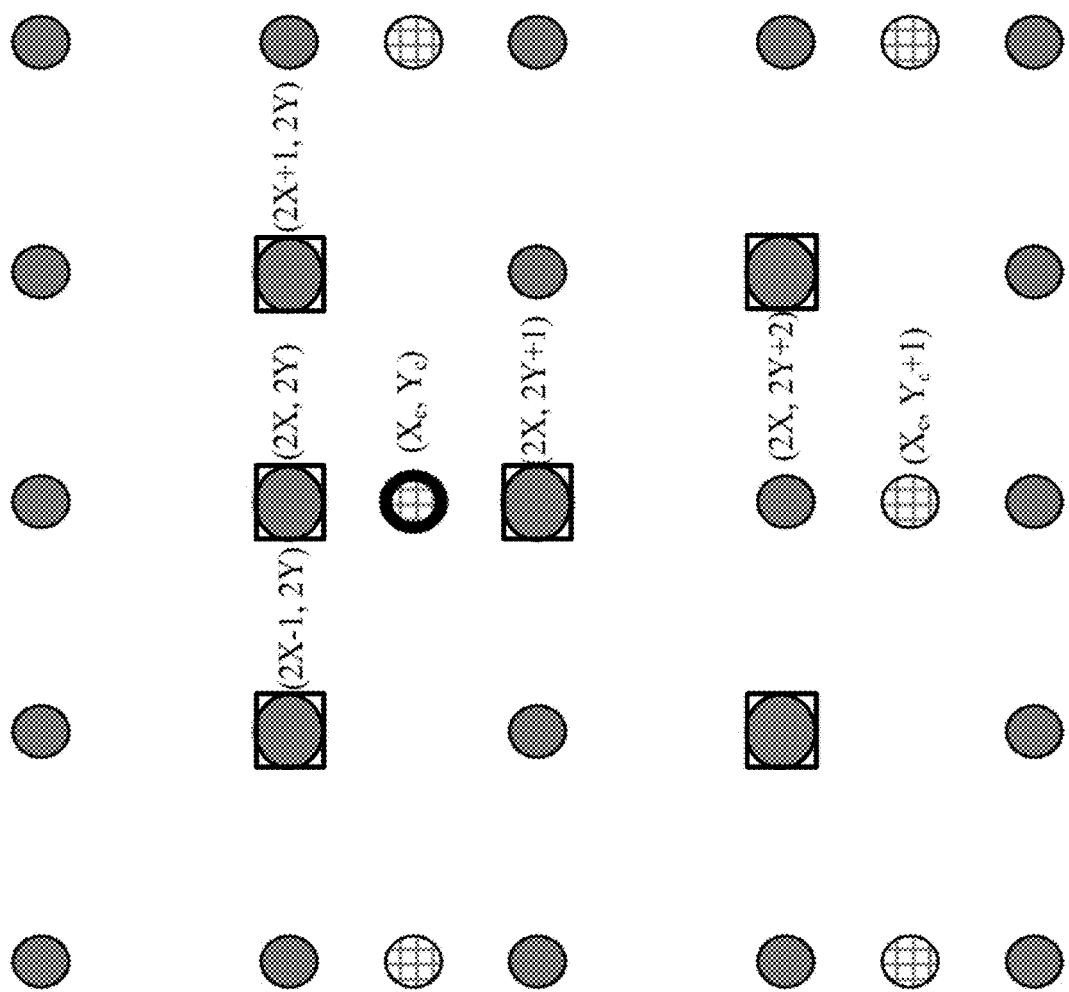
Figure 24E:
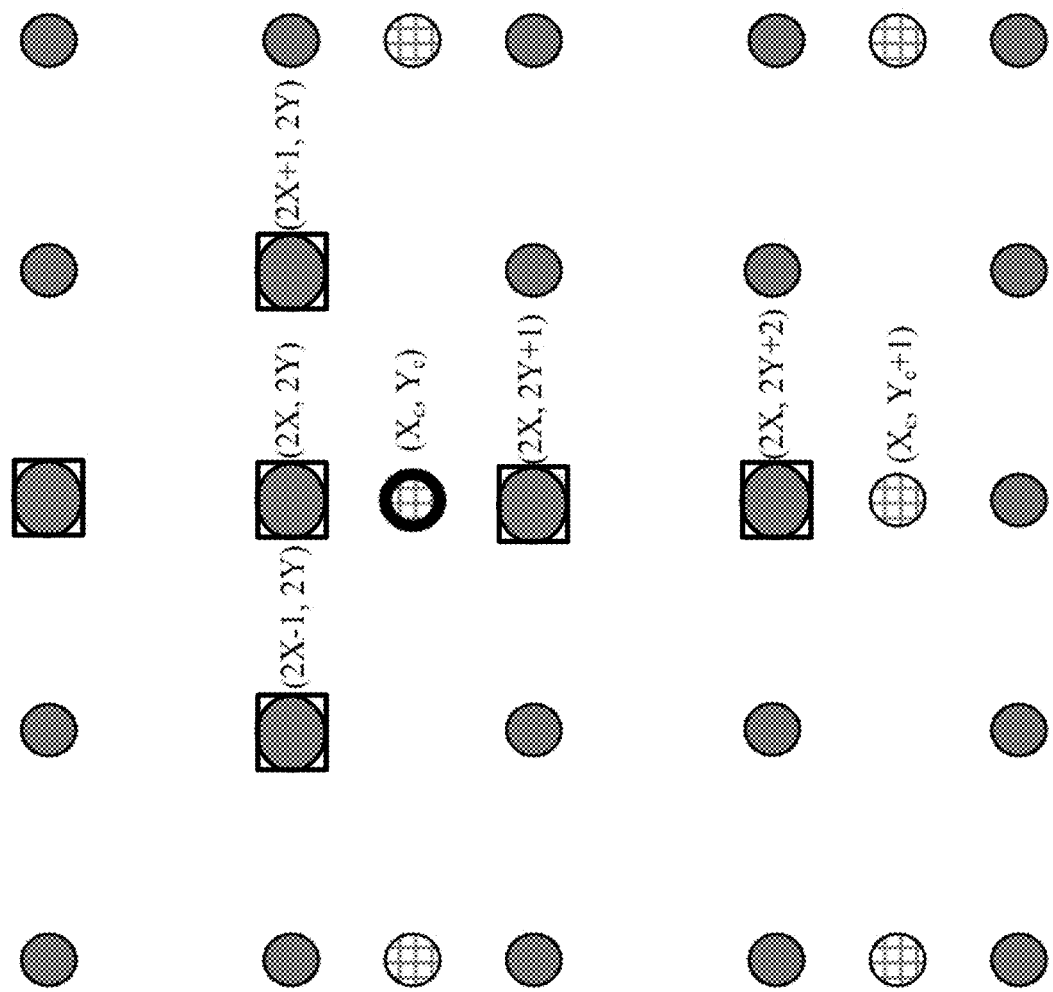
Figure 24F:
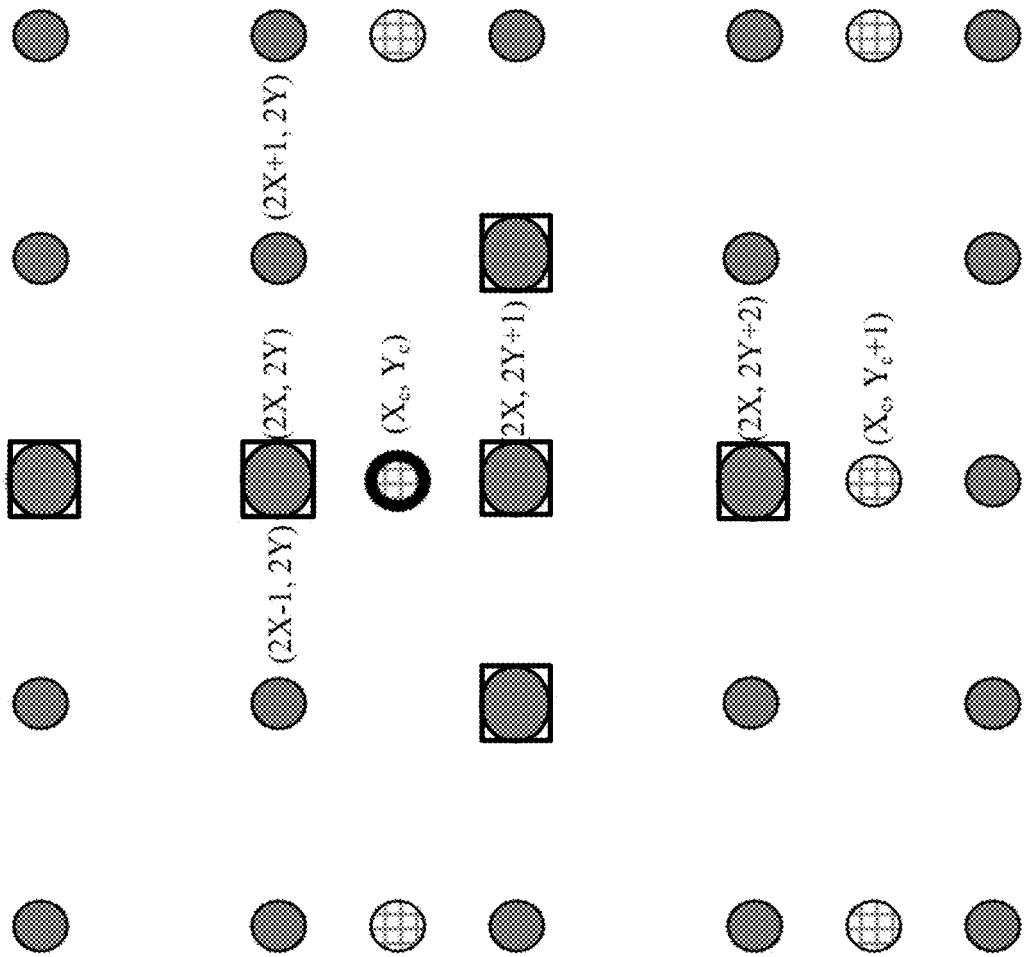
Figure 25A:
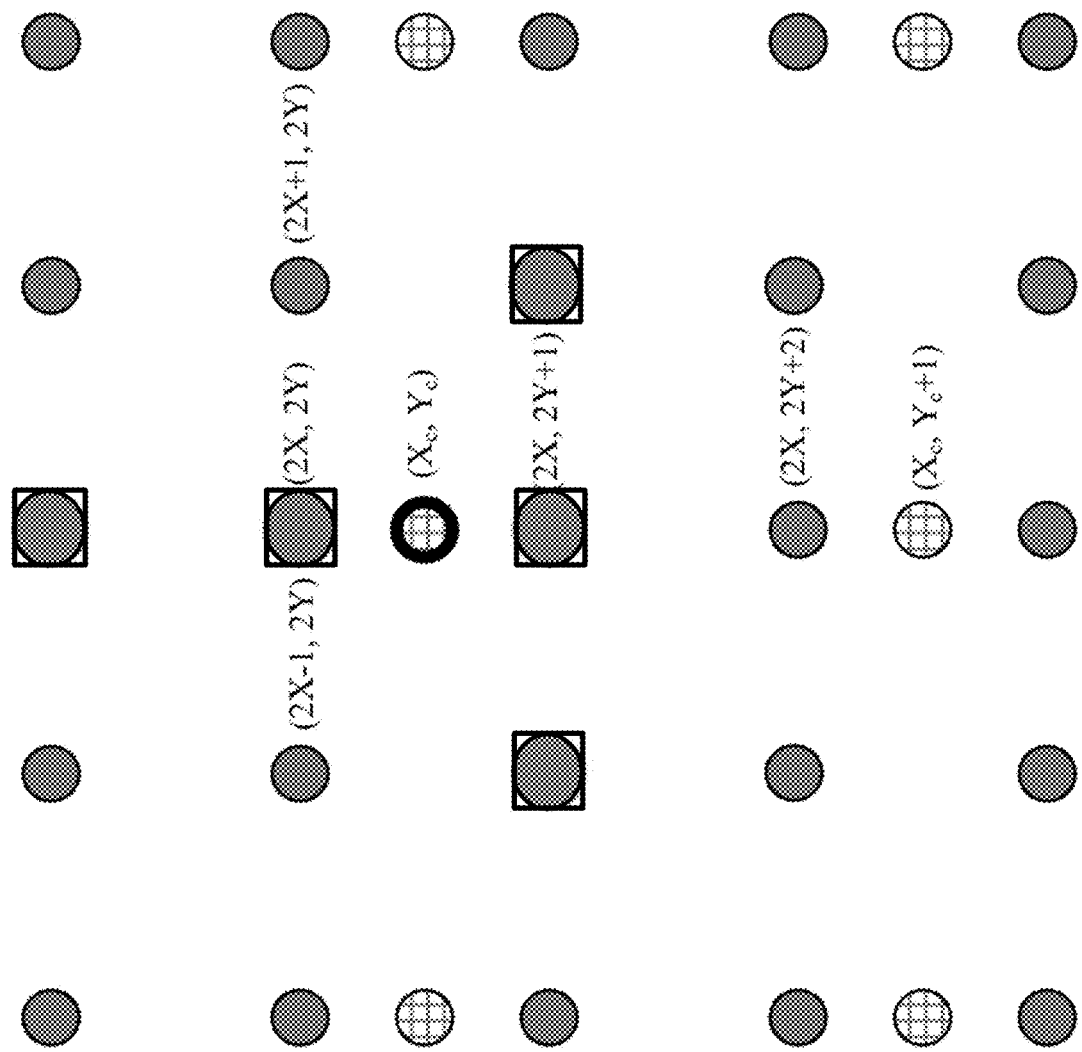
Figure 25B:
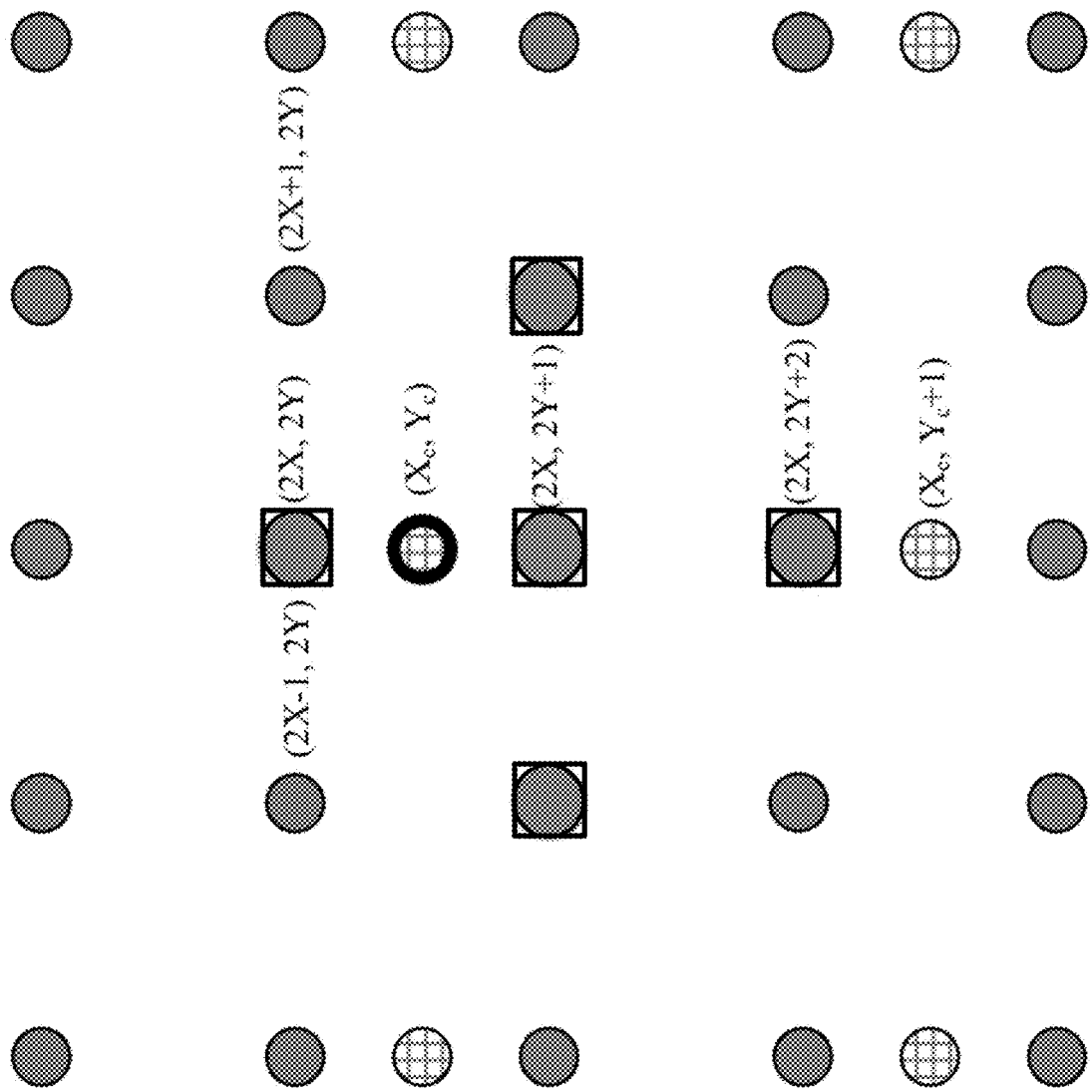
Figure 25C:
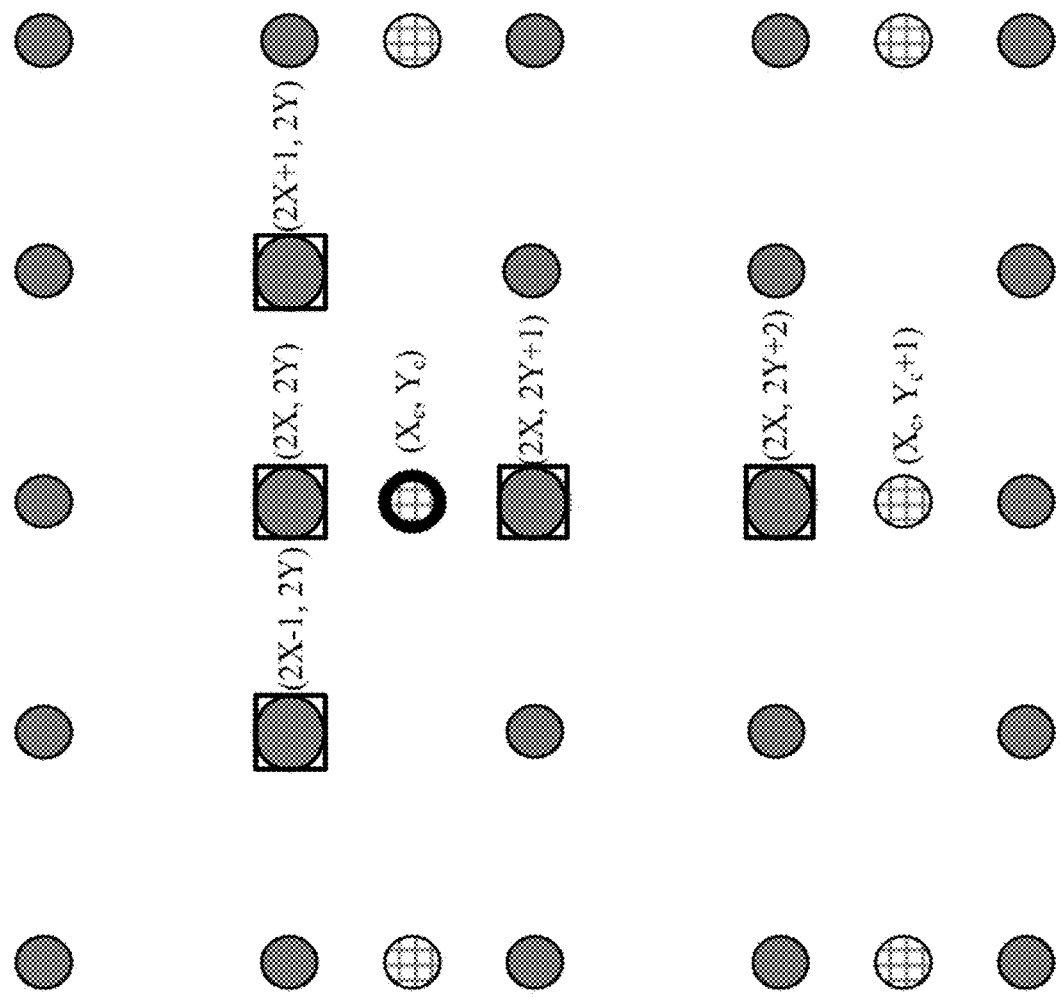
Figure 25D:
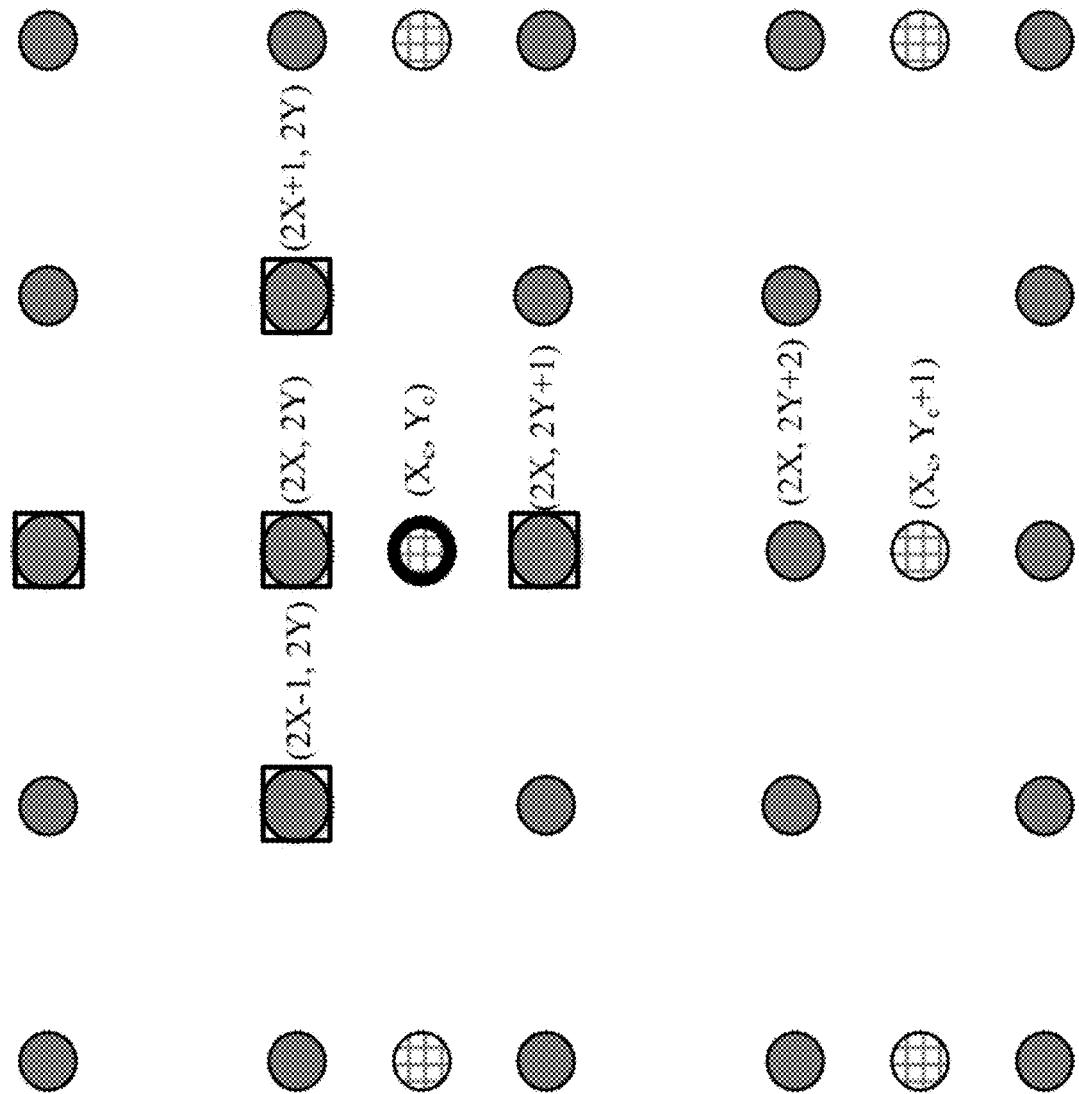
Figure 26A:
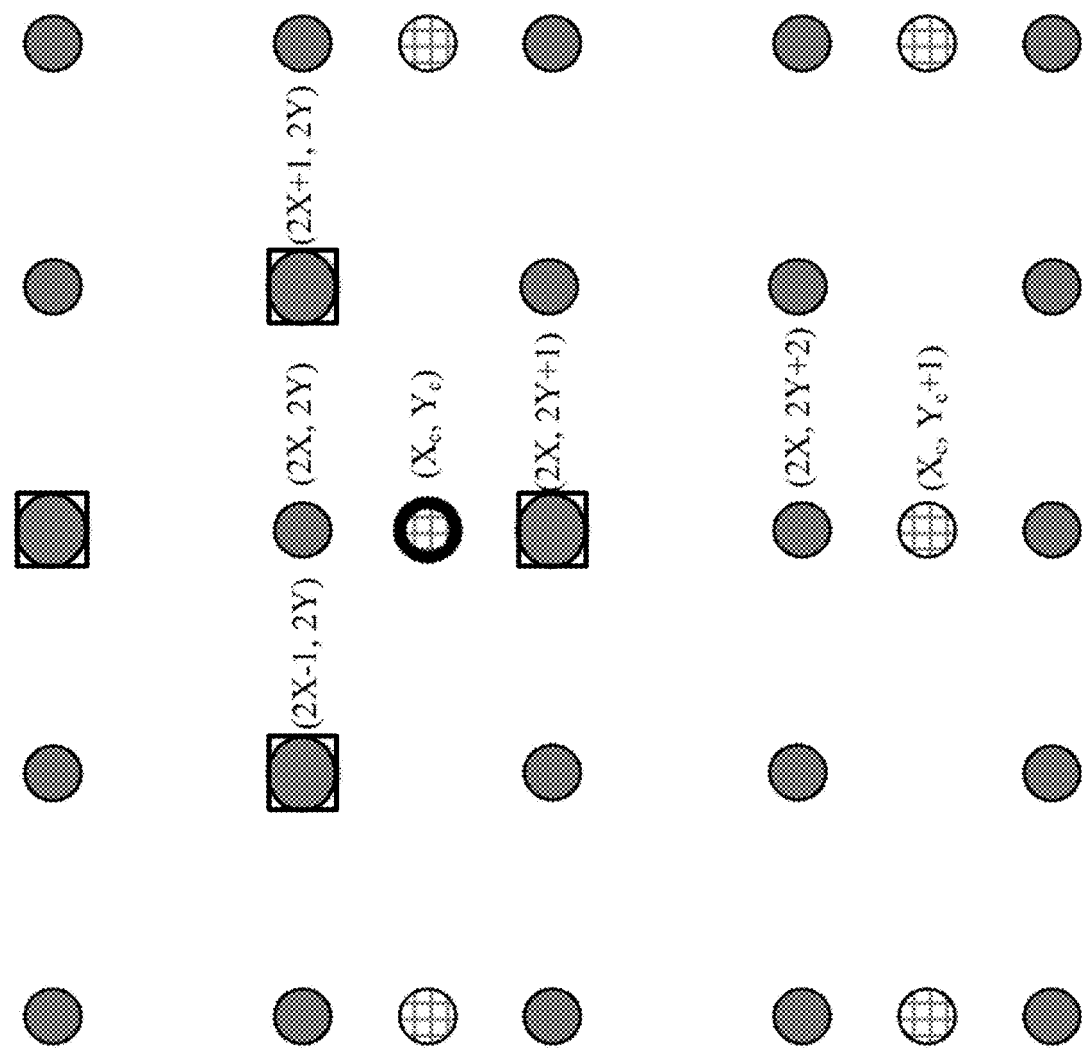
Figure 26B:
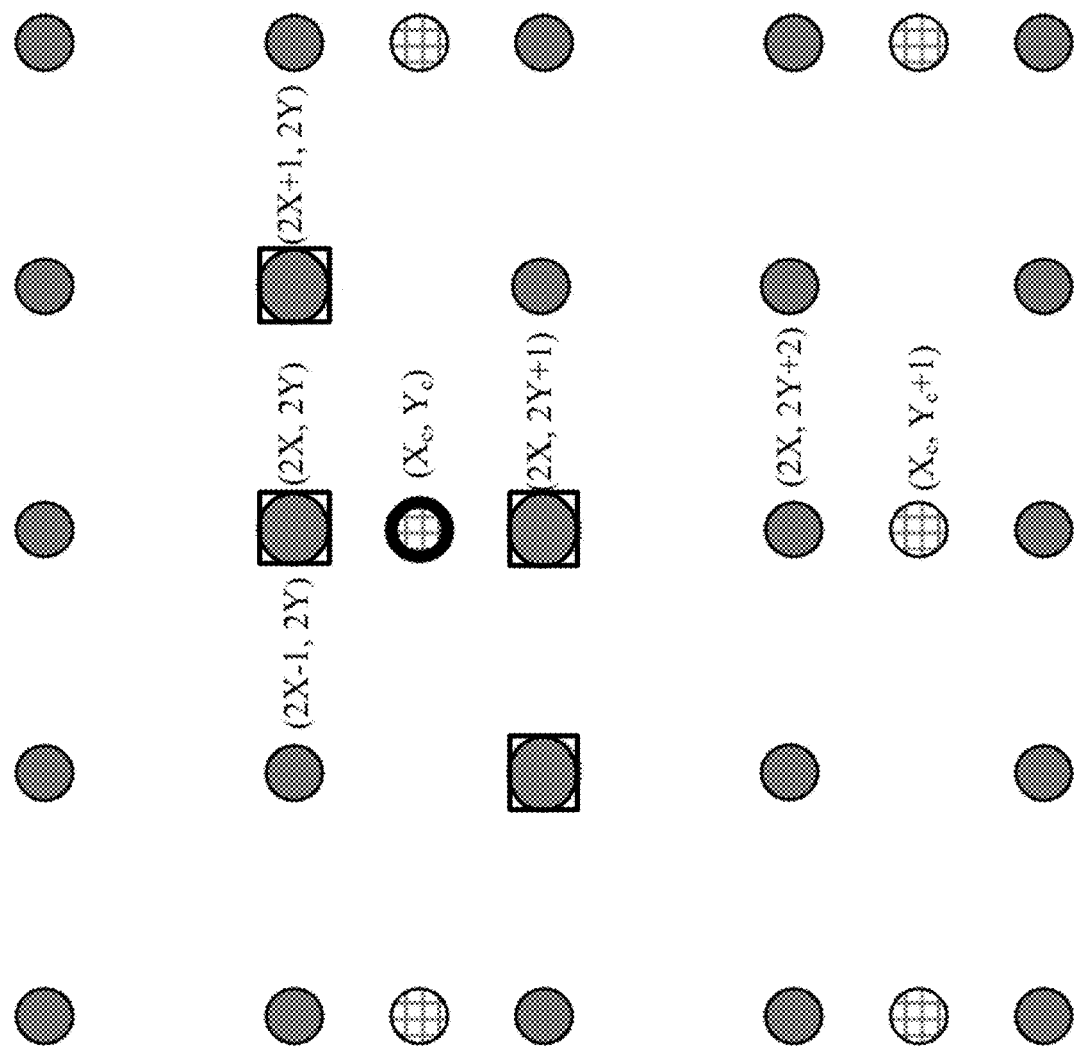
Figure 26D:
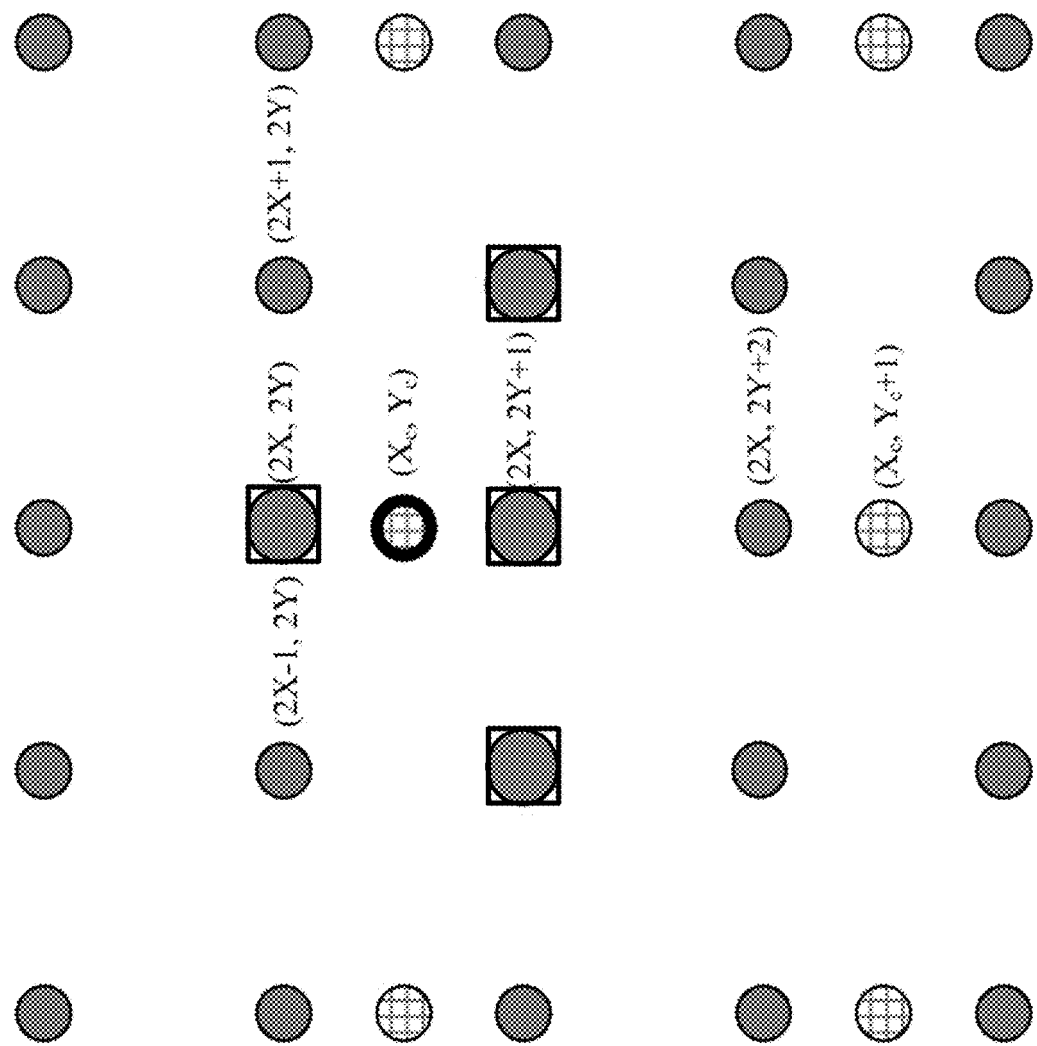
Figure 26E:
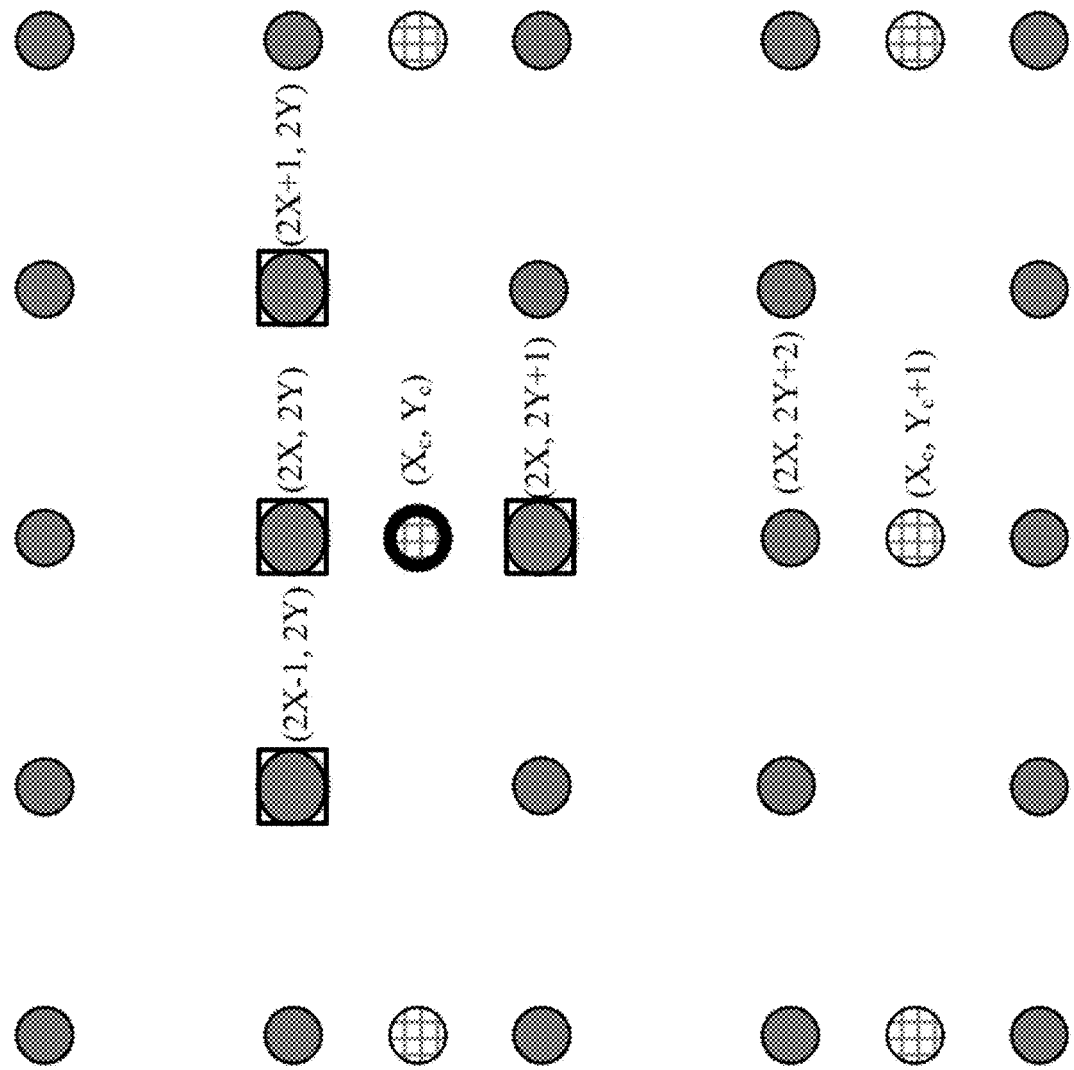

FIGS. 23A-23C show examples of symmetric 8-tap filters with 6 unique coefficients when filtering (Xc, Yc). FIGS. 23A, 23B and 23C respectively show type 1, type 2 and type 3 filters.

FIGS. 24A-24F show asymmetric 6-tap filters when filtering ($X_c$, $Y_c$). FIGS. 24A to 24F respectively show type 1, type 2, type 3, type 4, type 5 and type 6 filters.

FIGS. 25A-25D show asymmetric 5-tap filters when filtering ($X_c$, $Y_c$). FIGS. 25A to 25D respectively show type 1, type 2, type 3, type 4 filters.

FIGS. 26A-26D show asymmetric 4-tap filters when filtering ($X_c$, $Y_c$). FIGS. 26A to 26E respectively show type 1, type 2, type 3, type 4, type 5 filters.

Figure 27A:
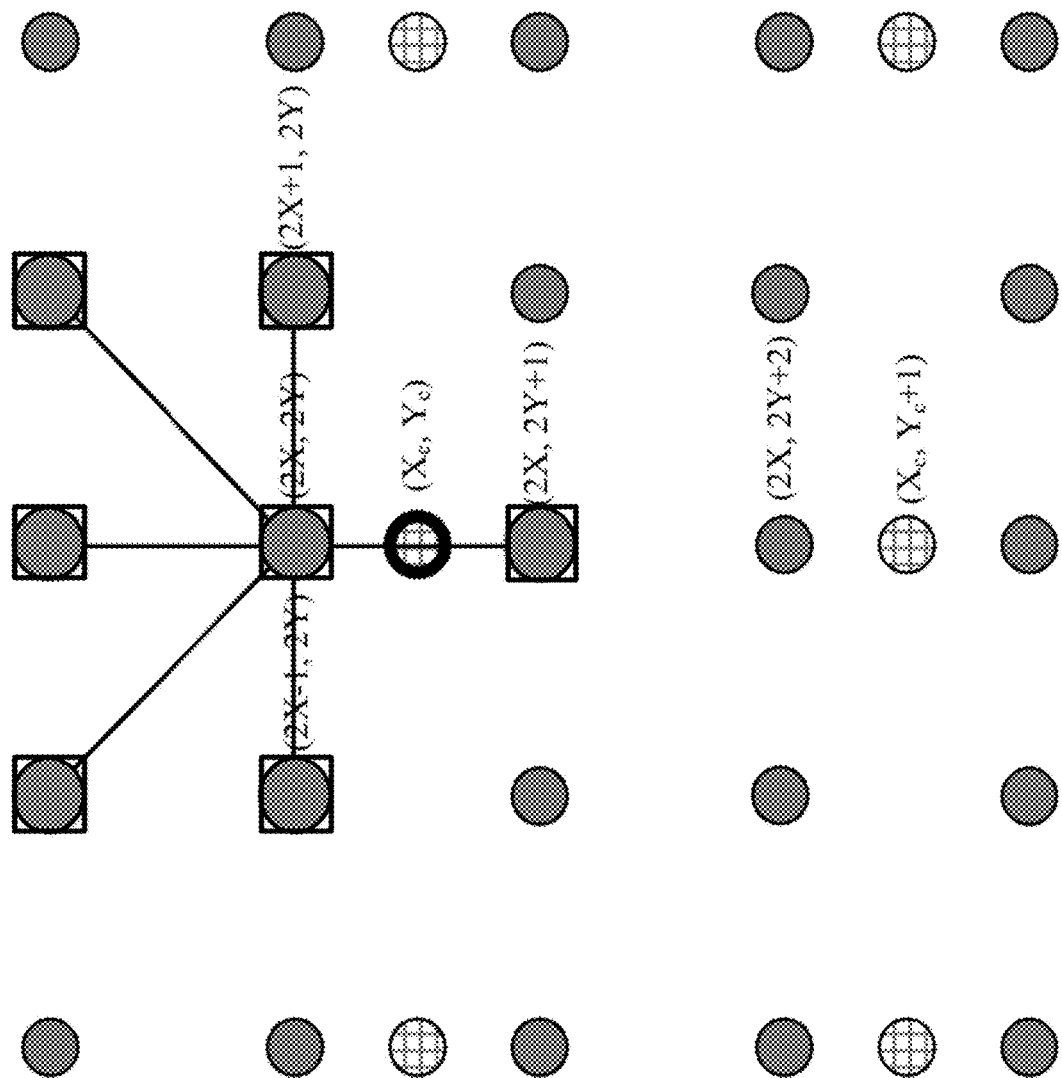
Figure 27B:
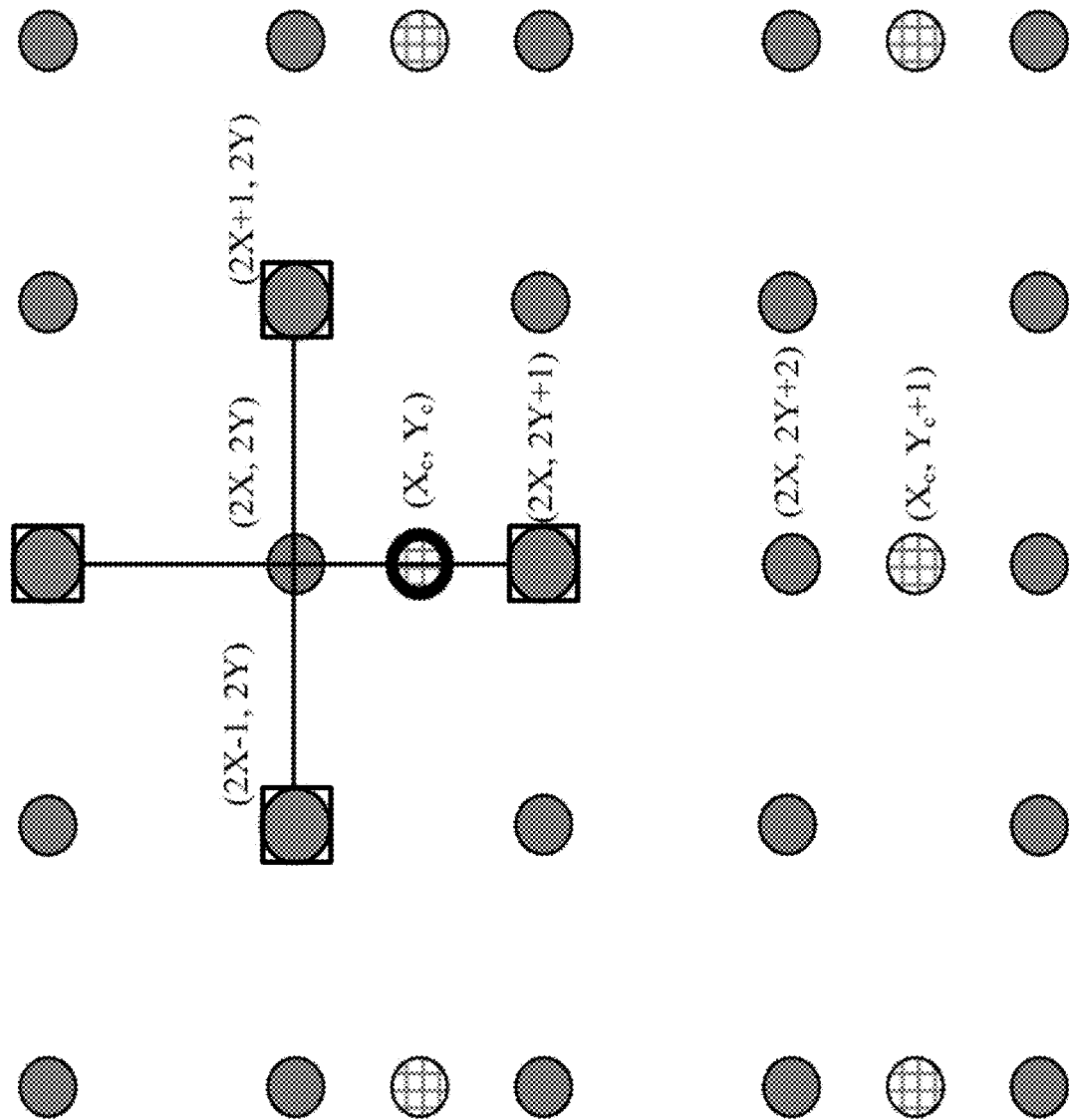

FIG. 27A-27B show examples of filter coefficients applied to luma differences in CC-ALF. FIGS. 27A, 27B show type 1 and type 2 filters respectively.

Figure 28:
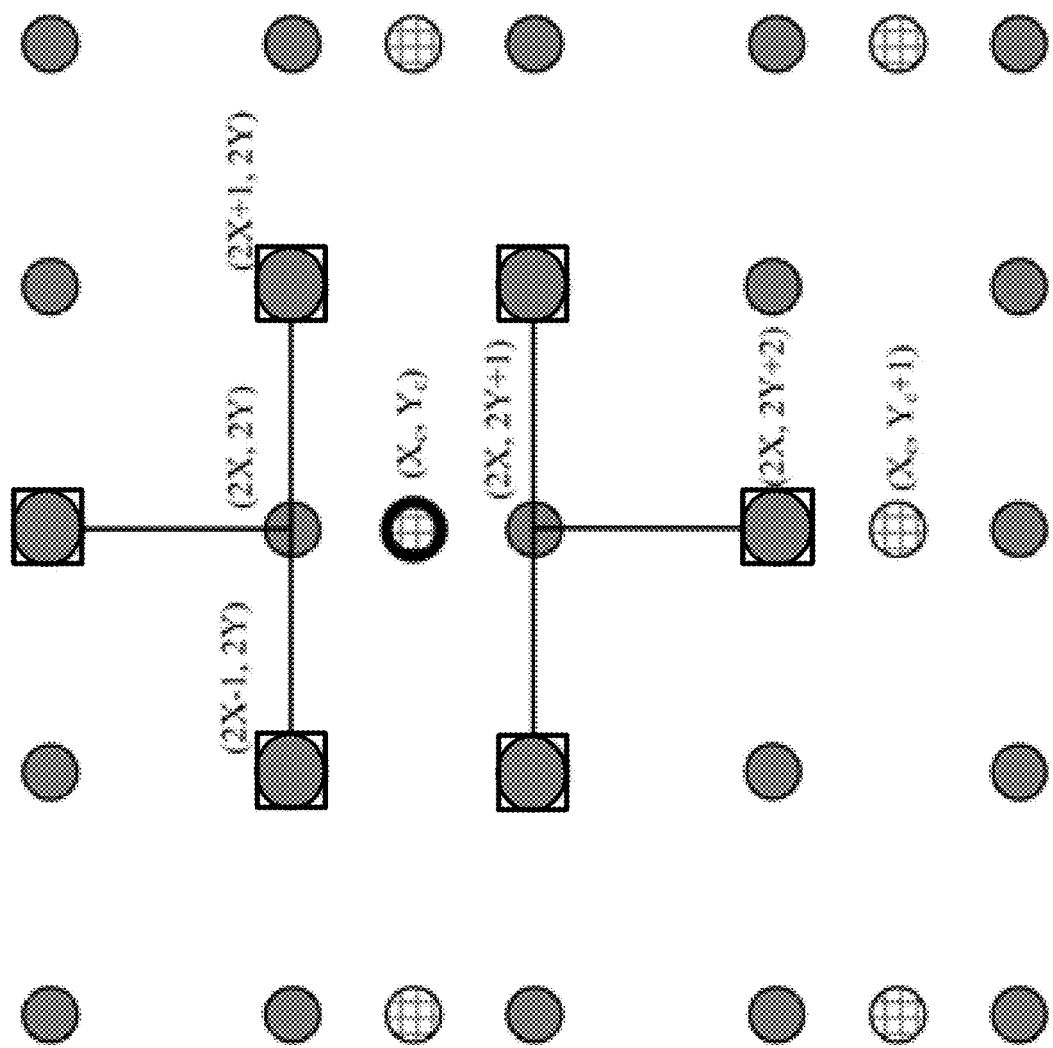

FIG. 28 shows examples of filter coefficients applied to luma differences (different center values) in CC-ALF.

Figure 29:
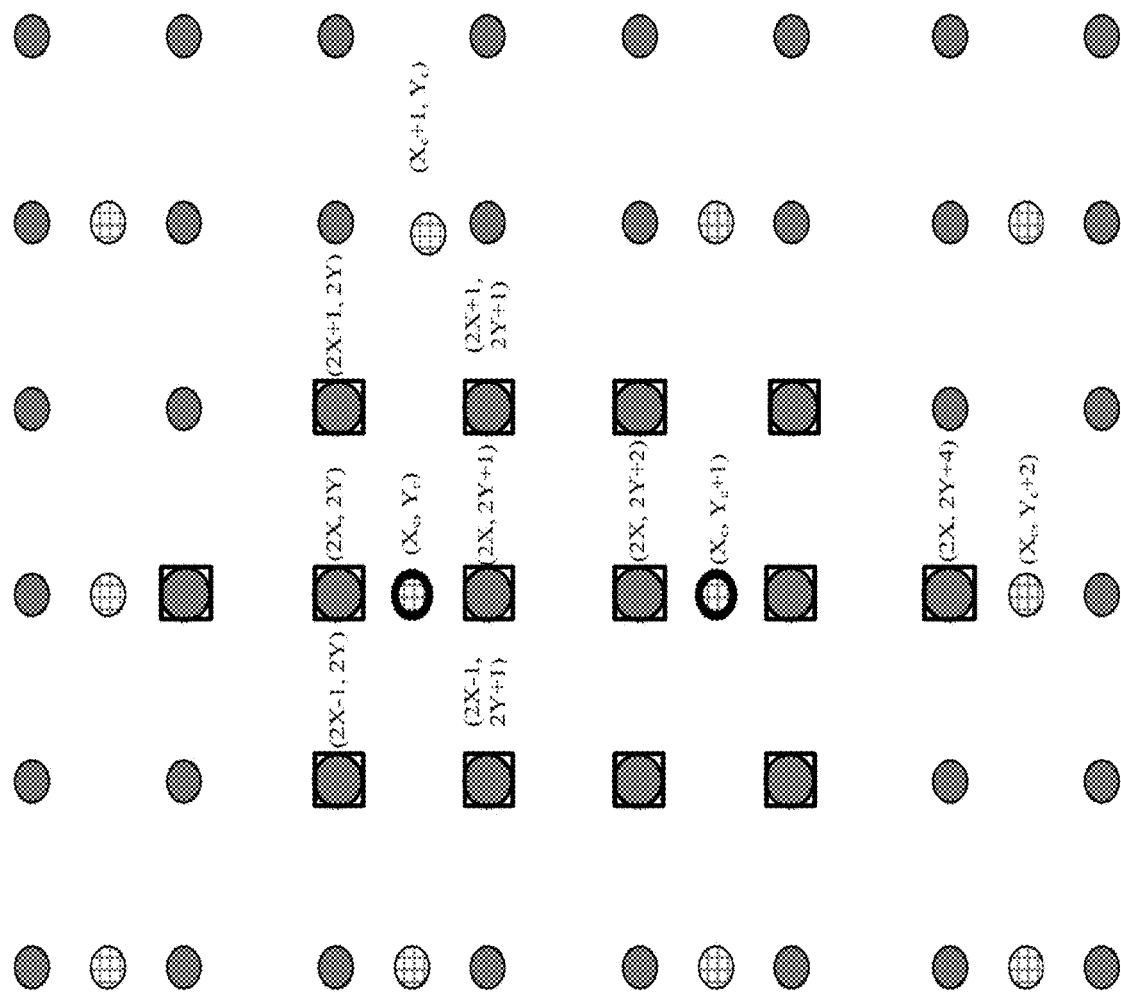

FIG. 29 shows examples of 14-tap filters for 1×2 sub-block based CC-ALF.

Figure 30:
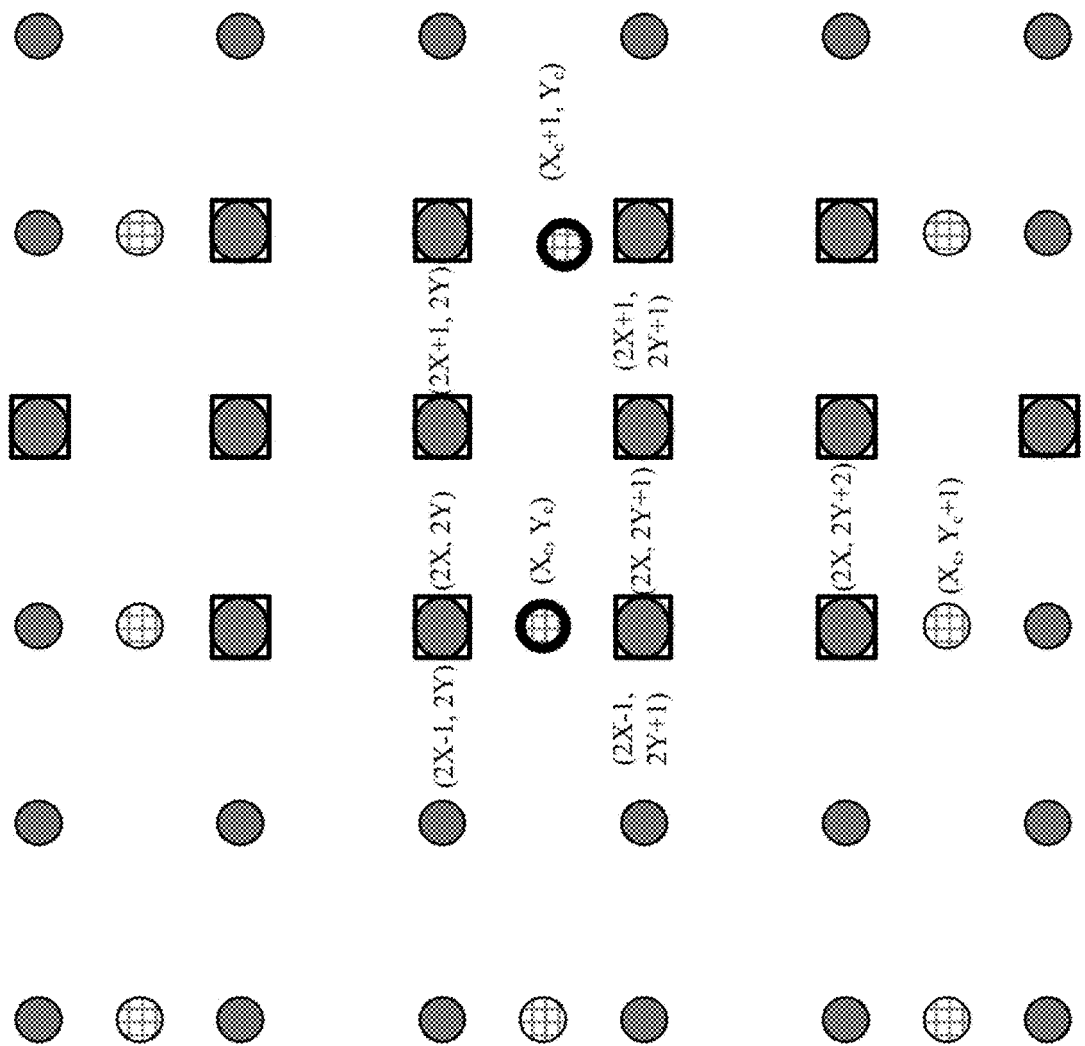

FIG. 30 shows examples of 14-tap filters for 2×1 sub-block based CC-ALF.

Figure 31:
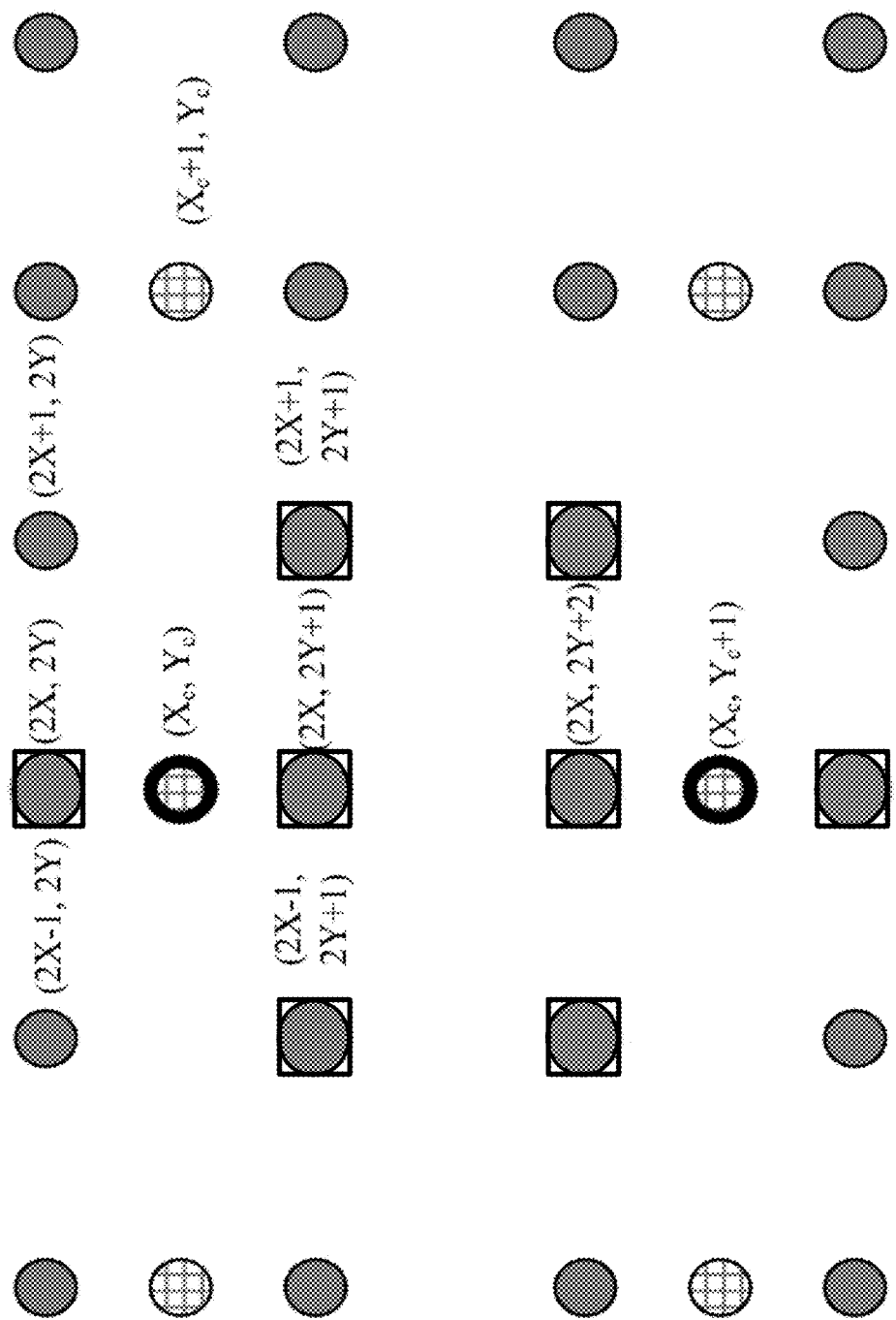

FIG. 31 shows examples of 8-tap filters for 1×2 sub-block based CC-ALF.

Figure 32:
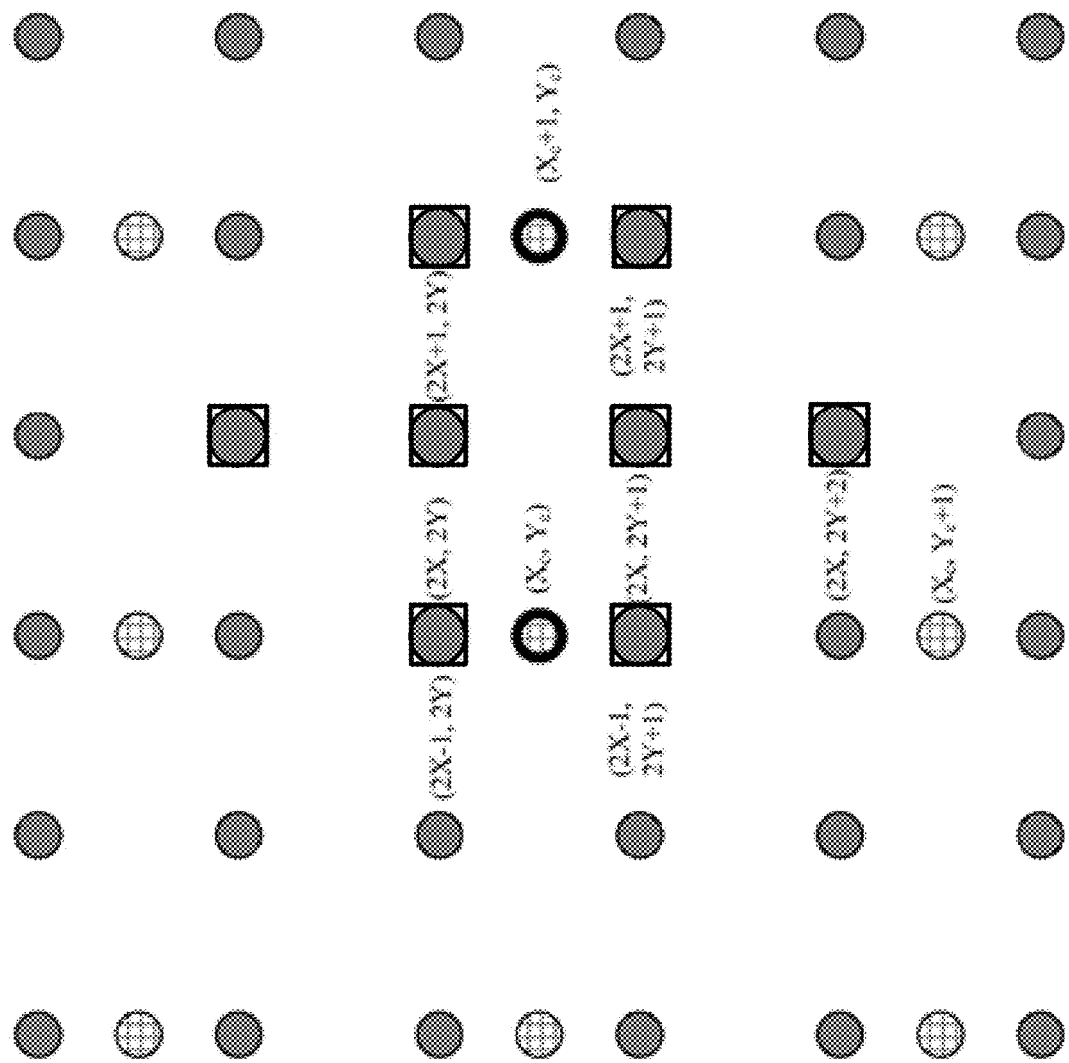

FIG. 32 examples of 8-tap filters for 2×1 sub-block based CC-ALF.

Figure 33:
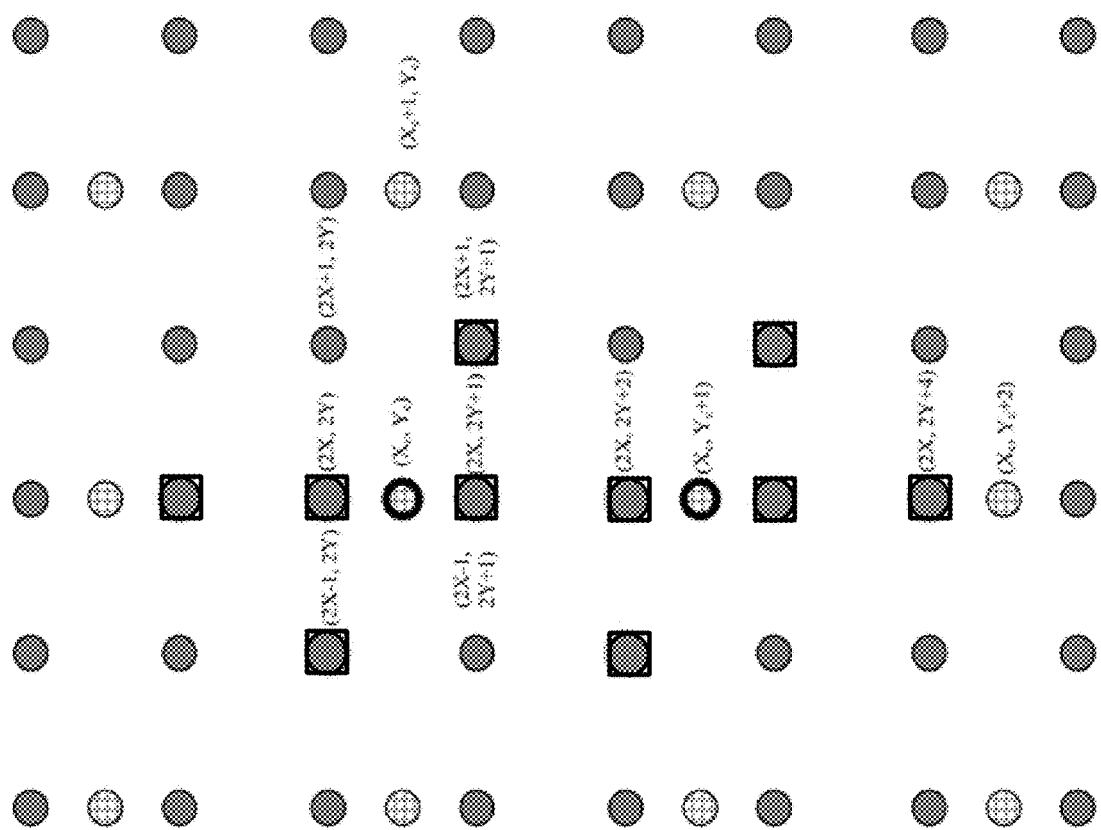

FIG. 33 shows examples of 10-tap filters for 1×2 sub-block based CC-ALF.

Figure 34A:
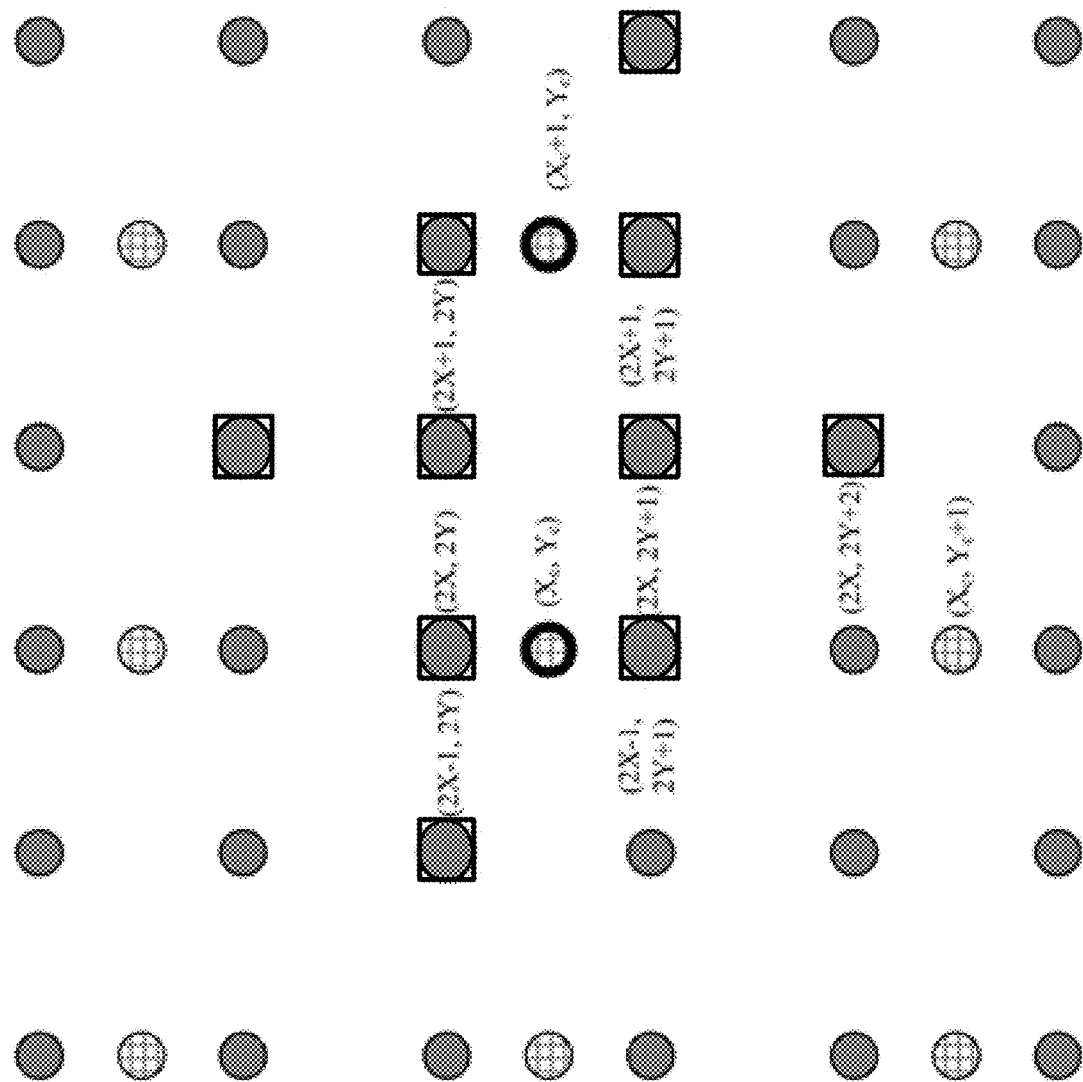
Figure 34B:
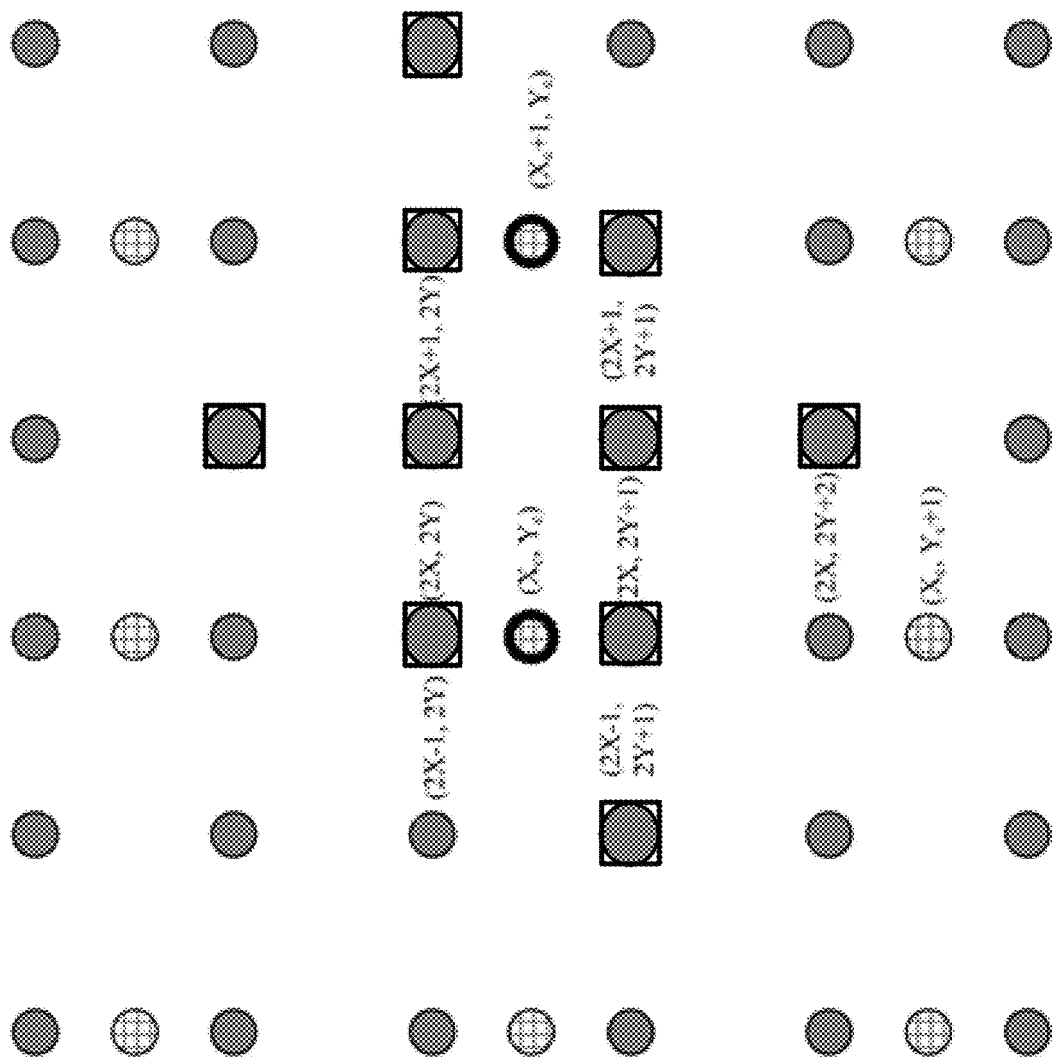

FIG. 34A-34B shows type 1 and type 2 10-tap filters for 2×1 sub-block based CC-ALF.

Figure 35:
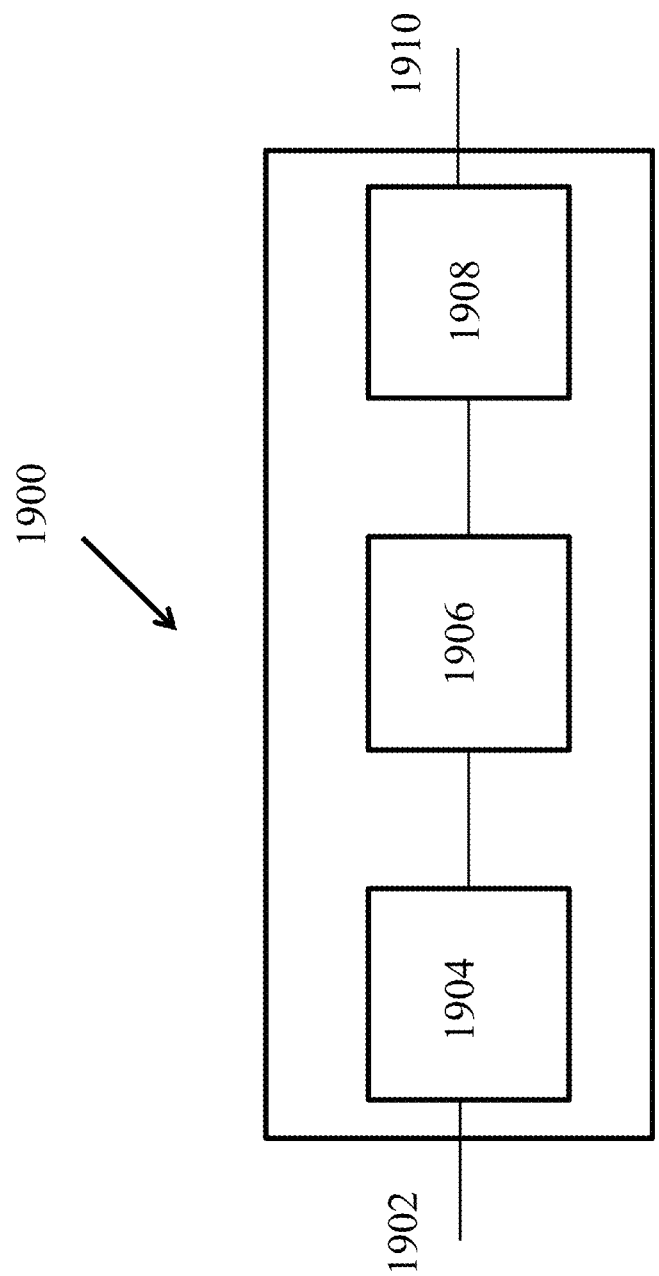
FIG. 35 is a block diagram of an example video processing system in which disclosed techniques may be implemented.

FIG. 35 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g, 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a bitstream representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 36:
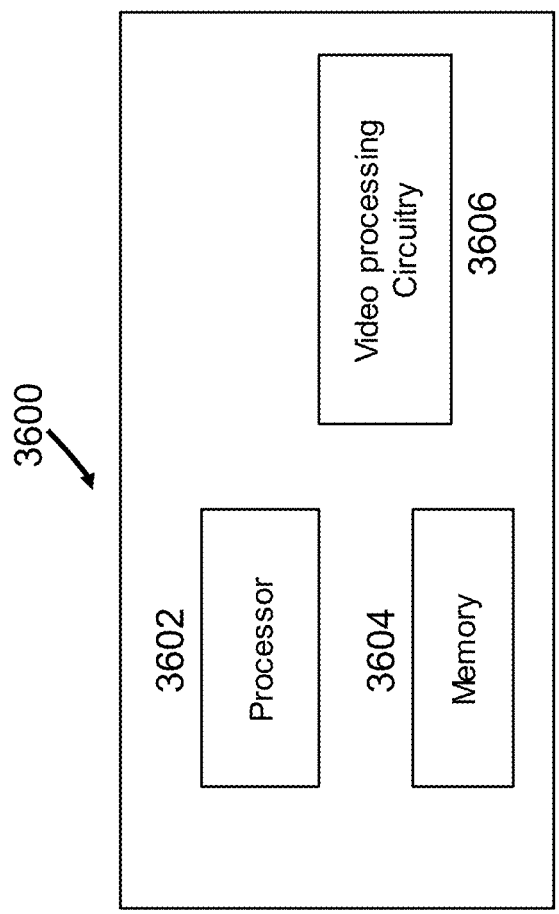
FIG. 36 is a block diagram of an example hardware platform used for video processing.

FIG. 36 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

A listing of solutions preferred by some embodiments is provided next.

The following solutions show example embodiments of techniques discussed in the previous section (e.g., item 1).

Figure 37:
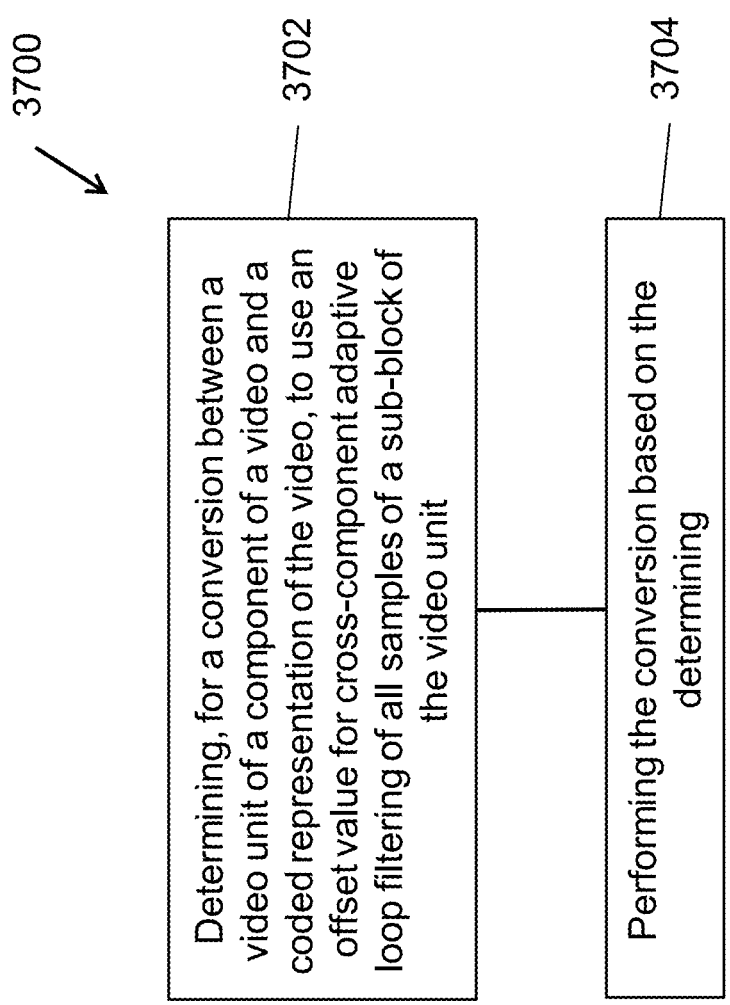
FIG. 37 is a flowchart for an example method of video processing.

1. A method of video processing (e.g., method 3700 in FIG. 37), comprising: determining (3702), for a conversion between a video unit of a component of a video and a bitstream representation of the video, to use an offset value for cross-component adaptive loop filtering of all samples of a sub-block of the video unit; and performing (3704) the conversion based on the determining, wherein the offset is also used for another processing operation in the conversion including one or more of an adaptive loop filtering operation.

2. The method of solution 1, wherein the component of the video is a color component of the video.

3. The method of any of solutions 1-2, wherein the video unit comprises a video block.

4. The method of any of solutions 1-3, wherein the sub-block size corresponds to an M×N array of samples.

5. The method of solution 4, wherein the sub-block size is signaled in the bitstream representation.

The following solutions show example embodiments of techniques discussed in the previous section (e.g., item 2).

6. A method of video processing, comprising: determining, for a conversion between a video unit of a component of a video and a bitstream representation of the video, to use a final offset value for a current sample of a sub-block of the video unit for cross-component adaptive loop filtering during the conversion; and performing the conversion based on the determining wherein the final offset value is based on a first offset value and a second offset value that is different from the first offset value.

7. The method of solution 6, wherein the first offset value is shared with neighboring samples and the second offset value that is specific to the current sample.

8. The method of any of solutions 6-7, wherein the sub-block is 2×1 in size.

9. The method of any of solutions 6-8, wherein samples used for determining the first offset value and the second offset value are different from each other.

10. The method of any of solutions 6-8, wherein at least some samples are both used for determining the first offset value and the second offset value.

11. The method of any of solutions 6-10, wherein a field in the bitstream representation indicates that the first offset value is used for the conversion.

The following solutions show example embodiments of techniques discussed in the previous section (e.g., item 3).

12. A method for video processing, comprising: determining, for a conversion between a video unit of a component of a video and a bitstream representation of the video, to use an N-tap symmetric filter for a cross-component adaptive loop filter computation during the conversion; and performing the conversion based on the determining; wherein at least two filter coefficients for two samples with a support of the N-tap symmetric filter share a same value.

13. The method of solution 12, wherein N=6 or 8.

14. The method of any of solutions 12-13, wherein a field in the bitstream representation signals the same value that is shared by two samples.

The following solutions show example embodiments of techniques discussed in the previous section (e.g, item 4).

15. A method for video processing, comprising: determining, for a conversion between a video unit of a component of a video and a bitstream representation of the video, to use an N-tap asymmetric filter for a cross-component adaptive loop filter computation during the conversion, where N is a positive integer; and performing the conversion based on the determining.

16. The method of solution 15 wherein N<8.

The following solutions show example embodiments of techniques discussed in the previous section (e.g., item 5).

17. A method of video processing, comprising: performing a conversion between a video unit of a first component of a video and a bitstream representation of the video; wherein the conversion of a sample of the first component includes applying a cross-component adaptive loop filter on sample differences of a second component of the video.

18. The method of solution 17, wherein the first component is a color component and the second component is a luma component.

19. The method of solutions 17 or 18, wherein the sample difference of the second component is determined by differencing a luma representative sample in a luma filter support region and another luma sample in the luma filter support region.

20. The method of solution 19, wherein the sample is located at a location (X, Y) and the representative luma sample is selected from location (2X, 2Y), wherein X and Y are integer offsets to the sample location from a top left corner of the video unit located at (0, 0).

21. The method of solution 19, wherein the sample is located at a location (X, Y) and the representative luma sample is selected from location (2X, 2Y) and the another luma sample is located at (2X+1, 2Y), wherein X and Y are integer offsets to the sample location from a top left corner of the video unit located at (0, 0).

The following solutions show example embodiments of techniques discussed in the previous section (e.g., item 6).

22. A method of video processing, comprising: determining to use two or more filters from a set of multiple filters for a cross-component adaptive loop filtering during a conversion between a sub-block of a video unit of a component of video and a bitstream representation of the video; and performing the conversion based on the determining.

23. The method of solution 22, wherein a field in the bitstream representation indicates a length N of the set of multiple filters and/or a support of the two or more filters.

24. The method of any of solutions 22-23, wherein offsets used in the cross-component loop filtering are determined by using luma samples of a luma component corresponding to the sub-block using a pre-defined support.

The following solutions show example embodiments of techniques discussed in the previous section (e.g., items 7, 8).

25. A method of video processing, comprising: determining, for a conversion between a sub-block of a first component of a video unit of a video and a bitstream representation of the video, a filter having support across multiple components of the video or across multiple pictures of the video for performing a cross-component adaptive loop filtering during the conversion; and performing the conversion based on the determining.

26. The method of solution 25, wherein one or more syntax elements in the bitstream representation indicate the use of the filter and/or the multiple components used for supporting the filter.

27. The method of solution 26, wherein the one or more syntax elements are in a sequential order in which filter coefficients of a second component are indicated followed by filter coefficients of a third component.

28. The method of solution 26, wherein the one or more syntax elements are in an interleaved order in which filter coefficients of a second component are indicated followed by filter coefficients of a third component.

29. The method of solution 25, wherein one or more syntax elements in the bitstream representation indicate use of the multiple pictures and/or identifies the multiple pictures.

30. The method of solution 25, wherein the multiple pictures exclude a reference picture used during the conversion.

The following solutions show example embodiments of techniques discussed in the previous section (e.g., items 9, 10, 11).

31. A method of video processing, comprising: determining, for a conversion between a sub-block of a video unit of a component of a video and a bitstream representation of the video, whether a cross-component adaptive loop filter (CC-ALF) is enabled for the conversion according to a position rule; and performing the conversion based on the determining.

32. The method of solution 31, wherein the position rule specifies to disable the CC-AIF between a coding tree block bottom boundary and a virtual boundary of loop filtering.

33. The method of solution 31, wherein the position rule specifies to disable the CC-AIF between a coding tree unit bottom boundary and a virtual boundary of loop filtering.

34. The method of solution 31, wherein the position rule specifies to disable the CC-AIF at positions where another filtering is applied during the conversion.

35. The method of any of solutions 1-34, wherein the video unit comprises a video block or a video slice or a video picture.

36. The method of any of solutions 1-34, wherein a syntax element indicative of a use of the method for the conversion is includes at a sequence level or a picture level or a slice level or a tile group level in sequence header or a picture header or a sequence parameter set of a video parameter set or a picture parameter set or an adaptive parameter set or a slice header or a tile group header.

37. The method of any of solutions 1-36, wherein the method is selectively applied due to a coded information of the video.

38. The method of solution 37, wherein the characteristic includes a color format or a partitioning type or a position of the sub-block with respect to a coding unit or a coding tree unit.

39. The method of any of solutions 1-38, wherein the performing the conversion comprising encoding the video to generate the bitstream representation.

40. The method of any of solutions 1-38, wherein the performing the conversion comprises parsing and decoding the bitstream representation to generate the video.

41. A video decoding apparatus comprising a processor configured to implement a method recited in one or more of solutions 1 to 40.

42. A video encoding apparatus comprising a processor configured to implement a method recited in one or more of solutions 1 to 40.

43. A computer program product having computer code stored thereon, the code, when executed by a processor, causes the processor to implement a method recited in any of solutions 1 to 40.

44. A method, apparatus or system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Figure 38:
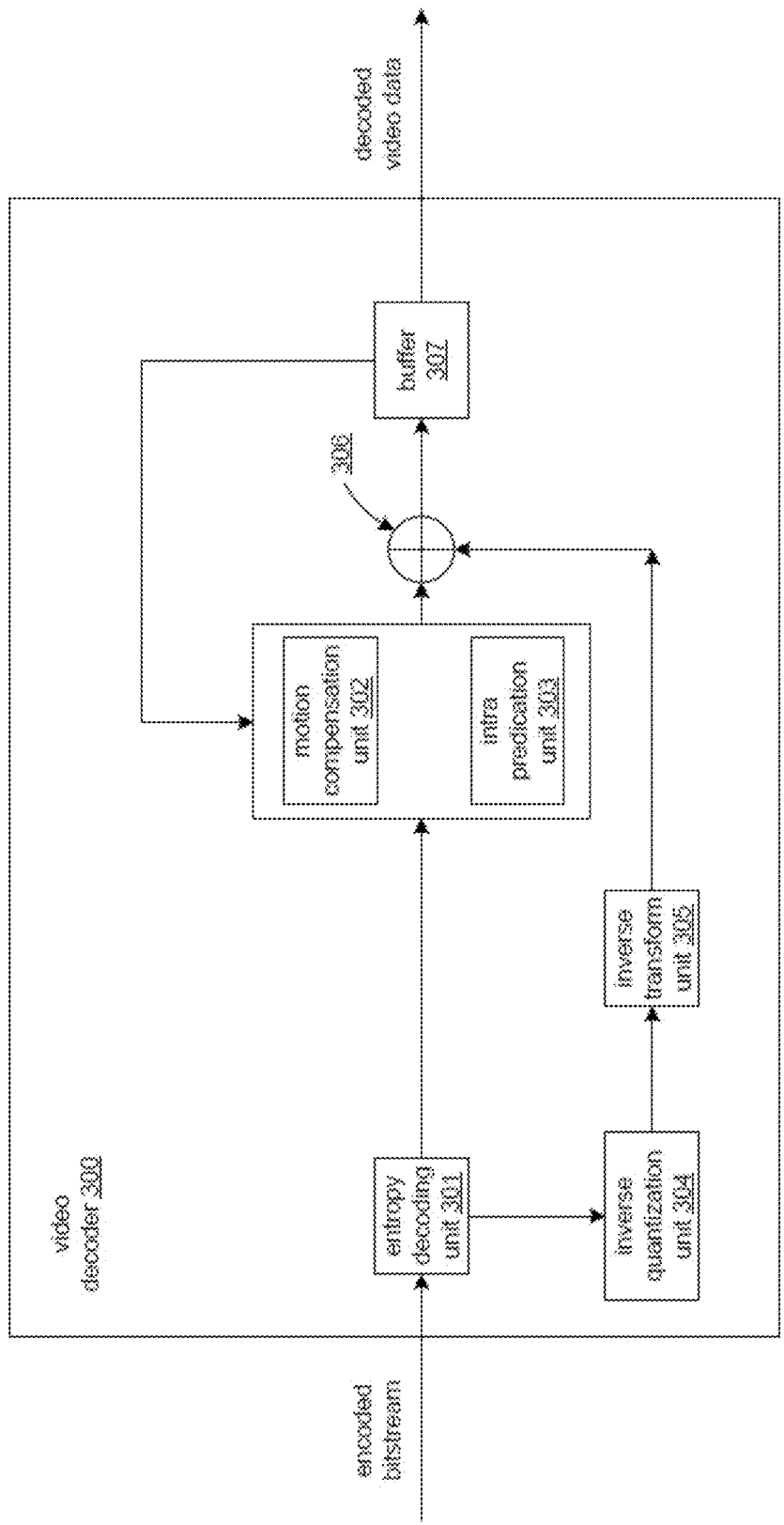
FIG. 38 is a block diagram illustrating an example of video decoder.
Figure 39:
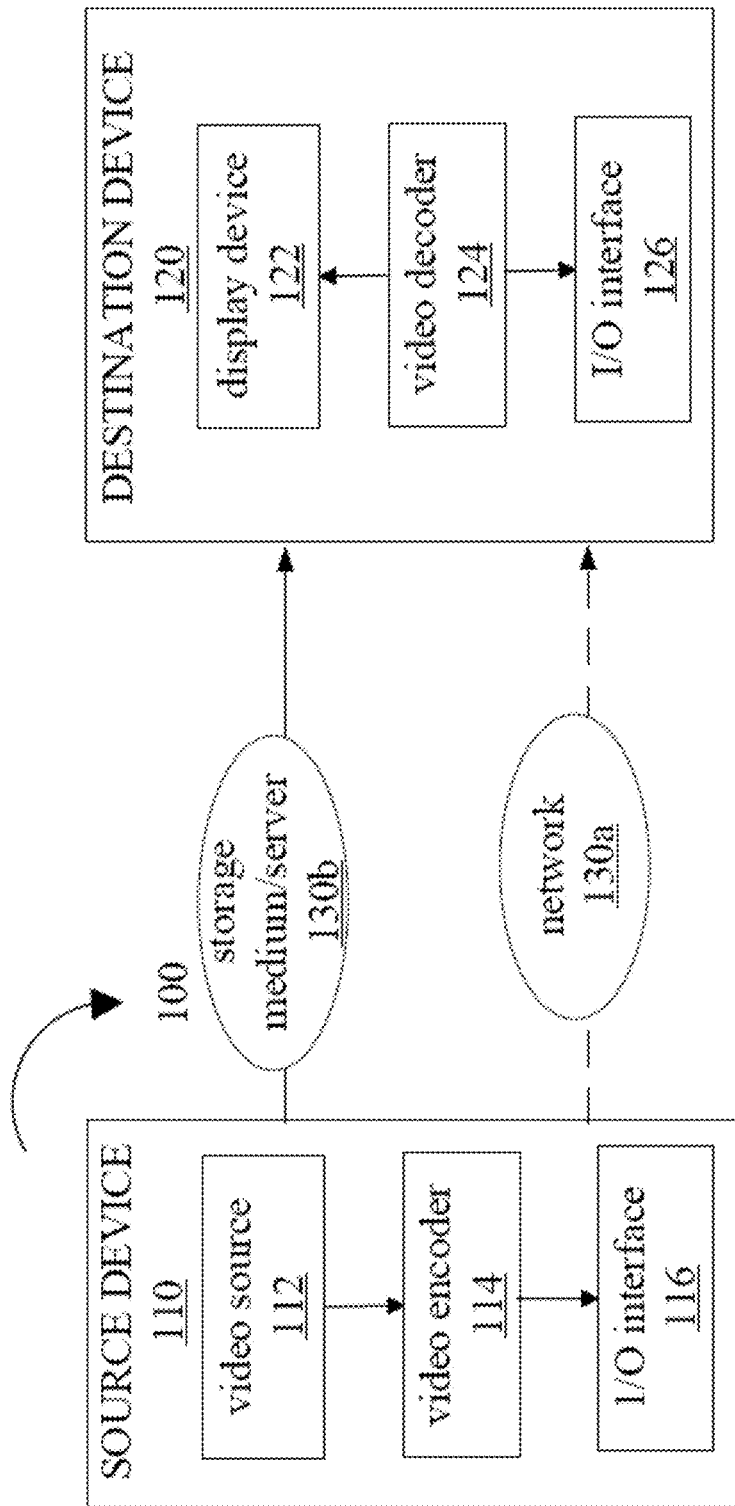
FIG. 39 is a block diagram that illustrates an example video coding system that may utilize the techniques of this disclosure.

FIG. 38 is a block diagram illustrating an example of video decoder 300 which may be video decoder 114 in the system 100 illustrated in FIG. 39.

The video decoder 300 may be configured to perform any or all of the techniques of this disclosure. In the example of FIG. 38, the video decoder 300 includes a plurality of functional components. The techniques described in this disclosure may be shared among the various components of the video decoder 300. In some examples, a processor may be configured to perform any or all of the techniques described in this disclosure.

Figure 40:
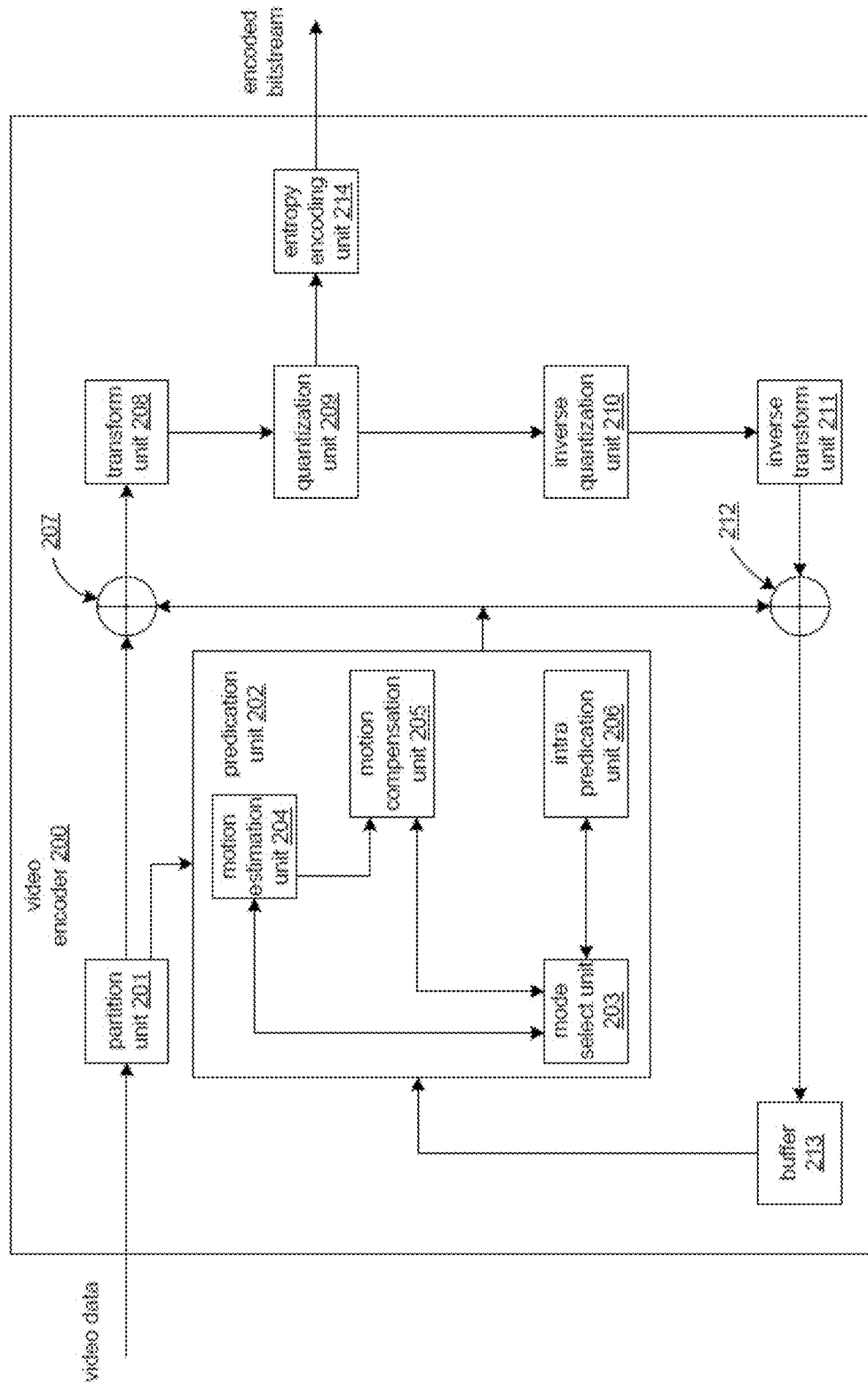
FIG. 40 is a block diagram illustrating an example of video encoder.

In the example of FIG. 38, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 40).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

In the present document, the term "video processing" may refer to video encoding, video decoding, video compression or video decompression. For example, video compression algorithms may be applied during conversion from pixel representation of a video to a corresponding bitstream representation or vice versa. The bitstream representation, or bitstream representation, of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the bitstream representation accordingly by including or excluding the syntax fields from the bitstream representation.

FIG. 39 is a block diagram that illustrates an example video coding system 100 that may utilize the techniques of this disclosure. As shown in FIG. 39, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a bitstream representation of the video data. The bitstream may include coded pictures and associated data. The coded picture is a bitstream representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

FIG. 40 is a block diagram illustrating an example of video encoder 200, which may be video encoder 114 in the system 100 illustrated in FIG. 39.

Video encoder 200 may be configured to perform any or all of the techniques of this disclosure. In the example of FIG. 40, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 40 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 41:
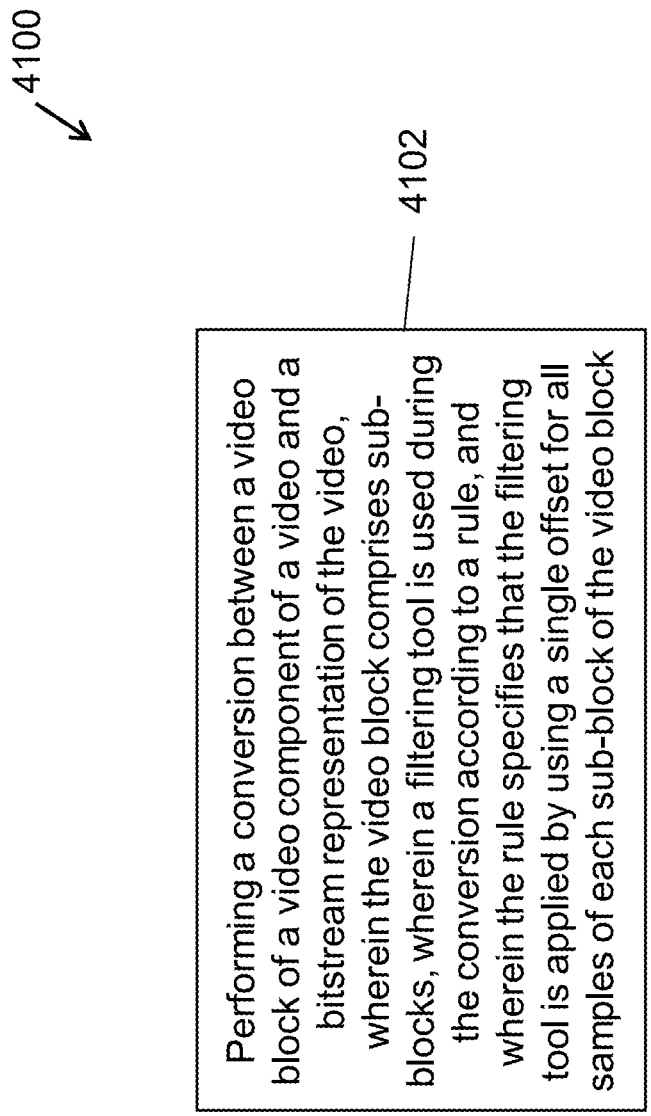
FIGS. 41 to 49 are flowcharts for example methods of video processing.

FIG. 41 is a flowchart for an example method 4100 of video processing. Operation 4102 includes performing a conversion between a video block of a video component of a video and a bitstream representation of the video, wherein the video block comprises sub-blocks, wherein a filtering tool is used during the conversion according to a rule, and wherein the rule specifies that the filtering tool is applied by using a single offset for all samples of each sub-block of the video block.

In some embodiments of method 4100, the filtering tool includes a cross-component adaptive loop filter (CC-ALF) tool in which sample values of a sub-block of the video block of the video component are predicted from sample values of another video component of the video. In some embodiments of method 4100, the filtering tool includes a chroma adaptive loop filter (chroma ALF) tool in which samples of a sub-block of the video block of a chroma video component are filtered using a loop filter. In some embodiments of method 4100, the filtering tool includes a luma adaptive loop filter (luma ALF) tool in which samples of a sub-block of the video block of a luma video component are filtered using a loop filter. In some embodiments of method 4100, a size of a sub-block corresponds to an M column×N row array of samples. In some embodiments of method 4100, the size of the sub-block includes 1×2 samples, or 2×1 samples, or 2×2 samples, or 2×4 samples, or 4×2 samples, or 4×4 samples. In some embodiments of method 4100, the size of the sub-block is signaled in the bitstream representation.

In some embodiments of method 4100, the size of the sub-block is signaled in the bitstream representation at a sequence level, a picture level, a slice level, or a tile group level, or wherein the size of the sub-block is signaled in the bitstream representation at a video region level. In some embodiments of method 4100, the sequence level, the picture level, the slice level, or the tile group level includes a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method 4100, the video region level includes a coding tree block (CTB). In some embodiments of method 4100, the single offset is modified according to a second rule to obtain a modified singe offset before refining all samples of each sub-block of the video block. In some embodiments of method 4100, the second rule specifies that the single offset is clipped to a range of T1 to T2. In some embodiments of method 4100, T1=−5, and T2=5. In some embodiments of method 4100, the second rule specifies whether to modify the single offset and a technique by which to modify the single offset.

In some embodiments of method 4100, the second rule specifies that the modified singe offset is set to a value of T when the single offset satisfies certain conditions. In some embodiments of method 4100, the modified single offset is set to the value of T in response to the single offset being less than T1 and in response to the single offset being greater than T2. In some embodiments of method 4100, the T=0, T1=−5, and T2=5. In some embodiments of method 4100, the second rule specifies that a technique by which to modify the single offset is based on a width of a sub-block and/or a height of a sub-block. In some embodiments of method 4100, the modified single offset is obtained by dividing the single offset by (M×W×H), wherein M is an integer, W is the width of the sub-block, and H is the height of the sub-block. In some embodiments of method 4100, M is 1 or 2. In some embodiments of method 4100, the second rule specifies that modified single offset is obtained by multiplying or by dividing or by adding or by shifting the single offset by T, wherein T is an integer. In some embodiments of method 4100, T is signaled in the bitstream representation. In some embodiments of method 4100, T is based on a sample value in the sub-block. In some embodiments of method 4100, T is based on a bit-depth of the samples of the video component.

In some embodiments of method 4100, the modified single offset is obtained by multiplying the single offset by T, wherein $T=v/(2^{Bmax}-1)$, wherein v denotes a value of one sample, Bmax denotes a maximum bit depth of the samples of the video component. In some embodiments of method 4100, the second rule specifies that whether to modify the single offset is indicated in the bitstream representation at a sequence level, a picture level, a slice level, or a tile group level, or wherein the second rule specifies that whether to modify the single offset is indicated in the bitstream representation at a video region level. In some embodiments of method 4100, the sequence level, the picture level, the slice level, or the tile group level includes a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method 4100, the video region level includes a coding tree block (CTB).

In some embodiments of method 4100, one representative sample in a sub-block is selected and a CC-ALF sample set in the sub-block corresponding to the one representative sample is used to calculate the single offset shared by the sub-block. In some embodiments of method 4100, the one representative sample is a representative chroma sample that is selected based on a position of the representative chroma sample. In some embodiments of method 4100, the one representative sample is an Nth representative chroma sample in the sub-block according to a scanning order. In some embodiments of method 4100, N is 1 or 2 or a last sample in the sub-block according to the scanning order. In some embodiments of method 4100, the one representative sample is located at a specific position in the sub-block.

In some embodiments of method 4100, the specific position includes at least one of a center position or a top-left position or a top-right position or a bottom-left position, or a bottom-right position in the sub-block. In some embodiments of method 4100, the one representative sample is selected based on a sample value. In some embodiments of method 4100, the one representative sample includes a sample having a maximum sample value in the sub-block. In some embodiments of method 4100, the one representative sample includes a sample having a minimum sample value in the sub-block. In some embodiments of method 4100, the one representative sample includes a sample having a median sample value in the sub-block. In some embodiments of method 4100, the CC-ALF sample set corresponding to the one representative sample is utilized for using the CC-ALF tool. In some embodiments of method 4100, multiple representative samples in a sub-block are selected and multiple CC-ALF sample sets in the sub-block corresponding to the multiple representative samples are used to calculate the single offset shared by the sub-block. In some embodiments of method 4100, a corresponding CC-ALF sample set of each of the multiple representative samples is first modified to generate one virtual representative filtering sample set, and wherein the one virtual representative filtering sample set is used to calculate the offset.

Figure 42:
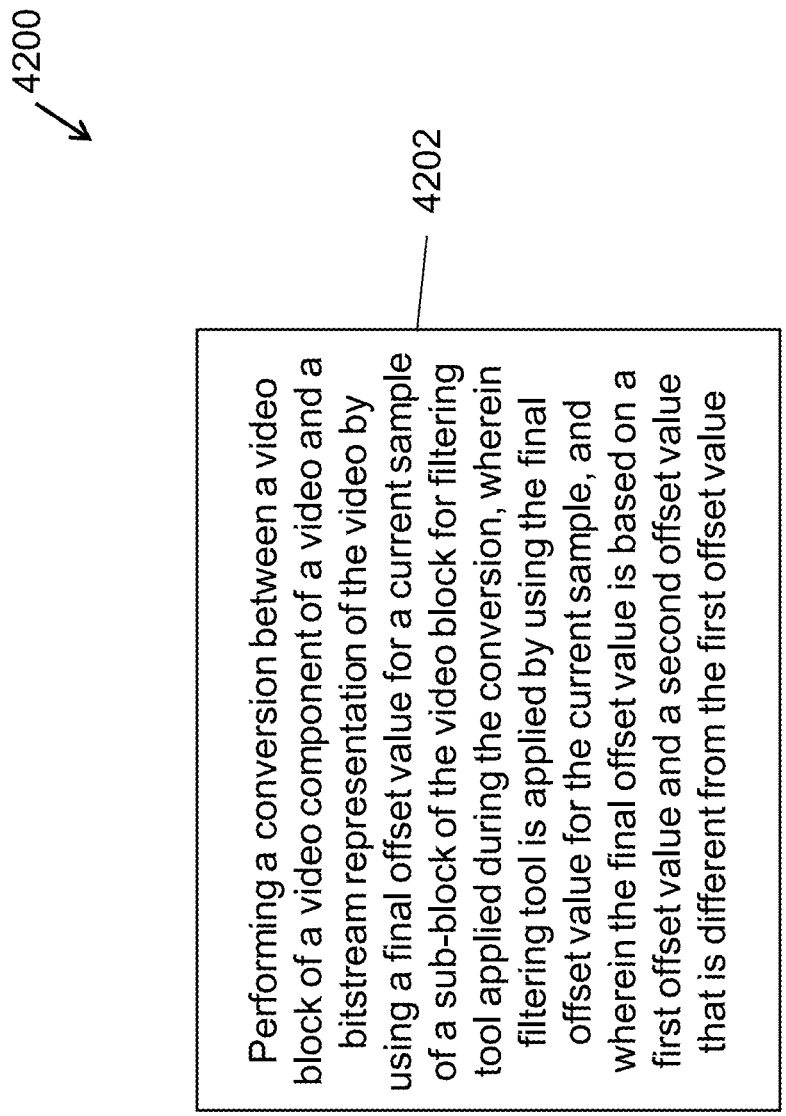

FIG. 42 is a flowchart for an example method 4200 of video processing. Operation 4202 includes performing a conversion between a video block of a video component of a video and a bitstream representation of the video by using a final offset value for a current sample of a sub-block of the video block for filtering tool applied during the conversion, wherein filtering tool is applied by using the final offset value for the current sample, and wherein the final offset value is based on a first offset value and a second offset value that is different from the first offset value.

In some embodiments of method 4200, the first offset value is shared with the sub-block, and wherein the second offset value is specific to the current sample. In some embodiments of method 4200, the first offset value is shared with neighboring samples of the current samples, and wherein the second offset value is specific to the current sample. In some embodiments of method 4200, the first offset value is calculated using a first filter support region. In some embodiments of method 4200, a size of the sub-block is 1×2, the sub-block includes chroma samples located at (X,
Y) and (X, Y+1), the sub-block includes luma samples located at (2X−1, 2Y+1), (2X, 2Y+1), (2X+1, 2Y+1), (2X−1, 2Y+2), (2X, 2Y+2), and (2X+1, 2Y+2) that are used to calculate the first offset value, and X and Y are integer offsets to locations of the chroma samples from a top left corner of the video block located at (0, 0).

In some embodiments of method 4200, a size of the sub-block is 2×1, the sub-block includes chroma samples located at (X, Y) and (X+1, Y), and wherein the sub-block includes luma samples located at (2X+1, 2Y−1), (2X+1, 2Y) (2X+1, 2Y+1), and (2X+1, 2Y+2) that are used to calculate the first offset value, and X and Y are integer offsets to locations of the chroma samples from a top left corner of the video block located at (0,0). In some embodiments of method 4200, the current sample includes a chroma sample, and wherein the second offset value is calculated using a second filter support region. In some embodiments of method 4200, a size of the sub-block is 1×2, the sub-block includes the chroma sample located at (X, Y), and the sub-block includes luma samples located at (2X, 2Y) and (2X, 2Y+1) that are used to calculate the second offset value for the chroma sample, and wherein X and Y are integer offsets to a location of the chroma sample from a top left corner of the video block located at (0, 0). In some embodiments of method 4200, a size of the sub-block is 1×2, the sub-block includes the chroma sample located at (X, Y+1), the sub-block includes luma samples located at (2X, 2Y+2) and (2X, 2Y+3) that are used to calculate the second offset value for the chroma sample, and X and Y are integer offsets to a location of the chroma sample from a top left corner of the video block located at (0, 0).

In some embodiments of method 4200, a size of the sub-block is 2×1, the sub-block includes the chroma sample located at (X, Y), the sub-block includes luma samples located at (2X, 2Y), (2X+1, 2Y), (2X, 2Y+1), and (2X+1, 2Y+1) that are used to calculate the second offset value for the chroma sample, and X and Y are integer offsets to a location of the chroma sample from a top left corner of the video block located at (0, 0). In some embodiments of method 4200, a size of the sub-block is 2×1, the sub-block includes the chroma sample located at (X+1, Y), the sub-block includes luma samples located at (2X+2, 2Y), (2X+3, 2Y), (2X+2, 2Y+1), and (2X+3, 2Y+1) that are used to calculate the second offset value for the chroma sample, and X and Y are integer offsets to a location of the chroma sample from a top left corner of the video block located at (0, 0). In some embodiments of method 4200, samples used for determining the first offset value and the second offset value are different from each other. In some embodiments of method 4200, at least some samples are both used for determining the first offset value and the second offset value. In some embodiments of method 4200, a number of samples used for determining the first offset value is same as that used for determining the second offset value. In some embodiments of method 4200, a first number of samples used for determining the first offset value is greater than or equal to a second number of samples used for determining the second offset value.

In some embodiments of method 4200, a first number of samples used for determining the first offset value is less than or equal to a second number of samples used for determining the second offset value. In some embodiments of method 4200, a field in the bitstream representation indicates the first offset value and the second offset value used for the conversion, and the field is indicated in the bitstream representation at a sequence level or a picture level or a slice level or a tile group level in a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method 4200, the first offset value is indicated in the field in the bitstream representation according to a scanning order of the sub-block among a plurality of sub-blocks. In some embodiments of method 4200, the filtering tool includes a cross-component adaptive loop filtering (CC-ALF) tool predicts sample values of the sub-block of the video block of the video component from sample values of another video component of the video. In some embodiments of method 4200, the filtering tool includes a chroma adaptive loop filter (chroma ALF) tool in which samples of a sub-block of the video block of a chroma video component are filtered using a loop filter. In some embodiments of method 4200, the filtering tool includes a luma adaptive loop filter (luma ALF) tool in which samples of a sub-block of the video block of a luma video component are filtered using a loop filter.

Figure 43:
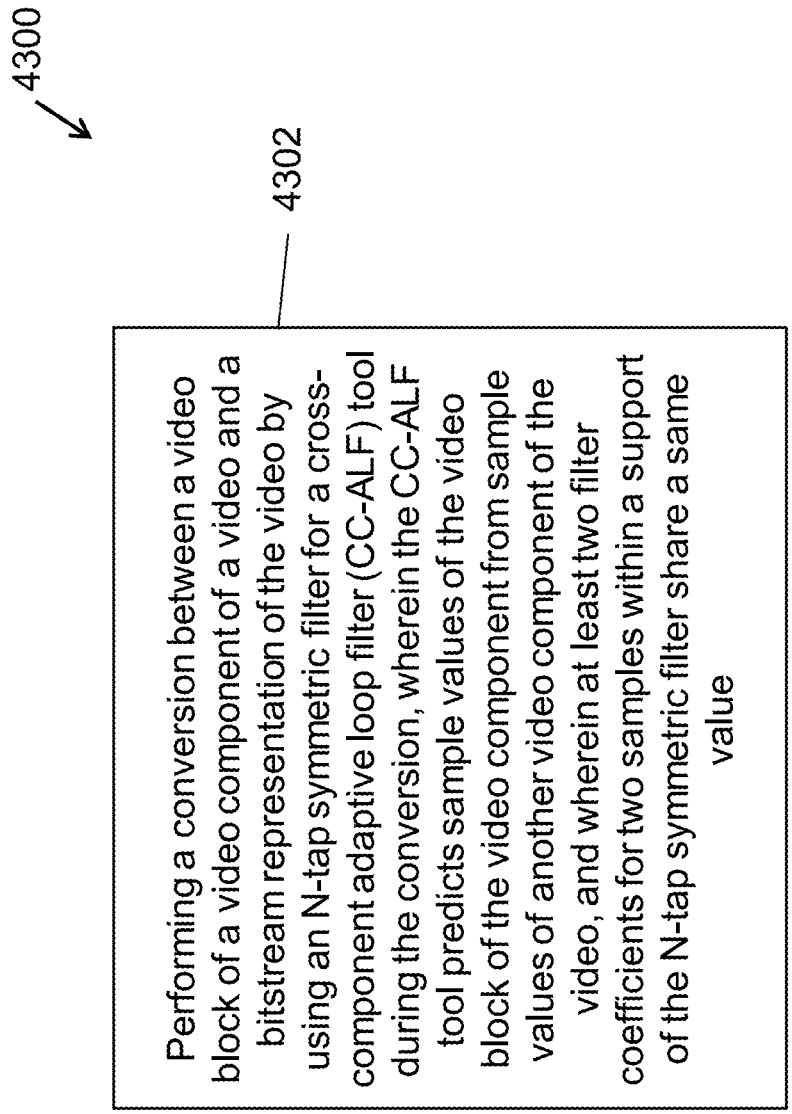

FIG. 43 is a flowchart for an example method 4300 of video processing. Operation 4302 includes performing a conversion between a video block of a video component of a video and a bitstream representation of the video by using an N-tap symmetric filter for a cross-component adaptive loop filter (CC-ALF) tool during the conversion, wherein the CC-ALF tool predicts sample values of the video block of the video component from sample values of another video component of the video, and wherein at least two filter coefficients for two samples within a support of the N-tap symmetric filter share a same value.

In some embodiments of method 4300, N=6 or 8. In some embodiments of method 4300, the N-tap symmetric filter has a certain shape that is utilized in the CC-ALF tool. In some embodiments of method 4300, the N-tap symmetric filter includes a symmetric 8-tap filter shape with 4 unique coefficients. In some embodiments of method 4300, the N-tap symmetric filter includes a symmetric 8-tap filter shape with 5 unique coefficients. In some embodiments of method 4300, the N-tap symmetric filter includes an 8-tap filter shape with 6 unique coefficients. In some embodiments of method 4300, the same value is signaled in the bitstream representation at a sequence level or a picture level or a slice level or a tile group level in a sequence header, a picture header, a sequence parameter set (SPS), a video parameter set (VPS), a decoder parameter set (DPS), a picture parameter set (PPS), a adaptation parameter set (APS), a slice header, or a tile group header, and the same value is used to drive the at least two filter coefficients.

Figure 44:
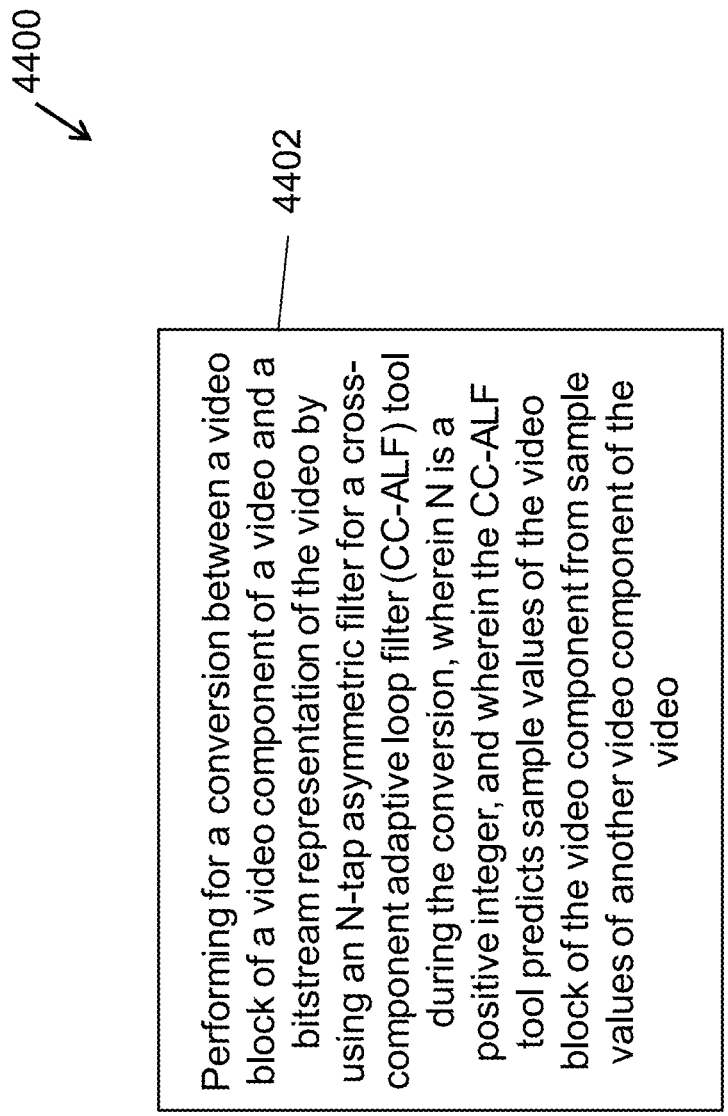

FIG. 44 is a flowchart for an example method 4400 of video processing. Operation 4402 includes performing for a conversion between a video block of a video component of a video and a bitstream representation of the video by using an N-tap asymmetric filter for a cross-component adaptive loop filter (CC-ALF) tool during the conversion, wherein N is a positive integer, and wherein the CC-ALF tool predicts sample values of the video block of the video component from sample values of another video component of the video.

In some embodiments of method 4400, N<8. In some embodiments of method 4400, the N-tap asymmetric filter has an asymmetric 6-tap filter shape. In some embodiments of method 4400, the N-tap asymmetric filter has an asymmetric 5-tap filter shape. In some embodiments of method 4400, the N-tap asymmetric filter has an asymmetric 4-tap filter shape.

Figure 45:
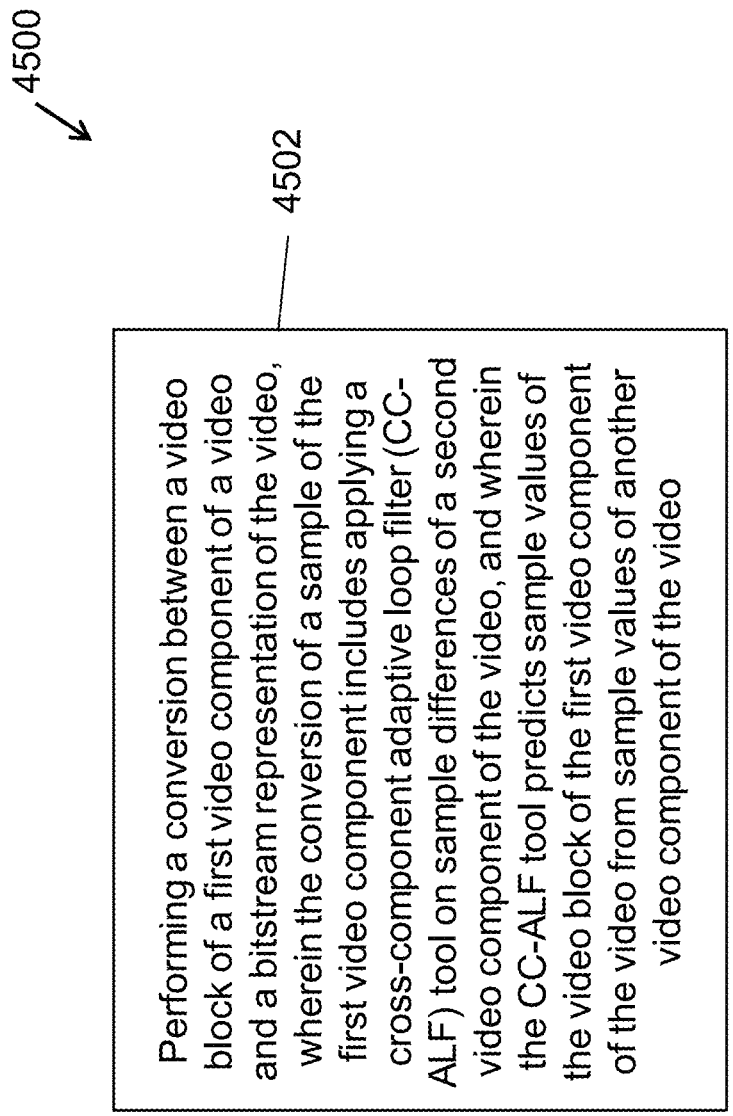

FIG. 45 is a flowchart for an example method 4500 of video processing. Operation 4502 includes performing a conversion between a video block of a first video component of a video and a bitstream representation of the video, wherein the conversion of a sample of the first video component includes applying a cross-component adaptive loop filter (CC-ALF) tool on sample differences of a second video component of the video, and wherein the CC-ALF tool predicts sample values of the video block of the first video component of the video from sample values of another video component of the video.

In some embodiments of method 4500, the first video component is a chroma component and the second video component is a luma component. In some embodiments of method 4500, the sample difference of the second video component is determined by obtaining a difference between a luma representative sample in a luma filter support region and another luma sample in the luma filter support region. In some embodiments of method 4500, the sample is located at a location (X, Y) and the representative luma sample is selected from location (2X, 2Y), and X and Y are integer offsets to the sample location from a top left corner of the video block located at (0, 0). In some embodiments of method 4500, the sample is located at a location (X, Y) and the representative luma sample is selected from any one location from locations (2X, 2Y), (2X, 2Y+1), (2X+1, 2Y), (2X+1, 2Y−1), (2X, 2Y−1), (2X−1, 2Y−1), (2X−1, 2Y), and X and Y are integer offsets to the sample location from a top left corner of the video block located at (0, 0).

In some embodiments of method 4500, the sample is located at a location (X, Y) and the representativelumasampleisselectedfromanyonelocationfromlocations (2X, 2Y), (2X, 2Y+1), (2X+1, 2Y), (2X, 2Y−1), (2X−1, 2Y), and X and Y are integer offsets to the sample location from a top left corner of the video block located at (0, 0).

In some embodiments of method 4500, the sample is located at a location (X, Y) and the representative luma sample is selected from location (2X, 2Y) and the another luma sample is located at (2X+1, 2Y), and X and Y are integer offsets to the sample location from a top left corner of the video block located at (0, 0). In some embodiments of method 4500, the sample is located at a location (X, Y) and the representative luma sample is selected from location (2X, 2Y) and the another luma sample is located at (2X, 2Y+1), and X and Y are integer offsets to the sample location from a top left corner of the video block located at (0,0). In some embodiments of method 4500, the sample is located at a location (X, Y) and the representative luma sample and the another luma sample are selected from locations (2X, 2Y+2), (2X+1, 2Y+1), (2X+1, 2Y), (2X, 2Y−1), (2X−1, 2Y), and (2X−1, 2Y+1), and X and Y are integer offsets to the sample location from a top left corner of the video block located at (0, 0). In some embodiments of method 4500, a technique to select the representative sample is pre-defined. In some embodiments of method 4500, a technique to select the representative sample is based on information in the bitstream representation. In some embodiments of method 4500, the information includes a color format.

Figure 46:
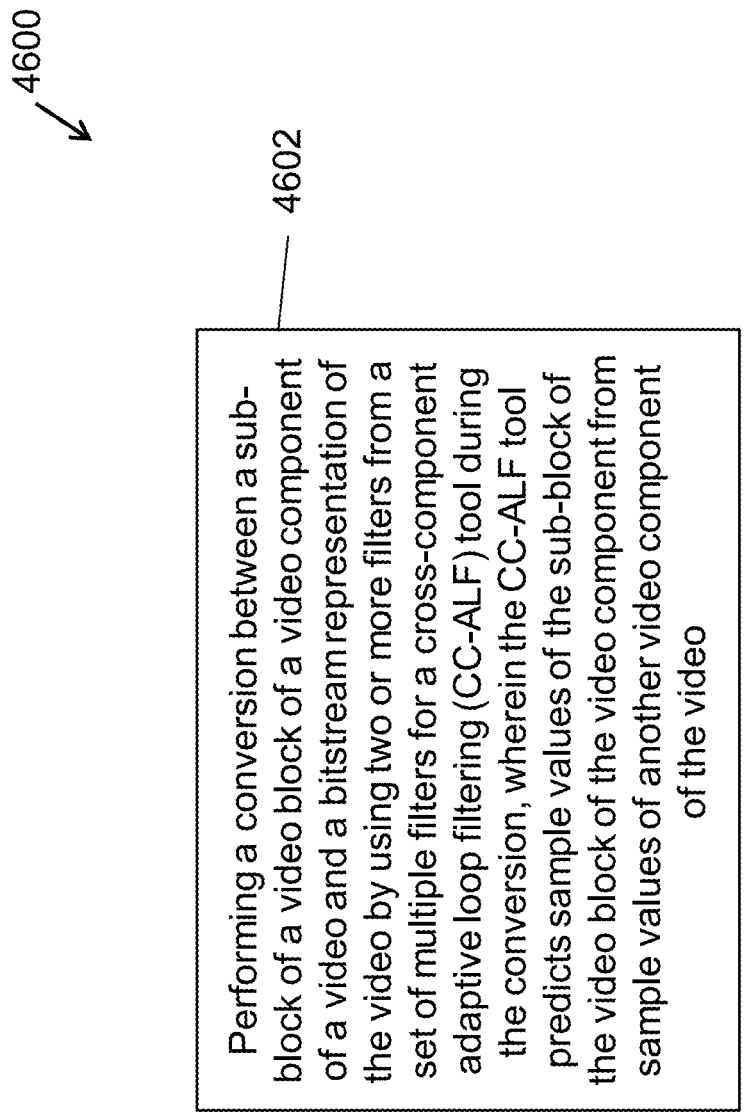

FIG. 46 is a flowchart for an example method 4600 of video processing. Operation 4602 includes performing a conversion between a sub-block of a video block of a video component of a video and a bitstream representation of the video by using two or more filters from a set of multiple filters for a cross-component adaptive loop filtering (CC-ALF) tool during the conversion, wherein the CC-ALF tool predicts sample values of the sub-block of the video block of the video component from sample values of another video component of the video.

In some embodiments of method 4600, a field in the bitstream representation indicates a length N of the set of multiple filters and/or a support of the two or more filters. In some embodiments of method 4600, the field is included at a sequence level or a picture level or a slice level or a tile group level in a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method 4600, offsets used in the (CC-ALF) tool are determined by using luma samples of a luma component corresponding to the sub-block using a pre-defined support. In some embodiments of method 4600, a size of the sub-block is 1×2, the sub-block includes chroma samples located at (X, Y) and (X, Y+1), the luma samples are located at (2X−1, 2Y), (2X−1, 2Y+1), (2X−1, 2Y+2), (2X−1, 2Y+3), (2X, 2Y−1), (2X, 2Y), (2X, 2Y+1), (2X, 2Y+2), (2X, 2Y+3), (2X, 2Y+4), (2X+1, 2Y), (2X+1, 2Y+1), (2X+1, 2Y+2), and (2X+1, 2Y+3), and X and Y are integer offsets to the sample location from a top left corner of the video block located at (0,0). In some embodiments of method 4600, wherein a size of the sub-block is 2×1, wherein the sub-block includes chroma samples located at (X, Y) and (X+1, Y), wherein the luma samples are located at (2X, 2Y−1), (2X, 2Y), (2X, 2Y+1), (2X, 2Y+2), (2X+1, 2Y−2), (2X+1, 2Y−1), (2X+1, 2Y), (2X+1, 2Y+1), (2X+1, 2Y+2), (2X+1, 2Y+3), (2X+2, 2Y−1), (2X+2, 2Y), (2X+2, 2Y+1), and (2X+2, 2Y+2), and wherein X and Y are integer offsets to the sample location from a top left corner of the video block located at (0, 0). In some embodiments of method 4600, wherein a size of the sub-block is 1×2, wherein the sub-block includes chroma samples located at (X, Y) and (X, Y+1), wherein the luma samples are located at (2X−1, 2Y+1), (2X−1, 2Y+2), (2X, 2Y), (2X, 2Y+1), (2X, 2Y+2), (2X, 2Y+3), (2X+1, 2Y+1), and (2X+1, 2Y+2), and wherein X and Y are integer offsets to the sample location from a top left corner of the video block located at (0, 0).

In some embodiments of method 4600, wherein a size of the sub-block is 2×1, wherein the sub-block includes chroma samples located at (X, Y) and (X+1, Y), wherein the luma samples are located at (2X, 2Y), (2X, 2Y+1), (2X+1, 2Y−1), (2X+1, 2Y), (2X+1, 2Y+1), (2X+1, 2Y+2), (2X+2, 2Y), and (2X+2, 2Y+1), and wherein X and Y are integer offsets to the sample location from a top left corner of the video block located at (0, 0). In some embodiments of method 4600, wherein a size of the sub-block is 1×2, wherein the sub-block includes chroma samples located at (X, Y) and (X, Y+1), wherein the luma samples are located at (2X−1, 2Y), (2X−1, 2Y+2), (2X, 2Y−1), (2X, 2Y), (2X, 2Y+1), (2X, 2Y+2), (2X, 2Y+3), (2X, 2Y+4), (2X+1, 2Y+1), and (2X+1, 2Y+3), and wherein X and Y are integer offsets to the sample location from a top left corner of the video block located at (0, 0). In some embodiments of method 4600, wherein a size of the sub-block is 2×1, wherein the sub-block includes chroma samples located at (X, Y) and (X+1, Y), wherein the luma samples are located at (2X−1, 2Y), (2X, 2Y), (2X, 2Y+1), (2X+1, 2Y−1), (2X+1, 2Y), (2X+1, 2Y+1), (2X+1, 2Y+2), (2X+2, 2Y), (2X+2, 2Y+1), and (2X+3, 2Y+1), and wherein X and Y are integer offsets to the sample location from a top left corner of the video block located at (0, 0). In some embodiments of method 4600, wherein a size of the sub-block is 2×1, wherein the sub-block includes chroma samples located at (X, Y) and (X+1, Y), wherein the luma samples are located at (2X−1, 2Y+1), (2X, 2Y), (2X, 2Y+1), (2X+1, 2Y−1), (2X+1, 2Y), (2X+1, 2Y+1), (2X+1, 2Y+2), (2X+2, 2Y), (2X+2, 2Y+1), and (2X+3, 2Y), and wherein X and Y are integer offsets to the sample location from a top left corner of the video block located at (0, 0).

Figure 47:
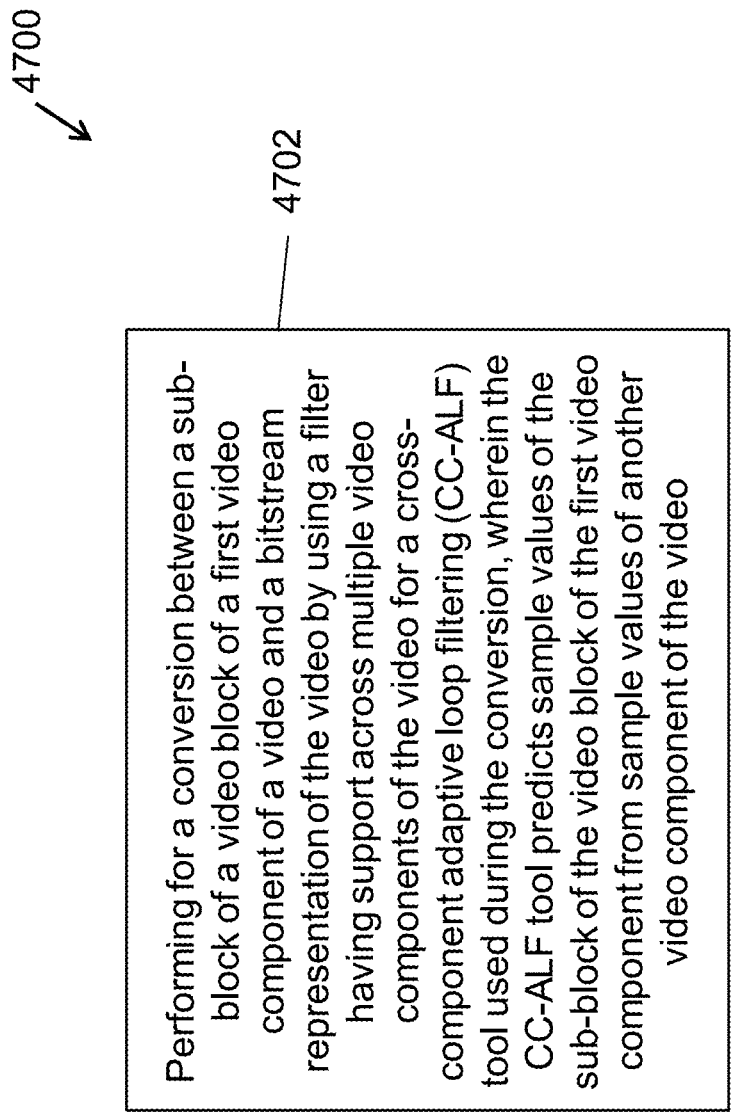

FIG. 47 is a flowchart for an example method 4700 of video processing. Operation 4702 includes performing for a conversion between a sub-block of a video block of a first video component of a video and a bitstream representation of the video by using a filter having support across multiple video components of the video for a cross-component adaptive loop filtering (CC-ALF) tool used during the conversion, wherein the CC-ALF tool predicts sample values of the sub-block of the video block of the first video component from sample values of another video component of the video.

In some embodiments of method 4700, wherein the multiple video components comprise a second video component and a third video component, and wherein one or more syntax elements in the bitstream representation sequentially indicate use of filter coefficients applied on the second video component and the third video component to correct the first video component. In some embodiments of method 4700, filter coefficients of the second video component are indicated in the bitstream representation before filter coefficients of the third video component. In some embodiments of method 4700, the one or more syntax elements are in an interleaved order in which filter coefficients of the second video component are interleaved with filter coefficients of the third video component. In some embodiments of method 4700, a correction of samples in the first video component is performed by filtering samples in the second video component. In some embodiments of method 4700, wherein the filter includes a symmetric 8-tap filter shape with 4 unique coefficients. In some embodiments of method 4700, the filter includes a symmetric 8-tap filter shape with 5 unique coefficients. In some embodiments of method 4700, the filter includes an 8-tap filter shape with 6 unique coefficients. In some embodiments of method 4700, a correction of a sample in the first video component is performed by samples from the multiple video components. In some embodiments of method 4700, the correction of the sample of the first video component is performed by using a same filter on the multiple video components.

In some embodiments of method 4700, the filter includes a symmetric 8-tap filter shape with 4 unique coefficients, or the filter includes a symmetric 8-tap filter shape with 5 unique coefficients, or the filter includes an 8-tap filter shape with 6 unique coefficients.

In some embodiments of method 4700, the sample of the first video component is corrected using an average or a weighted average of offsets derived from the multiple video components. In some embodiments of method 4700, the sample of the first video component is corrected by multiplying offsets derived from the multiple video components. In some embodiments of method 4700, the correction of the sample of the first video component is performed by using different filters on the multiple video components. In some embodiments of method 4700, the different filters include any two or more of a symmetric 8-tap filter shape with 4 unique coefficients, a symmetric 8-tap filter shape with 5 unique coefficients, and an 8-tap filter shape with 6 unique coefficients. In some embodiments of method 4700, the sample of the first video component is corrected using an average or a weighted average of offsets derived from the multiple video components. In some embodiments of method 4700, the sample of the first video component is corrected by multiplying offsets derived from the multiple video components.

Figure 48:
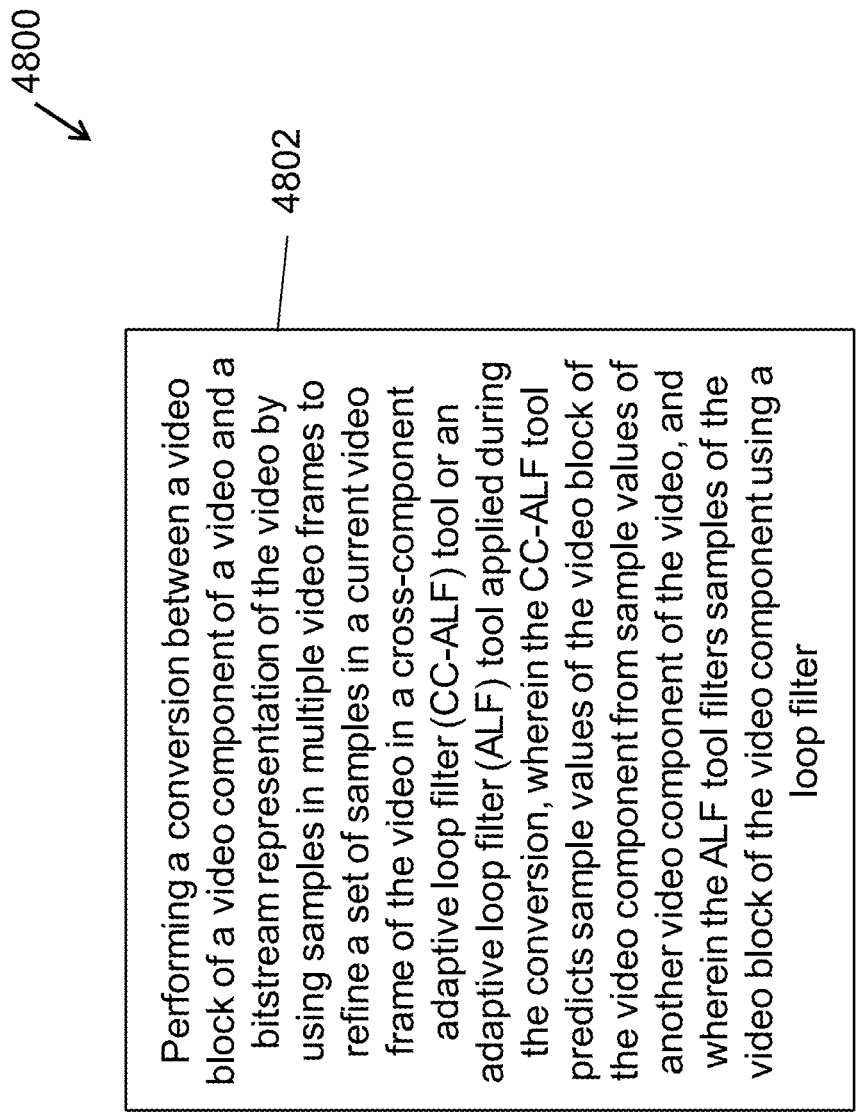

FIG. 48 is a flowchart for an example method 4800 of video processing. Operation 4802 includes performing a conversion between a video block of a video component of a video and a bitstream representation of the video by using samples in multiple video frames to refine a set of samples in a current video frame of the video in a cross-component adaptive loop filter (CC-ALF) tool or an adaptive loop filter (ALF) tool applied during the conversion, wherein the CC-ALF tool predicts sample values of the video block of the video component from sample values of another video component of the video, and wherein the ALF tool filters samples of the video block of the video component using a loop filter.

In some embodiments of method 4800, whether to use the samples from the multiple video frames to refine the set of samples in the current video frame is indicated in the bitstream representation at a sequence level or a picture level or a slice level or a tile group level in a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method 4800, the multiple video frames include reference pictures of the current video frame. In some embodiments of method 4800, the multiple video frames do not include reference pictures of the current video frame. In some embodiments of method 4800, a picture of the video that is nearest to the current video frame is used for the ALF tool and/or the CC-ALF tool, wherein a picture of coding (POC) technique is used to determine a distance between the picture and the current video frame.

In some embodiments of method 4800, short-term pictures of the current video frame are used for the ALF tool and/or the CC-ALF tool. In some embodiments of method 4800, long-term pictures of the current video frame are used for the ALF tool and/or the CC-ALF tool. In some embodiments of method 4800, reference pictures in a same temporal layer of the current video frame are used for the ALF tool and/or the CC-ALF tool. In some embodiments of method 4800, reference pictures in different temporal layers of the current video frame are used for the ALF tool and/or the CC-ALF tool. In some embodiments of method 4800, the multiple video frames include the current video frame.

Figure 49:
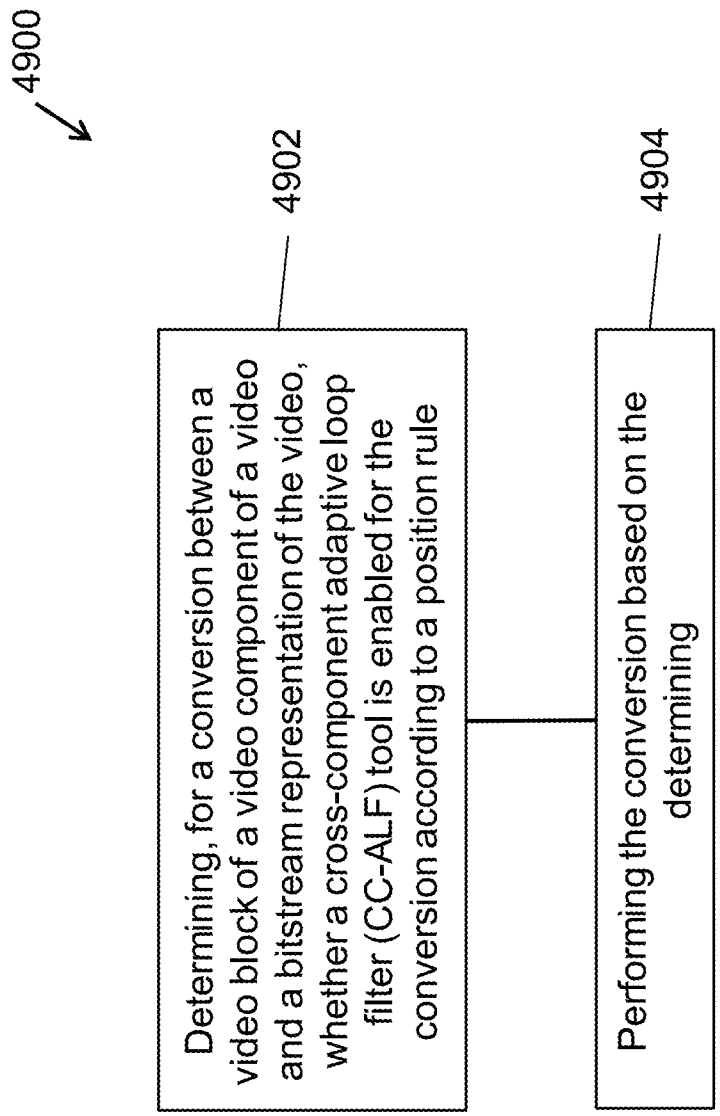

FIG. 49 is a flowchart for an example method 4900 of video processing. Operation 4902 includes determining, for a conversion between a video block of a video component of a video and a bitstream representation of the video, whether a cross-component adaptive loop filter (CC-ALF) tool is enabled for the conversion according to a position rule, wherein the CC-ALF tool predicts sample values of the video block of the video component from sample values of another video component of the video. Operation 4904 includes performing the conversion based on the determining.

In some embodiments of method 4900, the position rule specifies to disable the CC-ALF tool for chroma samples between a coding tree block bottom boundary and a virtual boundary of loop filtering. In some embodiments of method 4900, the virtual boundary is a line obtained by shifting a horizontal coding tree unit (CTU). In some embodiments of method 4900, the position rule specifies to disable the CC-ALF tool for chroma samples and/or luma samples between a coding tree unit (CTU) bottom boundary and a virtual boundary of loop filtering. In some embodiments of method 4900, the virtual boundary is a line obtained by shifting a horizontal coding tree unit (CTU). In some embodiments of method 4900, the position rule specifies to disable the CC-ALF tool at positions where another filtering is applied during the conversion. In some embodiments of method 4900, the position rule specifies to disable the CC-ALF tool for samples located at transform edge or a coding unit (CU) edge that are filtered by another filter applied during the conversion.

In some embodiments of method(s) 4100-4900, a syntax element indicative of a use of the method for the conversion is includes in the bitstream representation at a sequence level or a picture level or a slice level or a tile group level in a sequence header, a picture header, a sequence parameter set (SPS), a video parameter set (VPS), a decoder parameter set (DPS), a picture parameter set (PPS), a adaptation parameter set (APS), a slice header, or a tile group header. In some embodiments of method(s) 4100-4900, the method is selectively applied based on a characteristic of the video indicated in the bitstream representation. In some embodiments of method(s) 4100-4900, the characteristic includes a color format or a partitioning type or a position of the sub-block with respect to a coding unit (CU) or a coding tree unit (CTU). In some embodiments of method(s) 4100-4900, the performing the conversion comprising encoding the video to generate the bitstream representation. In some embodiments of method(s) 4100-4900, the performing the conversion comprises parsing and decoding the bitstream representation to generate the video.

In some embodiments, a video decoding apparatus comprising a processor configured to implement a method recited in one or more of method(s) 4100-4900. In some embodiments, a video encoding apparatus comprising a processor configured to implement a method recited in one or more of method(s) 4100-4900. In some embodiments, a computer program product having computer code stored thereon, the code, when executed by a processor, causes the processor to implement a method recited in any of method(s) 4100-4900. In some embodiments, a computer readable medium that stores a bitstream representation or a bitstream representation generated according to the method in any one or more of method(s) 4100-4900.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer area processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a video block of a first video component of a video and a bitstream of the video,
wherein the conversion of a sample of the first video component includes applying a cross-component adaptive loop filter (CC-ALF) tool on sample differences of a second video component of the video,
wherein the CC-ALF tool predicts sample values of the video block of the first video component of the video from sample values of another video component of the video,
wherein the first video component is a chroma component and the second video component is a luma component,
wherein the sample difference of the second video component is determined by obtaining a difference between a representative luma sample in a luma filter support region and another luma sample in the luma filter support region,
wherein the sample is located at a location (X, Y) and the representative luma sample is selected from location (2X, 2Y) and the another luma sample is located at (2X+1, 2Y), or the sample is located at a location (X, Y) and the representative luma sample is selected from location (2X, 2Y) and the another luma sample is located at (2X, 2Y+1), and
wherein X and Y are integer offsets to a sample location from a top left corner of the video block located at (0, 0).

2. The method of claim 1, wherein the sample is located at a location (X, Y) and the representative luma sample is selected from any one location from locations (2X, 2Y), (2X, 2Y+1), (2X+1, 2Y), (2X+1, 2Y-1), (2X, 2Y-1), (2X-1, 2Y-1), (2X-1, 2Y).

3. The method of claim 1, wherein selection of the representative luma sample is based on a color format for the video block.

4. The method of claim 1, wherein a filter having support across multiple video components of the video is used for the cross-component adaptive loop filtering (CC-ALF) tool used during the conversion.

5. The method of claim 4, wherein the multiple video components comprise the second video component and a third video component, and
wherein one or more syntax elements in the bitstream sequentially indicate use of filter coefficients applied on the second video component and the third video component to correct the first video component.

6. The method of claim 5, wherein filter coefficients of the second video component are indicated in the bitstream before filter coefficients of the third video component, or the filter coefficients of the second video component are interleaved with the filter coefficients of the third video component.

7. The method of claim 5, wherein a correction of samples in the first video component is performed by filtering samples in the second video component, or a correction of a sample in the first video component is performed by samples from the multiple video components.

8. The method of claim 7, wherein the correction of the sample in the first video component is performed by using a same filter on the multiple video components.

9. The method of claim 8, wherein the filter includes a symmetric 8-tap filter shape with 4 unique coefficients, or wherein the filter includes a symmetric 8-tap filter shape with 5 unique coefficients, or wherein the filter includes an 8-tap filter shape with 6 unique coefficients.

10. The method of claim 8, wherein the sample in the first video component is corrected using an average or a weighted average of offsets derived from the multiple video components, or the sample in the first video component is corrected by multiplying offsets derived from the multiple video components.

11. The method of claim 1, wherein samples in multiple video frames of the video are used to refine a set of samples in a current video frame of the video in the cross-component adaptive loop filter (CC-ALF) tool or an adaptive loop filter (ALF) tool applied during the conversion, and
wherein the ALF tool filters samples of the video block of the first video component using a loop filter.

12. The method of claim 11, wherein whether to use the samples from the multiple video frames to refine the set of samples in the current video frame is indicated in the bitstream at a sequence level or a picture level or a slice level or a tile group level in a sequence header, a picture header, a sequence parameter set (SPS), a video parameter set (VPS), a decoder parameter set (DPS), a picture parameter set (PPS), an adaptation parameter set (APS), a slice header, or a tile group header.

13. The method of claim 11, wherein the multiple video frames include reference pictures of the current video frame or the current video frame, and
wherein a picture of the video that is nearest to the current video frame is used for the ALF tool and/or the CC-ALF tool,
short-term pictures of the current video frame are used for the ALF tool and/or the CC-ALF tool;
long-term pictures of the current video frame are used for the ALF tool and/or the CC-ALF tool;
reference pictures in a same temporal layer of the current video frame are used for the ALF tool and/or the CC-ALF tool; or
reference pictures in different temporal layers of the current video frame are used for the ALF tool and/or the CC-ALF tool.

14. The method of claim 1, wherein the conversion includes encoding the video block into the bitstream.

15. The method of claim 1, wherein the conversion includes decoding the video block from the bitstream.

16. An apparatus for processing video data comprising a processor and a non-transitory memory with instructions thereon, wherein the instructions upon execution by the processor, cause the processor to:
perform a conversion between a video block of a first video component of a video and a bitstream of the video,
wherein the conversion of a sample of the first video component includes applying a cross-component adaptive loop filter (CC-ALF) tool on sample differences of a second video component of the video,
wherein the CC-ALF tool predicts sample values of the video block of the first video component of the video from sample values of another video component of the video,
wherein the first video component is a chroma component and the second video component is a luma component,
wherein the sample difference of the second video component is determined by obtaining a difference between a representative luma sample in a luma filter support region and another luma sample in the luma filter support region,
wherein the sample is located at a location (X, Y) and the representative luma sample is selected from location (2X, 2Y) and the another luma sample is located at (2X+1, 2Y), or the sample is located at a location (X, Y) and the representative luma sample is selected from location (2X, 2Y) and the another luma sample is located at (2X, 2Y+1), and
wherein X and Y are integer offsets to a sample location from a top left corner of the video block located at (0, 0).

17. A non-transitory computer-readable recording medium storing a bitstream of a video which is generated by a method performed by a video processing apparatus, wherein the method comprises:
generating, for a video block of a first video component of the video, the bitstream of the video,
wherein the generating of a sample of the first video component includes applying a cross-component adaptive loop filter (CC-ALF) tool on sample differences of a second video component of the video,
wherein the CC-ALF tool predicts sample values of the video block of the first video component of the video from sample values of another video component of the video,
wherein the first video component is a chroma component and the second video component is a luma component,
wherein the sample difference of the second video component is determined by obtaining a difference between a representative luma sample in a luma filter support region and another luma sample in the luma filter support region,
wherein the sample is located at a location (X, Y) and the representative luma sample is selected from location (2X, 2Y) and the another luma sample is located at (2X+1, 2Y), or the sample is located at a location (X, Y) and the representative luma sample is selected from location (2X, 2Y) and the another luma sample is located at (2X, 2Y+1), and
wherein X and Y are integer offsets to a sample location from a top left corner of the video block located at (0, 0).

* * * * *